United States Patent
Inushima et al.

(10) Patent No.: US 6,550,325 B1
(45) Date of Patent: *Apr. 22, 2003

(54) ELECTRIC DEVICE AND METHOD OF DRIVING THE SAME

(75) Inventors: Takashi Inushima, Kanagawa (JP); Vaitkus Rimantas, Kanagawa (JP); Masaaki Hiroki, Kanagawa (JP); Eiji Sato, Kanagawa (JP); Satoshi Teramoto, Kanagawa-ken (JP)

(73) Assignee: Semiconductor Energy Laboratory Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/141,632

(22) Filed: Oct. 27, 1993

(30) Foreign Application Priority Data

| Oct. 27, 1992 | (JP) | 4-311313 |
| Mar. 25, 1993 | (JP) | 5-090876 |
| Jul. 7, 1993 | (JP) | 5-192828 |
| Jul. 31, 1993 | (JP) | 5-209059 |
| Sep. 24, 1993 | (JP) | 5-261778 |

(51) Int. Cl.$^7$ .................................................. G01F 1/68
(52) U.S. Cl. .............................. 73/204.26; 338/225 D
(58) Field of Search ................... 338/225; 73/204.19, 73/204.25, 204.23, 204.26, 204.27

(56) References Cited

U.S. PATENT DOCUMENTS

| 3,942,378 A | * | 3/1976 | Olmstead | 73/204.18 |
| 4,478,077 A | * | 10/1984 | Bohrer et al. | 73/204.16 |
| 4,682,496 A | * | 7/1987 | Miura et al. | 73/204.16 |
| 4,761,995 A | * | 8/1988 | Ohta et al. | 73/204.17 |
| 4,781,065 A | * | 11/1988 | Cole | 73/204.16 |
| 4,821,568 A | | 4/1989 | Kiske | |

(List continued on next page.)

FOREIGN PATENT DOCUMENTS

| JP | 58-214814 | 12/1983 |
| JP | 62-231174 | 10/1987 |
| JP | 63-085364 | 4/1988 |
| JP | 63-140921 | 6/1988 |
| JP | 64-032120 | 2/1989 |
| JP | 03-097201 | 4/1991 |
| JP | 03-283601 | 12/1991 |
| JP | 63-252224 | 10/1998 |

OTHER PUBLICATIONS

Roppel et al., "Sensor Applications for Synthetic Polycrystalline Thin–Film Diamond", 1991, pp. 329–346, Sensors and Materials, MYU, Tokyo.

*Primary Examiner*—Harshad Patel
(74) *Attorney, Agent, or Firm*—Eric J. Robinson; Robinson Intellectual Property Law Office, P.C.

(57) ABSTRACT

A thermistor layer made of platinum is formed on a thin diamond film. An amount of heat carried away from the diamond film by a fluid is detected as a change in the temperature of the thermistor layer. The rear side of the diamond film is kept in contact with the fluid to prevent the material of the thermistor from being corroded by the fluid. In another aspect of the invention, a heating element and a thermistor are formed on one surface of a thin diamond film. The other surface is kept in contact with a fluid. The diamond film is heated by the heating element in a quite short time of about 0.2 second. The resulting response characteristics of the diamond film are detected by the thermistor. The flow rate is calculated from the response characteristics.

14 Claims, 28 Drawing Sheets

U.S. PATENT DOCUMENTS

| | | | |
|---|---|---|---|
| 5,024,083 A | * | 6/1991 | Inada et al. ............... 73/204.26 |
| 5,066,938 A | * | 11/1991 | Kobashi et al. .......... 338/225 D |
| 5,081,438 A | * | 1/1992 | Nakahata et al. ....... 338/225 D |
| 5,144,380 A | * | 9/1992 | Kimoto et al. .......... 338/225 D |
| 5,183,530 A | | 2/1993 | Yamazaki |
| 5,303,594 A | * | 4/1994 | Kurtz et al. ................ 73/727 |
| 5,317,302 A | * | 5/1994 | Yamazaki ............... 338/225 D |
| 5,488,350 A | * | 1/1996 | Aslam et al. ........... 338/225 D |

\* cited by examiner 504
324

Gas flow vs output of Diamond thin film Mass flow sensor

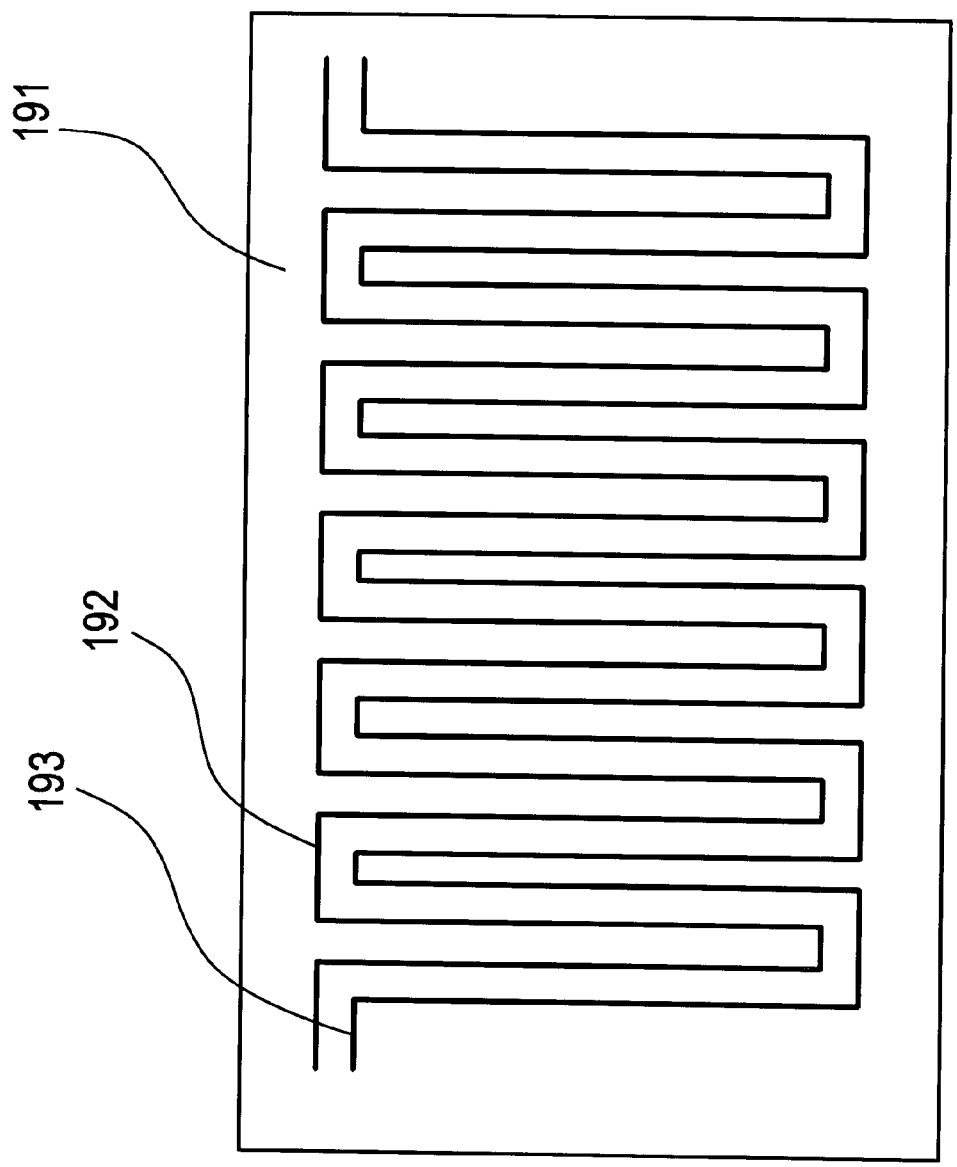

ELECTRIC DEVICE AND METHOD OF DRIVING THE SAME

BACKGROUND OF THE INVENTION

1. Field of the Invention

The present invention relates to an electric device and a method of driving the same. Particularly, the present invention relates to a measuring instrument for fluids such as gases, liquids, and fog-like fluids (including atomized fluids and gases and fluids containing solid powder) and to a method of operating the measuring instrument. More particularly, the invention relates to a measuring instrument for measuring flow rates or flow velocities of fluids, discriminating between fluids, measuring the ratio of one constituent of a mixed fluid to the other, and measuring the concentration (e.g., humidity) of a substance contained in a fluid. Also, the invention relates to a method of operating this measuring instrument.

2. Prior Art

A known instrument for measuring a flow rate makes use of a thermistor. In particular, a fluid takes heat away, thus lowering the temperature of the thermistor. This instrument makes use of this phenomenon. Generally, when the thermistor is in contact with the fluid, the amount of heat taken away from the thermistor depends on the flow rate and so the output from the thermistor has a certain correlation with the flow rate. Utilizing this correlation, the flow rate can be calculated from the output from the thermistor.

A flow rate is the product of the cross-sectional area of a fluid and the flow velocity. It is assumed that a fluid flows through a circular pipe having an inside diameter r at a flow velocity of v. The flow rate is given by $v \pi r^2$. Accordingly, we will concentrate on the flow rate in the description made below. If the cross-sectional area of the fluid is known, then the flow rate and the flow velocity can be found simultaneously.

Generally, a thermistor refers to a semiconductor having a negative temperature coefficient of resistance. Instead of such a thermistor, a metal such as platinum having a positive temperature coefficient of resistance can be used. That is, any material can be used as long as its resistance changes with temperature. Devices using a material whose resistance changes with temperature are collectively known as thermally sensitive resistors, temperature sensing elements, or resistance thermometers. Thermally sensitive resistors referred to herein mean materials whose resistances change with temperature.

Another structure uses a heating resistor exposed to a fluid. The amount of heat taken away from this resistor depends on the flow rate. This structure makes use of this phenomenon. In this system, the flow rate can be calculated by measuring the electrical current flowing through the heating resistor.

A further structure employs a heating element in contact with a fluid. Heat is taken away from the heating element by the fluid. A temperature sensing element (e.g., a platinum sensor) disposed independent of the heating element measures the amount of heat carried away by the fluid. The flow rate is calculated from this amount of heat.

In these methods, a higher sensitivity is effectively obtained by increasing the amount of heat taken away by the fluid. In order to enhance the response speed, it is necessary to reduce the heat capacity of the temperature sensing element as small as possible.

The flowmeters constructed as described above have the problem that only a narrow range of flow rates can be measured. That is, their dynamic ranges are narrow. Specifically, these flowmeters are capable of precisely measuring flow rates within ranges only from 20 to 300 sccm or from 200 to 2000 sccm.

It is considered that these problems are chiefly due to the following reasons.

(1) Since the temperature sensing element is in a thermally quite unstable state, the linearity of the response to the heat is poor. Hence, the flowmeter cannot respond to thermal changes occurring in a wide range.

(2) In association with (1) above, heating is especially difficult to perform. It is impossible to do effective heating over a wide range of flow rates.

(3) If the heat capacity of the temperature sensing element is reduced to increase the response speed, it is impossible to treat large amounts of heat.

The item (1) described above occurs because it is difficult to build a structure which permits the fluid to effectively take heat away from the temperature sensing element over a wide range of flow rates and which, at the same time, effectively supplies heat to the sensing element.

The item (3) described above means that increasing the response speed conflicts with increasing the dynamic range, or the range of flow rate of the investigated fluid.

Accordingly, the present situation is that the prior art flowmeter is designed to measure a narrowed range of flow rates so that the heat amount treated by the temperature sensing element may not vary greatly. More specifically, the measured range of flow rates is narrowed. Within this range, the heat capacity of the temperature sensing element, the positional relation between the temperature sensing element and the heating element, their thermal relationship, and the electrical current flowing through the temperature sensing element are subtly adjusted to obtain the required sensitivity and measuring accuracy.

A further known structure is designed so that the heat amount supplied to a heating element changes according to the flow rate. The amount of heat taken away from a temperature sensing element is in proportion to the flow rate, irrespective of the flow rate value.

Temperature sensing elements sensitively detect temperature variations (i.e., temperature variations in the fluid) in the environment as well as flow rates. Therefore, where the temperature sensing elements are used in an environment where temperature varies, a problem takes place. Various proposals have been made to solve this problem. In actual usage, however, the measured flow rate is affected greatly by the fluid temperature.

Where a temperature sensing element or a heating element is exposed to a fluid, the material of the sensing element or heating element is corroded, depending on the kind of the fluid. As a result, the electrical and thermal characteristics are varied. To solve this problem, a method of coating the surface with a protective film may be contemplated. However, where the thermistor surface is coated with a protective film, the speed of the response to heat deteriorates. Also, the measuring accuracy is deteriorated by refraction of heat. Hence, this scheme is undesirable.

Flowmeters using thin diamond films are described in Sensors and Materials, 2, 6 (1991), pp. 329–346 and in Applications of Diamond Films and Related Materials, Y. Tzeng, M. Murakawa, A. Feldmand (Editors), Elsevier Science B. V., 1991, pp. 311–318. These two flowmeters are essentially the same in structure. In these flowmeters, a thin film of diamond is formed on a silicon substrate by CVD. Resistors formed inside the silicon substrate are in contact with two opposite ends, respectively, of the thin film. One of the resistors acts as a heating element, while the other serves as a temperature sensing element, or a sensor. When heat is conveyed from one end to the other end of the diamond film in the direction of the plane of the film, the fluid carries away heat from the surface of the thin film. This amount of heat is detected by the temperature sensing element mounted at the other end. However, these flowmeters do not have any characteristics which deserve attention.

SUMMARY OF THE INVENTION

Accordingly, in the present invention, a thermistor is formed on the surface of a thin film of diamond. This film is operated as a heat storage layer for supplying heat to the thermistor. A thermal equilibrium state which quickly satisfies Eq. (8) if a flow rate change occurs is realized. The temperature of the thermistor is settled in such a way that the flow rate of the fluid is constantly reflected.

$$W = K(T-T_0) + G(T-T_0) \tag{8}$$

First Invention

A first invention of the present application lies in a flow detector using a thin film of diamond which has a layer acting as a thermistor on its surface.

In the above-described first invention, the thin diamond film is preferably fabricated by chemical vapor deposition (CVD). No limitations are imposed on the conductivity type of the diamond film. Any thin diamond film to which one conductivity type is imparted by an appropriate doping method may be used. The layer acting as a thermistor can be fabricated from platinum or an alloy of platinum and other material by sputtering. Also, this layer may be made of a material generally capable of acting as a thermistor. The layer acting as a thermistor can be formed on the surface of the diamond film by doping the thin film with an impurity that imparts one conductivity type to the thin film. This thermistor can detect temperature and a change in the temperature by measuring the resistance or resistivity of the material which varies with temperature.

The present invention is characterized in that a layer acting as a thermistor is formed on a thin film of diamond responding quickly to heat and that the thin film transfers heat. In particular, a fluid and the thermistor exchange heat with each other via the thin film of diamond.

Second Invention

A second invention of the present application lies in a flow detector using an intrinsic or substantially intrinsic thin film of diamond which has a semiconductor layer of one conductivity type on its surface. The semiconductor layer acts as a thermistor and is formed on the initial crystal growth plane of the thin film of diamond. The final crystal growth plane of the diamond film is in contact with the fluid.

In the second invention described above, the initial crystal growth plane of the diamond film is a plane on which the diamond film begins to grow. As an example, where a thin film of diamond is grown on a substrate, the surface at which the substrate and the thin film of diamond are in contact with each other is the initial crystal growth plane. The final crystal growth plane is opposite in sense to the initial crystal growth plane, i.e., a plane at which the crystal growth ends. In other words, the final crystal growth plane is exposed on the surface after the completion of the film.

As defined in the second invention, a layer acting as a thermistor is formed on one surface of a thin film of diamond, and the other surface is made to touch a fluid whose fluid rate is to be measured. The layer of the thermistor on which conductive interconnects or the like are formed is neither corroded nor deteriorated by the fluid. In one great feature of the invention, diamond which is most resistant to corrosion is used as a protective layer.

Third Invention

A third invention of the present application lies in a flow detector using an intrinsic or substantially intrinsic thin film of diamond which has a layer acting as a thermistor on its surface. This layer is formed on the initial crystal growth plane for the thin film of diamond. The final crystal growth plane of the thin film of diamond is in contact with the fluid.

In the third invention described above, the initial crystal growth plane of the thin film of diamond is a plane on which the diamond film begins to grow. As an example, where a thin film of diamond is grown on a substrate, the plane at which the substrate and the thin film of diamond are in contact with each other is the initial crystal growth plane. The final crystal growth plane is opposite in sense to the initial crystal growth plane, i.e., a surface at which the crystal growth ends. In other words, the final crystal growth plane is exposed on the surface after the completion of the film. This final crystal growth plane is a rough surface which is brought into contact with a fluid, whereby the thermal exchange efficiency can be enhanced. Of course, the roughness of the surface is so small that the flow velocity of the fluid is not affected.

Where the third invention described above is adopted, the advantage of the second invention, i.e., that the fluid is not in direct contact with the layer acting as a thermistor, can be derived. At the same time, the efficiency of thermal exchange with the fluid can be enhanced. This improves the accuracy at which the flow rate can be detected.

Fourth Invention

A fourth invention of the present application lies in a flow detector using an intrinsic or substantially intrinsic thin film of diamond which has a layer acting as a thermistor on its surface. The thin layer of diamond has a larger heat capacity than that of the layer acting as a thermistor.

The fourth invention is necessary in order that the thin film of diamond acts as a heat storage layer and that a requisite amount of heat is supplied to the thermistor, or a portion at which the layer acting as a thermistor is formed, at a high speed. If the heat capacity of the thin film of diamond is less than that of the thermistor, then the temperature of the thin film of diamond determined by the amount of heat taken away from the thin film by the fluid is affected greatly by the temperature of the thermistor having a larger heat capacity. In consequence, the temperature of the thin diamond film does not correctly reflect the flow rate. That is, the flow rate cannot be precisely measured. Of course, if the heat capacity of the thin diamond film is too large compared with the heat capacity of the thermistor, then the responsiveness of the thin film to heat drops. As a result, the sensitivity with which a flow rate is measured drops.

Fifth Invention

A fifth invention of the present application lies in a flow detector using a thin film of diamond which comprises plural layers acting as a thermistor together with a heating element.

A heat gradient formed across the thin film by the heating element is detected by the plural layers acting as a thermistor.

The thin film of diamond is not uniformly heated by the heat generated by the heating element. In a thermal equilibrium state, (in which transfer of heat exists), temperature differs from location to location on the thin diamond film and also depending on the distance from the heating element and on the flow of the fluid. A heat gradient exists between any two portions at different temperatures. Of course, the state of the heat gradient changes according to variations in the flow rate. Consequently, information regarding the flow rate can be obtained by detecting the heat gradient. A function of detecting the heat gradient consists of detecting the temperatures at different locations on the thin diamond film and calculating the heat gradient from the temperature difference.

Sixth Invention

A sixth invention of the present application lies in a method of measuring a flow rate by the use of a flow detector comprising a layer and a heating element. The layer is formed on the surface of a thin film of diamond and acts as a thermistor. The heating element is heated by AC waveforms. The output from the layer acting as a thermistor in response to the heating is arithmetically processed to thereby calculate the flow rate of the fluid flowing while in contact with the diamond film.

Seventh Invention

A seventh invention of the present application lies in a method of detecting the flow rate of a fluid by the use of a flow detector comprising a thin film of diamond, plural layers formed on the thin film and acting as a thermistor, and a heating element. The thin film of diamond is brought into contact with the fluid. A heat gradient created across the diamond film by the heating element is measured. The flow rate is determined from the magnitude of the heat gradient. The direction of the fluid is determined from the direction of the heat gradient. Changes in the flow rate can be known from the manner in which the heat gradient changes.

The flow rate of the fluid is determined from the magnitude of the heat gradient by calculating the flow rate from the magnitude of the heat gradient created according to the flow rate of the fluid. The direction of the fluid is determined from the direction of the heat gradient by utilizing the fact that the direction of the heat gradient is determined by the direction of the fluid. Changes in the flow rate can be known from how the heat gradient changes by calculating a change in the flow rate from a change in the heat gradient reflecting the flow rate.

In the inventions described above, quite great advantages can be had by forming one or more layers acting as a thermistor on one surface of the thin film of diamond and bringing the other surface into contact with the fluid, for the following reasons. Thermal action of the thin diamond film is utilized. At the same time, the structure prevents the fluid from corroding or deteriorating conductive interconnects or the like formed on the layer acting as a thermistor.

The present invention makes use of inactivity, a high thermal conductivity (about 20 W/cm·deg), and a low specific heat (1.8 J/cm$^3$·deg) which are features of diamond. Inactivity means that diamond is stable against various corrosive fluids. That is, diamond is resistant to corrosion. In the present invention, a thin film of diamond is doped with boron to control the resistivity value of the diamond film and to impart the function of a thermistor to the instrument. The invention exploits this function of a thermistor.

One example of a fundamental flow detector according to the present invention is shown in FIG. 1, (A)–(C). FIG. 1(B) is a cross section taken along line A–A' of FIG. 1(A). FIG. 1(C) is a cross section taken along line B–B' of FIG. 1(A). A heating element 11, a pair of electrodes 10 for supplying an electrical current to the heating element, a thermistor layer 12 acting as a flowmeter, and a pair of metal electrodes 15 for obtaining an output from the thermistor layer 12 are formed on the thin diamond layer 13. It is necessary that this thermistor layer 12 act as a high-sensitivity thermometer. In FIG. 1(A), the thin diamond film 13 is exposed between the heating element 11 and the thermistor layer 12 because they are separated by a groove as shown in FIG. 1(C). In this structure, the heating element 11 is not in direct contact with the thermistor layer 12. Rather, they are thermally coupled together via the diamond film 13.

The thin diamond film 13 is formed up to a thickness of about 10 $\mu$m by CVD. Boron ions are implanted into the surface of the thin film 13 by ion implantation techniques. As a result, a p-type semiconductor layer approximately 0.1 $\mu$m thick is formed as the thermistor layer 12. The heating element 11 is also formed by making use of this layer doped with boron ions. In this way, the flow detector shown in FIG. 1, (A)–(C), comprises the thin diamond film 13 acting as a base, a thermistor layer 12, and the heating element 11 to form an integrated structure. The thermistor layer 12 has a p-type semiconductor layer of diamond having a thickness of about one hundredth of the thickness of the thin film 13 on the surface of the thin film 13.

The flow detector can be used in various locations. Therefore, the temperature $T_0$ of the fluid may vary in a short time. As mentioned above, the difference between the temperature T of the flow detector and the temperature $T_0$ of the fluid is important for measurement of the flow rate. If the fluid temperature $T_0$ changes due to a change in the ambient temperature, it follows that the difference $T-T_0$ changes. In this case, if the measured difference $T-T_0$ is very small, or if a change in this difference should be measured, then a large measuring error or a sensitivity change appears. Therefore, a method of detecting flow rates without being affected by ambient temperature variations is needed.

To cope with this problem, the invention is characterized in that a thermistor acting as a flow detector is heated by AC waves. The amount of heat consumed by the thermistor is modulated with frequency w, as given by W exp(iwt). Therefore, Eq. (1) is modified into the following form:

$$W \exp(iwt) = C\ (\Delta T/\Delta t) + (G+K)\ (T-T_0) \qquad (9)$$

where $\Delta T/\Delta t$ is a minute change in the temperature of the thermistor, C is the heat capacity of the thermistor, G is the heat conductivity of the thermistor, and K is a coefficient of heat conduction indicating heat carried away by a fluid. That is, like symbols have like meanings both in Eqs. (8) and (9). In this method using AC heating, T is measured from the output from the thermistor. The coefficient K is found, using Eq. (9). Then, the flow rate is calculated, using a relational formula $K = K_0 \sqrt{u}$. $\Delta T$ measured by the flow detector is given by Eq. (10) below $$\Delta T = W_0/(G+K)(1+w^2\tau^2) \qquad (10)$$

where $\tau$ is the above-described time constant defined by $\tau = C/(G+K)$.

The operation of the instrument shown in FIG. 1, (A)–(C), is now described, the instrument forming one example of a flow detector according to the present invention. As shown in FIG. 1, (A)–(C), the flow detector comprises the thin film of diamond 13, the thermistor 12 formed on the thin film 13 and using this thin film 13, and the heating element 11. These components 11–13 are integrated in one unit. The thin film 13 acts as the base of the instrument and made of diamond which has a low specific heat and a high heat conductivity. Thus, heat is transferred among the components uniformly and quickly. For example, diamond has a heat conductivity more than 10 times as large as that of silicon.

In the flow detector shown in FIG. 1, (A)–(C), only the thermistor layer 12 acts only as a temperature sensor. The other portions act as good thermal conductors in a sense. More specifically, since the bottom surface 17 is in contact with a fluid 16, heat is carried away by the fluid 16 through the bottom surface 17 which is opposite to the surface of the thin diamond film 13 on which the thermistor layer 12 and the heating element 11 are formed.

In actual operation, heat generated by the heating element 11 is carried away by the fluid 16 at the bottom surface 17 of the thin diamond film 13 which is in contact with the fluid 16. As a result, the temperature T of the thermistor 12 defined by Eq. (8) is determined.

Diamond has a high Debye temperature of 2240 K and a small specific heat of 1.8 J/cm$^3$·deg. Therefore, the heat capacity of the thermistor layer 12 is quite small. In this case, consequently, high-speed response can be obtained.

Where the thermistor layer 12 acting as a flow detector is integrated with the thin diamond film 13 as shown in FIG. 1, (A)–(C), the diamond film 13 having a thickness (10 $\mu$m) 100 times as large as the thickness (0.1 $\mu$m) of the thermistor layer 12 and in contact with the thermistor layer 12 acts as a heat storage layer. For example, where the amount of heat K (T−T$_0$) carried away from the thermistor layer by the fluid varies greatly, it has been impossible for the prior art techniques to cope with the resulting variations in the situation. In consequence, Eq. (8) no longer holds. In the structure shown in FIG. 1, (A)–(C), the thin diamond film 13 quickly responds to changes in the heat amount K (T−T$_0$) and supplies heat to the thermistor layer. Consequently, Eq. (8) is satisfied quickly. A situation in which the temperature of the thermistor depends on the flow rate is quickly realized. That is, the diamond film 13 serving as a heat storage layer acts as a quickly responding heat source. As mentioned above, since diamond has a high thermal conductivity (about 20 W/cm·deg) and a low specific heat (1.8 J/cm$^3$·deg), heat flows into the thermistor layer 12 from the thin diamond film 13 rapidly.

The heat storage layer consisting of this thin diamond film 13 acts passively and supplies an appropriate amount of heat to the thermistor layer 12 according to the condition. The heat storage layer always acts to correct deviation from the thermal equilibrium state given by Eq. (8). More specifically, the fluid 16 is thermally coupled to the thermistor layer 12 and even to the heating element 11 by the thin diamond layer 13 having a much higher heat conductivity than the fluid 16. When the heating element 11 heats the structure, the thermistor layer 12 is efficiently heated via the thin diamond layer 13 that is a heat storage layer. The diamond layer 13 is about 100 times as thick as the thermistor layer 12 and so the diamond layer 13 has a heat capacity about 100 times as large as the heat capacity of the thermistor layer 12. Therefore, whether the flow rate of the fluid 16 increases slightly or greatly, an amount of heat optimum for realization of a thermal equilibrium state is quickly supplied to the thermistor layer 12 from the diamond layer 13 according to the changing flow rate. A condition satisfying Eq. (8) is accomplished quickly.

In the prior art structure, a heating element is directly used as a heat source for supplying heat to the thermistor. Any component has not existed which supplies heat to the thermistor according to the changing conditions (e.g., temperature variations or flow rate variations of the fluid) to satisfy Eq. (8) at all times, for maintaining a thermal equilibrium state in the thermistor.

When the flow rate drops rapidly, the thermistor layer 12 responds quickly to the decrease in the amount of heat carried away in response to the change in the flow rate because the heat capacity of the thermistor layer 12 is quite small. At this time, the heat storage layer consisting of the thin diamond layer 13 acting passively does not supply excessive heat to the thermistor layer 12. Hence, the thermal equilibrium state is not lost since the heat storage layer operates to maintain the thermal equilibrium state between the thin diamond layer 13 and the thermistor layer 12 which are integral with each other.

In this case, if the amount of heat carried away from the thermistor layer 12 by the fluid decreases, the amount of heat required by the thermistor layer 12 to maintain the thermal equilibrium state decreases. Since the diamond film 13 is thermally coupled to the thermistor layer 12 and acts to maintain the thermal equilibrium state in the thermistor layer 12, the amount of heat just required by the thermistor layer 12 is supplied from the diamond film 13.

As described thus far, the heat storage layer made of the thin diamond layer 13 maintains the thermal equilibrium state, i.e., always satisfies Eq. (8), without being affected by variations in the flow rate. Therefore, in measurement of a flow rate, the temperature of the thermistor layer 12 correctly reflects the temperature of the fluid 16. As a result, the flow rate can be precisely measured.

The operation of each component of the structure shown in FIG. 1, (A)–(C), is described next.

As given by Eq. (8), the sensitivity of the flow detector is proportional to the difference between the temperature T of the thermistor and the temperature T$_0$ of the fluid, i.e., T−T$_0$, We now discuss a situation in which heat is carried off from the surface 17 of the thin diamond film 13 by the fluid 16. Since heat is removed from the surface 17 of the diamond film 13, the surface 17 assumes a temperature approximating the temperature T$_0$ of the fluid 16. The amount of heat removed is supplemented quickly by the heat storage layer, or the diamond film 13 and, therefore, the temperature of the portion of the diamond film 13 in contact with the thermistor 12 does not change greatly. A heat gradient is created across the diamond film 13 as indicated by the arrow 18, i.e., temperature rises in the direction indicated by the arrow. In this way, the difference between the temperature T of the thermistor layer 12 and the temperature T$_0$ of the fluid can be made large. Of course, it is important that the thin diamond film 13 act to satisfy Eq. (8).

Therefore, as already discussed using Eq. (8), the sensitivity of the flow detector can be enhanced substantially. That is, the same effects can be obtained as when the heat conductivity G of Eq. (8) apparently decreased.

In the present invention, the heat capacity of the thermistor itself can be made quite small and so high-speed response can be realized along with the above-described high sensitivity. In particular, a value sufficiently close to 20 W/cm·K which can be anticipated-from the physical properties of diamond can be obtained as the heat conductivity of the flow detector. At the same time, the heat capacity of the thermistor can be set to a quite small value sufficiently close to 20 μJ/K while taking the size of the thermistor as 1 cm×1 cm×0.1 μm. This quite small value can be anticipated from the physical properties of diamond itself. Consequently, in the time constant τ=C/(G+K) which represents the response speed, the heat conductivity G can be set large, and the heat capacity C can be set small. As a result, 7 can be made small. Hence, high-speed response can be accomplished. If we assume that G=20 W·cm/K and C=20 μJ/K, then τ=10$^{-6}$ second.

The present invention is constructed as described thus far. Thus, a high sensitivity which would be obtained when the heat conductance decreased apparently can be derived. At the same time, high response can be obtained. In consequence, these two items which would have been conflicting parameters in the prior art techniques are made compatible with each other.

The operation described thus far is made possible by the structure shown in FIG. 1, (A)–(C). That is, the thermistor layer 12 acting as a flow detector and the heating element 11 are integrally formed on the thin diamond film 13. The heat capacity of the diamond film 13 serving as a heat storage layer is made large compared with the heat capacity of the thermistor layer 12. Therefore, if the heat capacity of the diamond film 13 acting as a heat storage layer is not larger than the heat capacity of the thermistor layer 12, then the diamond film 13 will not act as a heat storage layer responding quickly to temperature variations of the thermistor layer 12. As a result, expected results will not be obtained.

In the description made above, both heating element and thermistor layer are mounted on one surface of the thin diamond film acting as a heat storage layer. The fluid flows along the other surface, or the bottom surface. The same principle can be applied with similar utility to a structure where the fluid flows along the surface on which both heating element and thermistor layer are mounted.

Since a heat gradient is also created in the direction parallel to the plane of the thin diamond film, plural thermistors may be formed so as to detect every heat gradient formed along the diamond film. The flow rate, a change in the flow rate, and the direction of the flow can be determined simultaneously from information regarding the heat gradients. In this case, the flow rate can be computed from the magnitudes of the heat gradients. A change in the flow rate may be calculated from changes in the heat gradients. The direction of the flow can be determined from the directions of the heat gradients.

In the example of FIG. 1, (A)–(C), the surface 17 of the thin diamond film 13 which is in contact with the fluid 16 can be taken as a rough surface in crystal growth using CVD. Since the surface 17 has microscopic irregularities, the surface area can be made substantially large. In this structure, therefore, the fluid 16 carries heat away efficiently from the surface 17. This structure in which the rough surface of the diamond surface is taken as a surface in contact with the fluid is equivalent to increasing the value of K (T-T$_0$) of Eq. (8) which indicates the amount of heat carried away by the fluid. In consequence, the substantial sensitivity can be enhanced in detecting the flow rate.

This makes use of the facts that the surface in contact with the substrate (e.g., a silicon substrate) on which a thin diamond film is grown is smooth and that the opposite surface exposed during the growth of the diamond film has small microscopic irregularities on the order of 100 Å. In this case, the thermistor, the heating element, electrodes, conductive interconnects, and other parts are formed on the smooth surface. This makes it easy to fabricate the instrument.

A measurement can be made without being affected by variations in the ambient temperature by measuring variations in the temperature of the detector portion, or the thermistor, varying according to variations in the heating element by the use of AC driving heating as given by Eq. (2). In particular, heat constantly varying like AC waves is generated by the thermistor so as not to measure variations in the ambient temperature or variations in the temperature of the fluid. Then, ΔT/Δt which is a change in the temperature of the thermistor in a minute time is measured. The amount of heat carried away by the fluid can be determined from the measured value without being affected by the temperature of the fluid or by the ambient temperature. the flowmeter shown in FIG. 1, (A)–(C), a given bias voltage was applied to the resistor 12. The heating element 11 was heated, and the flow rate of fluid, or nitrogen, 16 flowing across the rear surface 17 of the thin diamond film was measured. The results are shown in FIG. 2. The resistances of the resistor 12 and of the heating element 11 were set to about 1 kΩ and about 100 Ω, respectively, by adjusting the areas of the resistors. Data listed in FIG. 2 was obtained by making a measurement in which the heating element 11 was driven by AC waves to prevent the heating element from being affected by the ambient temperature. In FIG. 2, the square root of flow velocity (cm/s) is plotted on the horizontal axis. The output from the thermistor was transformed into a voltage and amplified by an amplifier. The output from this amplifier was plotted on the vertical axis.

Let A (cm$^2$) be the cross-sectional area of the fluid. It can be seen from FIG. 17 that the minimum measurable flow rate is less than 1×A (cm$^3$/s) and the maximum measurable flow rate is about 25×A (cm$^3$/s). Therefore, the dynamic range has three or more orders of magnitude. Actual measurement has shown that the response speed was on the order of 50 ms. Consequently, it was demonstrated that high-speed response could be obtained.

We consider that the aforementioned large dynamic range, i.e., a large measuring range, arises because the thin diamond film 13 acts as a heat storage layer and thus a thermal equilibrium state according to the flow rate is realized quickly. In other words, the diamond film 13 is operated as a heat sensor having a large dynamic range, and the temperature of this heat sensor is detected by the resistor 12. In addition, this structure functions effectively.

Especially, the heating element 11 and the resistor 12 are mainly thermally coupled to the thin diamond film 13. It is important that most of the heat generated by the heating element flow into the diamond film and that most of heat carried away from the diamond film be carried off by the fluid 16.

These points are essentially different from the flow detector described in the above-cited Sensors and Materials, 2, 6 (1991), pp. 329–346. In the structure described in this reference, a heating element and a sensor portion (which can be taken as a thermally sensitive resistor) are formed in a silicon substrate. The heating element and the sensor portion are thermally coupled to a part of a thin diamond film and also to the silicon substrate.

Since the heating element and the sensor portion are thermally coupled to the silicon substrate, a major part of the heat generated by the heating element also flows into the silicon substrate. As a result, the amount of heat detected by the sensor portion is an amount of heat conducted through the silicon substrate. Therefore, it is impossible that only the amount of heat carried away from the thin diamond film is effectively detected by the sensor portion. Since the sensor portion is formed in the silicon substrate, what is measured by the sensor portion is not the temperature of the diamond film but the temperature of the silicon substrate. Again, it is impossible to precisely evaluate the amount of heat carried away from the diamond film.

Furthermore, the heating efficiency is poor because a large amount of heat escapes from the heating element into the silicon substrate. Hence, this known structure is not practical.

In the structure shown in FIG. 1, (A)–(C), almost all the amount of heat supplied from the heating element 11 is supplied to the thin diamond film 13. The resistor 12 that is also a temperature-sensing resistor is mainly thermally coupled only to the diamond film 13. In consequence, the output from the resistor 12 can correctly reflect the amount of heat carried away by the fluid.

In other words, it is very important to arrange so that the temperature of the diamond thin film 13 is measured by the resistor 12 to measure the flow rate of the fluid flowing in contact with the diamond thin film.

As described above, the mass flow sensor having a large dynamic range may be obtained by disposing the resistor (temperature sensing resistor) and exothermic body so as to be thermally coupled only with the diamond thin film to measure only the temperature of the diamond thin film by the resistor.

However, when a long time measurement of more than several minutes was carried out using the mass flow sensor shown in FIG. 1, a phenomenon was observed in which outputs from the resistor 12 change bit by bit even the flow rate was the same (hereinafter this is referred to as DC drift). When this DC drift exists, a measuring accuracy is lowered even if a measuring sensitivity is high. That is, a reliability of measured values is lowered.

Here the measuring sensitivity indicates that how much the outputs of the resistor vary corresponding to changes of flow rate. The measuring accuracy indicates a reliability of measured values.

This DC drift is considered to be caused by a quantity of heat escaping from the substrate for holding the diamond thin film 13 and wiring leads (gold wires). Although the quantity of heat escaping from the substrate for holding the diamond thin film 13 is small as compare to the quantity of heat taken away by the fluid 16, the component of the DC drift appears in the outputs from the resistor 12 in a measurement of more than several minutes or several tens of minutes. In concrete, the outputs from the resistor 12 drift regardless of the flow rate even though it is a very little.

By the way, though it has been shown from an experiment that the minimum response time of the mass flow sensor shown in FIG. 1 is about 50 msec., a response time of the diamond thin film itself to heat is estimated to be about several msec. This difference is also considered to be caused by the heat escaping to the aforementioned substrate and leads. That is, it may be considered that an influence of the substrate and leads having a longer response time than that of the diamond thin film is appearing in it.

Accordingly, it is an object of the present invention to suppress the fluctuation of measured values due to the DC drift to measure a flow rate in a high reliability.

It is also another important object of the present invention to measure a flow rate in a wide measuring range and in a high measuring accuracy.

The present invention was achieved by noticing on that when a fluid is flown in contact with a diamond thin film, the diamond thin film itself responds thermally to changes of flow rate of the fluid. In concrete, the basic concept is that thermal effects which the thin film material receives corresponding to variations of flow rate of the fluid are quantitatively evaluated by measuring response characteristics of the diamond thin film to heat to calculate the quantity of heat taken away from the diamond thin film by the fluid from the response characteristics.

Now the main inventions will be explained. By the way, in the inventions described below, a significant point is that the resistor (temperature sensing resistor) is disposed on the surface of the diamond thin film to detect the temperature of the diamond thin film. Therefore, although it is necessary to consider the problems of sensitivity, stability and productivity, in principle s thermistor generally used or a thermally sensitive resistor such as platinum may be employed. In the description below, a resistor having a function for measuring temperature utilizing that its resistance changes in corresponding to temperature is generally called as a temperature sensing resistor (thermally sensitive resistor). Accordingly, a thermistor shall be included in the category of the temperature sensing resistor.

Eighth Invention

The eighth invention is characterized in that the resistor having a function for measuring temperature of the diamond thin film is disposed on one surface of the diamond thin film and at least the other surface of the diamond thin film contacts with the fluid.

In such an arrangement, generally a polycrystal diamond thin film formed by CVD is used. Of course, a diamond thin film fabricated by other methods may be used.

Although the resistor may function as an exothermic body, it is basically used for detecting the changes of temperature of the diamond thin film by changes of its resistance. That is, the resistor has to function at least as a temperature sensing resistor. Various thermistors and various metals may be used for the resistor. Basically, any such material whose resistance value changes in corresponding to temperature may be used.

It is important for the resistor to have the function for measuring temperature of the diamond thin film. The resistor must not detect changes of temperature of materials other than the diamond thin film in order to detect the temperature of the diamond thin film accurately by the changes of resistance value of the resistor. Accordingly, the resistor must be arranged so as not to contact with such material that has a high thermal conductivity (such as silicon) other than the diamond thin film. Especially, the resistor must not contact with materials other than the diamond thin film, having a higher heat capacity and higher thermal conductivity than the resistor.

On the other hand, even if the resistor contacts with a material (substance) other than the diamond thin film, an effect of the material to the temperature of the diamond thin film detected by the resistor is negligible if a thermal conductivity of the material is very small or its heat capacity is fully small.

For example, when the resistor is exposed to air, its effect is negligible because the thermal conductivity of air is very small as compare to the thermal conductivity of the diamond thin film. Further, although wiring is provided to the resistor, it will not directly damage the function of the resistor for measuring the temperature of the diamond thin film because a heat capacity of wiring is very small as compare to that of the resistor.

In any case, it must be arranged so that the resistor will not measure temperature of materials other than the diamond thin film. In concrete, it is necessary to arrange so that the resistor contacts only with the diamond thin film.

When a protection film or the like needs to be provided on the surface of the resistor, the condition that the resistor is thermally coupled only with the diamond thin film may be maintained by using a material that meets at least one of the following two conditions:

(1) have a thermal conductivity of less than 1/100 of the diamond thin film, and
(2) have a fully small heat capacity as compare to that of the diamond thin film (less than 1/100).

The changes of temperature of the diamond thin film may be detected in high accuracy and heat taken away from the diamond thin film to the fluid may be correctly evaluated by thermally coupling the resistor only with the diamond thin film in such manner.

Further, if the fluid is flown only through the other surface of the diamond thin film (on the side where the resistor is not disposed), the resistor and wires are not exposed to the fluid and thereby the problem of corrosion of the electrodes and wires caused by the fluid may be solved. When the corrosion of the electrodes and wires is out of question, the both surfaces of the diamond thin film may be of course contacted with the fluid.

Ninth Invention

The ninth invention is characterized in that the resistor is thermally coupled only with the diamond thin film. It is done so to prevent the resistor from sensing changes of temperature of other materials than the diamond thin film as described in the explanation of the aforementioned eighth invention.

As described in the explanations of the eighth and ninth inventions, it is necessary to accurately evaluate the quantity of heat taken away from the diamond thin film by the fluid to accurately measure the flow rate and for that end, it is necessary to realize a circumstance in which the resistor (temperature sensing resistor) is thermally coupled only with the diamond thin film and a thermal coupling of the resistor with other materials is negligible as compare to that with the diamond thin film.

10th Invention

The tenth invention is characterized in that the diamond thin film is held by the substrate while being thermally insulated.

When a quantity of heat is taken away from the diamond thin film by the fluid, temperature of the diamond thin film changes sensitively. A flow rate may be measured by detecting the changes of temperature by the resistor (temperature sensing resistor) provided in contact with the diamond thin film. Accordingly, when a quantity of heat is lost from the diamond thin film to other materials than the fluid, the changes of temperature of the diamond thin film detected by the resistor includes that caused by the quantity of heat escaping to other materials than the fluid.

From a viewpoint of measuring a flow rate, this represents a substantial drop of a sensitivity. It is because, since the quantity of heat escaping from the diamond thin film to other materials than the fluid also changes corresponding to changes of flow rate or the like, the changes of temperature of the diamond thin film will not correspond to the flow rate when the quantity of heat taken away from the diamond thin film to the other materials than the fluid is greater than that taken away from the diamond thin film by the fluid. This problem becomes significant especially when the flow rate finely changes.

Then it is necessary to minimize the quantity of heat escaping from the diamond thin film to other materials than the fluid. Ultimately, it is ideal to float the diamond thin film on which the resistor (comprising the temperature sensing resistor and exothermic body) is disposed totally freely within a fluid. However, means for holding the diamond thin film and wiring to the resistor are indispensable and the loss of heat through them cannot be totally eliminated. However, if the heat lost to others than the diamond thin film is minimized as compare to the heat taken away from the diamond thin film to the fluid, a state in which the diamond thin film is thermally insulated from the substrate may be substantially realized and the quantity of heat taken away by the fluid may be accurately evaluated.

In concrete, the aforementioned goal may be realized by using a teflon or organic resin substrate whose thermal conductivity is very small for the substrate for holding the diamond thin film. For the material having a small thermal conductivity, the influence may be considerably reduced if a material whose thermal conductivity is less than 1 ($Wm^{-1} K^{-1}$) is selected, because a difference between its thermal conductivity and that of the diamond thin film becomes more than 1000 times.

It is also useful to minimize contact points of the diamond thin film and the substrate for holding the diamond thin film to minimize the quantity of heat conducted from the diamond thin film to the substrate.

When a material having a large thermal conductivity such as a silicon substrate is used, the diamond thin film may be substantially thermally insulated from the substrate by oxidizing or nitriding the portion for holding the diamond thin film to reduce its thermal conductivity and by minimizing the contact area with the diamond thin film.

11th Invention

The eleventh invention is characterized in that in the arrangement in which only one surface of the diamond thin film contacts with the fluid and a resistor which functions as a temperature sensing resistor thermally coupled only with the diamond thin film or as an exothermic body is provided on the other surface, the one surface of the diamond thin film contacting with the fluid is the final crystal growth surface of the diamond thin film.

The diamond thin film formed by plasma CVD has a polycrystal diamond structure and a fine irregularity exists on the surface thereof. The surface contacting with the substrate (mainly a silicon substrate is used) has a smooth surface. Accordingly, an efficiency of heat exchange between the fluid may be improved and the quantity of heat taken away by the fluid may be accurately evaluated by arranging so that the final crystal growth surface having the irregularity contacts with the fluid.

Further, because the resistor is disposed on the surface on the opposite side from the final crystal growth surface, i.e. on the initial crystal growth surface which is smooth, the circuit may be readily disposed.

12th Invention

The twelfth invention is characterized in that an exothermic body and thermosensible body are provided on the diamond thin film and the exothermic body and the thermosensible body are thermally coupled only through the diamond thin film.

For the exothermic body, a resistor which generates heat by Joule heat may be used. For the thermosensible body, a temperature sensing resistor whose resistance value changes by temperature may be used. For example, a platinum thin film may be used as the resistor and it may be fabricated discriminately as an exothermic body and a temperature sensing resistor (thermosensible body) by presetting its resistance value discriminately.

In the 12th invention, the significant point is that the exothermic body and the thermosensible body are thermally coupled only through the diamond thin film. A quantity of heat is supplied from the exothermic body to the diamond thin film and a part of the heat is taken away from the diamond thin film by the fluid. Temperature of the diamond thin film is determined corresponding to the quantity of heat taken away by the fluid. Accordingly, the flow rate may be calculated by detecting the temperature of the diamond thin film or the changes of temperature thereof by the thermosensible body.

In this case, the thermosensible body must only detect the temperature of the diamond thin film in order to improve the accuracy of the measurement of the flow rate. In order for that, a quantity of heat reaching to the thermosensible body from the exothermic body via materials other than the diamond thin film must be minimized.

For example, when the exothermic body and thermosensible body contact (thermally coupled) with a material having a high thermal conductivity such as silicon other than the diamond thin film, the temperature sensed by the thermosensible body includes not only the temperature of the diamond thin film, but also that of the material having such high thermal conductivity heated by the heating. Then, in this case, the temperature sensed by the thermosensible body does not reflect the quantity of heat taken away from the diamond thin film by the fluid. That is, an output that accurately reflects the flow rate cannot be obtained from the thermosensible body.

Accordingly, the exothermic body and the thermosensible body must be thermally coupled only through the diamond thin film that contacts with the fluid.

13th Invention

The thirteenth invention is characterized in that the exothermic body and thermosensible body are provided in contact with the diamond thin film, that the exothermic body has a function to heat pulsewise and that the thermosensible body has a function to sense changes of temperature of the diamond thin film caused by the pulsewise heating from the exothermic body.

The flow rate may be measured very accurately by sensing the changes of temperature of the diamond thin film that correspond to the heat pulse (the measurement of the flow rate by means of the heat pulse will be described later in detail). By adopting the aforementioned arrangement, a mass flow sensor may be obtained which allows to accurately measure the flow rate in a larger dynamic range and to measure a mixed ratio of a mixed fluid in which a plurality of fluids are mixed, types of the fluids, concentration of contents within the fluid and others.

14th Invention

The fourteenth invention is characterized in that a diamond semiconductor having one conductive type is provided on one surface of the diamond thin film and that the diamond semiconductor functions as an exothermic body.

In order to detect a flow rate of a fluid flowing in contact with the diamond thin film, it is useful to supply a quantity of heat to the diamond thin film and to sense the temperature of the diamond thin film which corresponds to a quantity of heat taken away from the diamond thin film by a temperature sensing resistor.

In this case, means for supplying the heat to the diamond thin film includes an arrangement in which a current is flown to a resistor to utilize Joule heat generated by the resistor. When the resistor was formed by a platinum thin film formed by vapor deposition on the surface of the diamond thin film for example, it was observed that the diamond thin film moves wavily when the resistor is heated pulsewise by a pulsewise current (intermittent current). It is considered to have been caused by a difference between the thermal expansion coefficient of the diamond thin film and that of the platinum thin film during the instantaneous heating and cooling thereafter.

Because wires are connected to the resistor which functions as the exothermic body and the resistor for sensing temperature is often disposed on the surface of the diamond thin film, there is a high risk of the wires being cut or of the connection parts being disconnected if the diamond thin film moves wavily every time when it is heated pulsewise. Further, noise may be generated in the current flowing through the resistor due to the mechanical vibration.

On the other hand, such wavy motion of the diamond thin film as described above was not observed even when heated pulsewise when B was ion implanted on the surface of the diamond thin film to form a P-type diamond semiconductor layer and to use it as an exothermic body. It is considered to have happened because there is almost no difference between the thermal stress of the exothermic body and that of the diamond thin film and due to that, the diamond thin film would not warp.

15th Invention

The fifteenth invention is characterized in that one surface of the diamond thin film forms a part of the inner wall of a passage for flowing a fluid.

In the above construction, the passage for flowing the fluid may be for example a pipe through which fluid flows. What is important in the above construction is that a mass flow sensor integrated with the passage (e.g. a pipe) may be provided in the passage by constructing the part of the inner wall of the passage through which the fluid flows by the diamond thin film and by disposing the resistor on the surface of the other side of the diamond thin film which does not contact with the fluid. By doing so, a construction which permits to measure the flow rate without disturbing a flow of the fluid may be realized.

Further, as described later, in order to cause the fluid to take away heat effectively from the diamond thin film, it is useful to tilt the diamond thin film more or less against the flow of the fluid so that the fluid readily hits the diamond thin film, not placing the surface of the diamond thin film in parallel to the flow of the fluid. Such arrangement may be included in the arrangement of the fifteenth invention that "one surface of the diamond thin film forms a part of the inner wall of the passage." That is, the flat surface of the diamond thin film needs not to form the totally same surface with the inner wall of the passage necessarily.

16th Invention

The sixteenth invention is characterized in that a passage section in which a mass flow sensor using the diamond thin film is provided is divided into a plurality of passages.

The passage section is divided to reduce Reynolds number at the mass flow sensor section to less than 2000, as described later. Reynolds number is reduced to less than 2000 because a flow becomes unstable and the accuracy of the flow rate measurement drops if Reynolds number is in between 2000 and 4000.

The sixteenth invention presupposes of course that the flow rate measuring range is within the range of $R_e$=2000 to 4000. That is, the present invention is important in that it allows to reduce the maximum value of $R_e$ to less than 2000 by adopting the arrangement of the sixteenth invention when $R_e$=2000 to 4000.

The adoption of the structure of the sixteenth invention allows to reduce $R_e \leq 2000$ by the following reason.

Reynolds number $R_e$ is represented as $R_e$=dV/v, where the passage is a circular pipe of d in diameter, V is a flow velocity and v is a kinematic viscosity. When the passage is divided here, it means that diameter d is substantially reduced, so that the value of $R_e$ may be reduced.

For example, when a circular pipe is adopted for the passage of the fluid, dividing the inside of the pipe into quarters will reduce the sectional area of each of divided passage to a quarter, so that when one divided passage is reformed into a circular pipe, its diameter equals to ½ of the pipe undivided. Thereby $R_e$ is reduced to ½ of that before the division.

Accordingly, if $R_e$=500 to 3000 before the passage is divided in the flow rate measuring range of this case, dividing the inside of the pipe into quarters allows to reduce $R_e$ to 250 to 1500 in one divided passage, so that the accuracy of flow rate measurement may be prevented from being lowered due to unstable flows.

Furthermore, the sixteenth invention may be utilized not only in the measurement of flow rate but also in the discrimination of a type of fluid and in checking concentration of contents within the fluid. For example, concentration of contents within the fluid may be measured without being influenced by an unstable flow of $R_e$=2000 to 4000.

17th Invention

The seventeenth invention is characterized in that a fluid which contacts with the mass flow sensor flows nearly in a laminar flow state. According to hydrodynamics, when Reynolds number is less than 2000, a flow turns out to be a laminar flow, when Reynolds number is 2000 to 4000, it is turned into an unstable flow in which turbulent flows are created locally, and when Reynolds number is more than 4000, it turns out to be a perfect turbulent flow which is stable.

That is, a flow is turned into a nearly laminar flow state and a stable measurement can be carried out when Reynolds number of the fluid to be measured in the flow rate measuring range is reduced to less than 2000 by adopting the seventeenth invention. Of course, the measurement in this laminar flow state is useful for other cases than the measurement of the flow rate.

18th Invention

The eighteenth invention is characterized in that Reynolds number of the fluid which contacts with the mass flow sensor is increased to more than 4000. As described above, a stable turbulent flow state may be realized by increasing Reynolds number to more than 4000 and a stable flow rate measurement may be performed by and large.

A sectional area of the passage is narrowed down to increase the flow velocity in order to increase Reynolds number. It is also possible to provide an orifice to choke the fluid and to increase its flow velocity.

However, the increase of Reynolds number to more than 4000 contains such problems as compare to the reduction of Reynolds number to less than 2000 as follows:

(1) the "stable" turbulent flow is a matter of degree and a problem that the diamond thin film vibrates due to the turbulent flow still remains, and (2) the passage of the fluid has to be considerably narrowed down to increase Reynolds number to more than 4000 (in the order of micron for example), which is not realistic structurally.

19th Invention

The nineteenth invention is characterized in that the diamond thin film is disposed at a little angle to a fluid.

FIG. 16 shows an arrangement using this invention. In the figure, a fluid 163 flows in the direction of arrow. A passage 161 for flowing the fluid is an cylindrical pipe in this case. A diamond thin film 162 is placed at an angle of φ to the flow direction of the fluid.

The fluid can contact with the whole surface of the diamond thin film 162 and the fluid can take away heat effectively from the diamond thin film by placing the diamond thin film 162 at the angle of φ. As a result, the sensitivity in a relatively small flow rate range may be improved. However, this invention has a problem that the diamond thin film disturbs the flow of the fluid.

According to the findings of the inventors, the mass flow sensor described in the eighth invention to nineteenth invention above may be used for the discrimination of a type of fluid, measurement of density of a fluid (quantity of diffusing heat differs depending on density), measurement of mixed ratio of a fluid in which a plurality of fluids are mixed and measurement of concentration of contents within a fluid (e.g. measurement of humidity). That is, the mass flow sensor can be used for measurements utilizing that a quantity of heat taken away from the diamond thin film differs depending on; 1) a type of a fluid, 2) density of a fluid, 3) a mixed ratio of a fluid, and 4) a mixture contained in a fluid.

20th Invention

The 20th invention is characterized in that a predetermined quantity of heat is supplied to a thin film material and a flow rate of a fluid flowing in contact with the thin film material is calculated from changes of temperature of the thin film material caused by the heat.

21th Invention

The 21st invention is characterized in that an operating method of a mass flow sensor in which a resistor is provided on one surface of a thin film material has the following steps.

First step: Outputs from the resistor are integrated in time $\Delta t_0$ to find an integrated value $S_0$.

Second step: A specified quantity of heat is supplied to the thin film material. This step is carried out for example by heat pulse.

Third step: The outputs from the resistor which change corresponding to the second step above are integrated in time $\Delta t_2$ to find an integrated value $S_2$.

Fourth step: A difference between the integrated values $S_1$ and $S_2$ are found.

Fifth step: The flow rate of the fluid is calculated from the result of the fourth step.

In the first step, the outputs from the resistor which is a temperature sensing resistor are integrated in a predetermined time to determine a criterion value for measuring the flow rate. The outputs from the resistor fluctuate, though it is very small. That is, the outputs from the resistor contain noise. Then, the outputs from the resistor are integrated in time $\Delta t_0$ cancel out this fluctuation. By doing so, the outputs that fluctuate in the directions of plus and minus are canceled out and the criterion value which is not effected by the fluctuation of the outputs from the resistor may be determined.

The heating carried out in the second step is preferable to be carried out in a short time pulsewise and is generally carried out from an exothermic body provided on the diamond thin film. As a result of the heating, the diamond thin film is heated up in a very short time and the outputs from the resistor change. The changing state of the outputs correspond to the quantity of heat taken away from the thin diamond film. That is, the changing state of the outputs correspond to the flow rate of the fluid.

In the third step, transient response characteristics of the diamond thin film to the heating may be quantitively evaluated by integrating the changing outputs from the resistor. Although the third step is generally carried out in both states in which the diamond thin film is heated up and is cooled down after finishing the heating, it may be carried out only in either state.

Then in the fourth step only the changes of temperature of the diamond thin film that correspond to the heating may be evaluated by finding the difference between the integrated value obtained in the second step and that obtained in the third step. This changes of temperature of the diamond thin film correspond to the flow rate and contain almost no DC drift component, so that the flow rate value which is not effected by the drift component may be calculated from the result of the fourth step in the fifth step.

Although the measurement of the flow rate is carried out through the series of the steps above, because the one cycle of steps from the first to fifth steps is carried out in succession, the measurement of the flow rate is carried out at regular intervals. This flow rate measuring interval (this time is denoted as T here) must not be effected by the heating of the previous step. That is, it is necessary to enter the next series of steps after the changes of temperature of the diamond thin film which correspond to the heating of the diamond thin film in the second step settle down. This interval T is preferable to be more than 10 times of the heating time ($\Delta t_0$) and it has been confirmed experimentally that when $\Delta t_0 = 0.2$ seconds, it is necessary to set T=2 seconds or more to operate stably.

Further, it is very useful to use the diamond thin film for the thin film material as described later.

Principle of Operation

Referring now to the mass flow sensor shown in FIG. 1, the basic principle of operation of the 21st invention will be explained. In this section, a case when the diamond thin film from which remarkable results have been obtained experimentally is used will be mainly explained.

In the mass flow sensor shown in FIG. 1, the exothermic body 11 made of a platinum thin film and the resistor 12 which functions as a temperature sensing resistor and is made of a platinum thin film similarly are provided on one surface of the diamond thin film 13 and the fluid 16 flows in contact with the other surface 17 of the diamond thin film 13.

In the construction shown in FIG. 1, when heat pulse is applied from the exothermic body 11, the heat propagates through the diamond thin film in high speed. This propagation in the diamond thin film is the fastest among that in existing materials. Although the heat conducted from the exothermic body 11 escapes from the back surface 17 and sides of the diamond thin film 13, much of it also reaches to the resistor 12 which is a temperature sensing resistor. The resistor 12 detects the heat conducted as such as the temperature of the diamond thin film 13. This state is thermally an unequilibrium state, and not an equilibrium state. That is, the resistor 12 detects the transient response of the diamond thin film 13 to the heating as the changes of temperature of the diamond thin film.

On the other hand, the fluid 16 flows at the back surface 17 of the diamond thin film 13, and a certain amount of heat is taken away from the diamond thin film by the fluid. The quantity of heat taken away by the fluid depends on the type of the fluid and on the flow velocity (i.e. flow rate). That is, when the flow rate of the fluid 16 changes, the quantity of heat taken away from the back surface 17 of the diamond thin film 13 also changes. This change also influences the quantity of heat arriving to the resistor 12, of course. Accordingly, the transient response characteristics of the diamond thin film 13 to the heating change by the changes of the flow rate of the fluid 16.

That is, though much of the heat conducted to the back surface 17 is reflected by the surface, the reflection rate and how it is reflected depend on the quantity of heat taken away from the back surface 17 by the fluid 16. Then much of the heat conducting within the diamond thin film 13 is reflected by the back surface 17, so that the heat conducted within the diamond thin film 13 is largely influenced by the difference of the flow rate. This influence is effected in very high speed and in high sensitivity by the thermal responsibility which the diamond itself has.

As a result, the movement of the heat pulse supplied from the exothermic body 12 within the diamond thin film (i.e. thermal conductivity) is largely influenced by the flow rate of the fluid 16 which contacts with the back surface 17 and this influence is output as changes of resistance value of the resistor 12 reflecting the changes of temperature of the diamond thin film 13. Then, the flow rate of the fluid 16 may be calculated by processing the outputs from the resistor 12.

Considering thermal influences which the diamond thin film 13 receives from the environment, it is understood that most of them come from the front and back surfaces thereof. It is apparent considering the feature of the thin film. That is, in a case of FIG. 1 for example, although the thickness of the film is shown to be thick, the thickness is actually around several microns to several tens of microns while the size thereof is in the order of mm or more.

It is also understood that in the construction shown in FIG. 1, because the exothermic body 11 and the resistor 12 (temperature sensing resistor) are provided on one surface covering the most of the diamond thin film 13 and the fluid 16 contacts only with the back surface 17 to which the diamond thin film 13 is exposed, the thermal influences which the diamond thin film receives from the outside come mostly from the back surface 17.

Then, it is understood that the influence which the heat moving within the diamond thin film 13 receives comes from the back surface 17 which contacts with the fluid 16. Considering as such, it may be considered that how the heat pulse supplied from the exothermic body 11 is conducted within the diamond thin film or the transient response characteristics of the diamond thin film 13 is determined by the flow rate of the fluid 16.

It is then understood that information on the flow rate of the fluid 16 may be obtained by heating pulsewise the diamond thin film 13 by the exothermic body 11 and by measuring the transient response characteristics of the diamond thin film 13 at that time. In concrete, the flow rate of the fluid 16 may be calculated by processing the changes of temperature of the diamond thin film 13 by the procedure shown in the 21th invention.

Referring now to FIG. 6A, the principle of the measurement will be explained more concretely. Here, the fluid is assumed to be flowing in a constant flow rate. Assume also that in FIG. 6A, heat is applied from the exothermic body 11 during a time from $t_1$ to $t_1+\Delta t_1$. The time $\Delta t_1$ is about 0.2 seconds for example. As a result, the outputs from the resistor 12 change as indicated by a curve 61. That is, because the diamond thin film is gradually heated up when a certain quantity of heat is supplied from the exothermic body 11, the output f(V) thereof changes as indicated by the curve 61. The changes of f(V) indicate the transient responses of the diamond thin film 13 to the heat applied.

As it is apparent from the discussion above, the flow rate of the fluid 16 may be found by quantitively evaluating the transient response characteristics of the diamond thin film 13 to the heat applied, and the transient response characteristics of the diamond thin film 13 is evaluated quantitively by quantitively evaluating the curve 61 which f(V) draws in this case. In concrete, the transient response characteristics of the diamond thin film 13 is quantitively evaluated by finding an area of a figure drawn by the curve 61.

Because some quantity of heat is taken away by the fluid 16 even after the heating from the exothermic body 11 has ended (after $t_1+\Delta t_1$), the output f(V) from the resistor 12 approaches to the original value $f_0$ drawing a curve as indicated by the curve 61 in FIG. 6A. That is, even after the supply of the heat has been finished, the transient response characteristics of the diamond thin film may be evaluated by looking into how the diamond thin film is cooled down.

Thus the response characteristics of the diamond thin film to the heat may be evaluated by quantitively finding how the diamond thin film is heated up and how it is cooled down.

While the curve 61 indicates the changes of the output f(V) from the temperature sensing resistor which corresponds to a certain flow rate, the output f(V) draws such a different curve as indicated by a curve 62 when the flow rate is zero or is small. It is because the diamond thin film is heated up rapidly and is cooled down slowly since less quantity of heat is taken away from the diamond thin film.

Referring now to the following equations, the response characteristics of the diamond thin film to the heat pulse (intermittent heating) will be explained. In the following explanation, $W_0$ denotes a quantity of heat supplied to the diamond thin film by the pulsewise heating in $\Delta t_1$, K a coefficient of thermal conductivity related to a quantity of heat taken away by the fluid, C a thermal capacity of the diamond thin film and G a thermal conductivity of the diamond thin film.

At first, when the parameter of time t meets ($t_1<t<t_1+\Delta t_1$) or during when the heating by means of heat pulse is carried out, Equation (1) below is satisfied. By the way, when $\Delta T/\Delta t=0$ (i.e., constant temperature heating) in Equation (1), it turns out to be Equation (8).

$$W_0 = C\Delta T/\Delta t + (G+K)(T-T_0) \quad (1)$$

In Equation (1) above, T denotes the temperature of the diamond thin film and $T_0$ denotes the temperature of the fluid. Equation (1) above is a differential equation in which the movement of heat in the diamond thin film is considered in a state when the diamond thin film is heated up.

Further, when the parameter of time t meets ($t_1+\Delta t_1<t<T$) or in a state when the heating by the heat pulse has been finished and the diamond thin film is being cooled down, Equation (2) below is satisfied. T denotes a time at which one time of flow rate measurement is finished.

$$0 = C\Delta T/\Delta t + (G+K)(T-T_0) \quad (2)$$

Equation (2) above is a differential equation in which the movement of heat in the diamond thin film is considered in the state when the diamond thin film is cooled down after the heating.

Equation (3) below may be found by solving the above differential equations in ($t_1<t<t_1+\Delta t_1$).

$$\Delta T = W_0(1-\exp(-\alpha t))/(G+K) \quad (3)$$

$$\alpha = (G+K)/C$$

Further, Equation (4) below may be found in ($t_1+\Delta t_1<t<T$).

$$\Delta T = W_0 \exp(-\alpha t)/(G+K) \quad (4)$$

$$\alpha = (G+K)/C$$

$\Delta T$ denotes the changes of temperature of the diamond thin film in Equations (3) and (4) above. The above results show the states when the diamond thin film is heated up rapidly and when it is cooled down rapidly as shown in FIG. 6B.

The heating of the diamond thin film shown in FIG. 6B may be carried out in a short time by increasing the value of $\alpha$. Accordingly, it is useful to use a diamond thin film having a small capacity C and a large thermal conductivity G.

In the discussion above, it is presupposed that the value of $f_0$ is determined by the flow rate. That is, it is presupposed that the value of $f_0$ will not change if the flow rate does not change even in a prolonged flow rate measurement. However, the value of $f_0$ fluctuates in actual operations. This is caused by that the temperature of the diamond thin film 13 gradually changes. The value of $f_0$ fluctuates also by changes of temperature of operating environment (e.g. changes of temperature of the fluid).

This fluctuating component (DC drift component) may be removed by measuring only the transient response characteristics of the diamond thin film to the heat applied. That is, only a variation how the temperature of the diamond thin film changes by the instantaneous heat applied in $\Delta t_1$ should be measured. At this time, although the DC drift component also changes slightly, it is negligible because the changes of temperature of the diamond thin film in the time $\Delta t_1$ is minor.

In concrete, only the variation of f(V) that corresponds to the heat applied may be obtained by integrating the values of $f_0$ just before the heating from the exothermic body 11 for a certain period of time, by integrating the values of f(V) during the heating immediately after that and during cooling also for a certain period of time and by finding a difference between them. The variation of f(V) is found as an amount of integration (integrated value) represented by the hatched portion in FIG. 6A. The variation of f(V) corresponds mainly to the quantity of heat taken away from the surface of the diamond thin film by the fluid and contains almost no DC drift component. The DC drift component questioned here is only the DC drift component generated during the time from immediately before the heating (i.e. $t_1$) to the end of the heating, i.e. $t_1+\Delta t_1$, which causes almost no problem.

The measurement above is especially characterized in that only the variation of f(V) caused by the instantaneous heat applied in $\Delta t_1$ is evaluated.

As described above, the flow rate of the fluid flowing in contact with the surface of the diamond thin film may be accurately measured by heating the diamond thin film instantaneously and by evaluating its response characteristics to the heat applied, or how the diamond thin film is heated up and how it is cooled down.

Significance of Using Diamond Thin Film

A responsibility of a thin film material to heat is evaluated by $\tau = C\rho L^2 / K\pi^2$. This equation is found by neglecting a thermal conductivity in the direction of film thickness and by considering a thermal conductivity in the plane direction by employing a 2-D model. Here, $\tau$ is a parameter indicating a time which the thin film takes for reaching to an equilibrium state from when heat has been added to the thin film. $\tau$ is one of criterion and can be utilized for relative evaluation of values of response time of the thin film to heat, though it does not allow to evaluate the absolute value of the response time.

In the above equation, C denotes a thermal capacity, $\rho$ a density, L a dimension of the thin film (here the thin film is assumed to be square and one side thereof is taken), K a thermal conductivity, and $\pi$ a ratio of the circumference of a circle to its diameter. When $\tau$ of a 4 mm square diamond thin film was evaluated using the equation, it was about 2.2 ms. Also when $\tau$ of a 4 mm square monocrystal silicon thin film was evaluated similarly, it was about 19 ms. It can be concluded from this result that the response time of the diamond thin film to heat is greater than that of the silicon thin film by more than about 8 times. Thus the usefulness of using the diamond thin film in the arrangement of the present invention in which the transient response characteristics due to the heat pulse is evaluated is understood.

Especially a diamond thin film formed by a vapor phase method has a polycrystal state and a crystal structure in which crystal has grown in the direction of film thickness, so that the thermal conductivity in the film thickness direction is expected to be near 2000 ($Wm^{-1}k^{-1}$). Accordingly, the arrangement in which one surface of the diamond thin film contacts with the fluid and the exothermic body and thermosensible body are disposed on the other surface is what utilizes the thermal effect very effectively.

For example, because a thermal conductivity of a monocrystal silicon is about 150 ($Wm^{-1}k^{-1}$) (300 K), a response time is delayed more than 10 times as compare to the case when the diamond thin film is used, in an arrangement in which one surface of the silicon thin film contacts with the fluid and the exothermic body and thermistor are disposed on the other surface. That is, the time necessary for one cycle of steps shown in FIG. 6 is required to be more than 10 times of the case when the diamond thin film is used.

Further, when the silicon thin film is used, it is influenced more by the quantity of heat escaping to others than the fluid in proportional to its low thermal conductivity, so that a measurement accuracy and dynamic range for a small flow rate is lowered remarkably.

As described above, it is very useful to use the diamond thin film for measuring flow rates from the transient response characteristics which corresponds well to heat.

Consideration on Various Materials

Now a case when the measuring method shown in FIG. 6 is used using thin film materials other than the diamond thin film will be considered.

When the measuring method shown in FIG. 6 is adopted, the thin film is required to respond.to rapid heating to improve a sensitivity for detecting flow rates.

The response time may be evaluated by Expression $C\rho L^2 / K\pi^2$ described above. If the response time of the thin film to heat applied is short, the time $\Delta t_1$ in FIG. 6 may be shortened.

Also as seen from Equation 3 or 4, it is useful to increase the value of $\alpha$ to increase the response speed. In the same time, the large value of a means that the sensitivity is high so much. It is because the large value of $\alpha$ means that changes of output from the temperature sensing resistor indicated by the curve 61 in FIG. 6A are sharp and it means that the outputs of the temperature sensing resistor largely change corresponding to slight changes of flow rate.

As shown by $\alpha = ((G+K)/C)$, the greater the thermal conductivity G of the thin film material and the smaller the thermal capacity C thereof, the greater a becomes.

From the above consideration, it is concluded that when a material having a small thermal conductivity and large thermal capacity is used;

1) the values of $\Delta t_1$ and $\Delta t_2$ in FIG. 6 have to be increased because the response time to heat is prolonged (the response speed becomes slow because a becomes small), and
2) the dynamic range of the flow rate measurement is narrowed down because the range of response to heating and cooling is narrow.

However, it is also possible to use other materials than the diamond thin film depending on a flow rate measuring range and measuring sensitivity required. For example, when a monocrystal silicon thin film is used instead of the diamond thin film, although the flow rate measuring accuracy and flow rate measuring range are lowered to less than several tenth as compare to the case when the diamond thin film is used, it is useful to use the silicon thin film from the aspects of productivity and economy when a required flow rate measuring range is 10 slm to 20 slm or when the measuring interval can be several ten seconds.

For the materials other than the monocrystal silicon, silicon carbide, silicon oxide, silicon nitride, mica and silicon in which B or P is doped may be used. Further, their crystal structure may be selected considering characteristics required. Aluminum, aluminum oxide, aluminum nitride, sapphire or the like may be also used. Further, organic resin materials and industrial plastic materials may be used if their low characteristics are permitted.

However, it is desirable to use a material whose thermal conductivity is large and whose thermal capacity is small in order to obtain a high measuring accuracy and large measuring range. Although it is conceivable to use various metallic materials as a material that meets such conditions, the part which contacts with the temperature sensing resistor has to be electrically insulated in such a case.

Further, a thickness of those materials is required to be less than several ten microns. It is because a difference of response speeds caused by a difference of physical properties of materials becomes significant unless a thermal conductivity in the thickness direction of the thin film material is negligible. Generally, the thickness is preferred to be less, than 1/100 of size of the film. For example, a thickness of a 4 mm square thin film is preferred to be less than 40 micron. Of course, the thinner the thickness of the thin film material, the better it is.

Moreover, the thermal capacity of the temperature sensing resistor section is preferable to be small. It is because if a thermal capacity of the thermistor section is large, the response time of the temperature sensing resistor itself to heat is prolonged, thereby lowering the sensing accuracy of the thermal response characteristics of the thin film material to heat pulse. Further, it is because it disallows to sense small changes in the quantity of heat.

The inventors verified the operation by the heat pulse as shown in FIG. 6 by using mica thin film of 5 mm square and 10 micron thick. However, its sensitivity, measuring accuracy and dynamic range were remarkably low as compare to the case when the diamond thin film was used and it was just in a level in which the operation could be confirmed.

As described above, by providing the temperature sensing resistor and exothermic body on one surface of the diamond thin film and contacting the fluid with the other surface, 1) the flow rate of the fluid in contact with the diamond thin film may be found from the outputs of the temperature sensing resistor, and 2) an arrangement may be made in which the temperature sensing resistor, exothermic body and wires are not exposed to the fluid.

Further, in the above arrangement, the flow rate may be measured by supplying a predetermined quantity of heat to the diamond thin film and by evaluating the transient response characteristics at that time from the outputs of the temperature sensing resistor. The DC drift component contained in the outputs may be removed and the flow rate can be accurately found by finding the difference between an integrated value of the outputs from the temperature sensing resistor before the predetermined quantity of heat is supplied and that after it is supplied.

As described above, according to a basic operation method of the present invention, heat is applied intermittently or pulsewise to a thin film material having a high thermal conductivity, and a thermal response characteristics of the thin film material caused by the heat application is measured to evaluate a state in which a fluid in contact with the thin film material takes away heat from the thin film material. The case in which the transient response characteristics shown by the thin film material (in this case a diamond thin film) as heat is applied to it in pulse form are to be evaluated for different fluids (stationary fluids) will now be considered. Because different fluids generally have different thermal conductivities and specific heats, different fluids remove heat from the thin film material in different quantities and at different rates. Therefore, for a given condition of the pulse-form heat supply to it, the heating and cooling of the thin film material, i.e. its transient response characteristics, are different for different fluids. So, because differences between different fluids are reflected in differences in these transient response characteristics, different fluids can be distinguished from each other.

Next, the case in which a solid is put in contact with the thin film material, instead of a fluid, and pulse heating is carried out, will be considered. In this case also, for a given state of the pulse-form heat supply to it, the transient response characteristics manifest by the thin film material will differ according to the thermal conductivity and specific heat of the solid material, and from this it follows that differences in thermal conductivity and specific heat between different solids can be detected and measured by this means.

Furthermore, because the density of a solid and the amount of impurities present in it also affect the thermal conductivity and specific heat of the solid, it is possible to detect and measure differences in these quantities also.

As explained above, by applying heat in pulse form to a thin film material of high thermal conductivity and evaluating the thermal response characteristics displayed by the thin film material as the pulse-form heat is supplied to it, it is possible to detect and measure differences in the thermal conductivity and specific heat of different substances (irrespective of whether the substances are gases, liquids or solids) brought into contact with the thin film material.

Materials having high thermal conductivities and low specific heats can be used for the thin film material in this invention. Materials having thermal conductivities equal to or very close to that of diamond are particularly suitable.

Materials having thermal conductivities relatively close to that of diamond thin film include SiC (silicon carbide), cBN (cubic BN), AlN, BeO and BP. When materials like these are used, compared to cases in which Si is used, characteristics relatively close to those obtained when diamond thin film is used can be expected.

Also, if the ambient temperature is a low temperature of less than 100 K, thermal conductivities of near to or over 1000 (W/mK) can be expected of even Si and SiC, and therefore these materials also can be used instead of diamond thin film.

BRIEF DESCRIPTION OF THE DRAWINGS

FIG. 19 is a side elevation of a flow rate detector according to the invention;

DETAILED DESCRIPTION OF PREFERRED EMBODIMENTS

Preferred embodiments of the present invention will now be described. The embodiments shown below will be described exemplifying an arrangement in which the diamond thin film is used and from which a remarkable effect has been obtained experimentally. However, it is also possible to use other materials in principle when a measuring sensitivity required can be low and measuring range can be narrow and when an economy and productivity are taken into consideration (the diamond thin film is now expensive comparing to other materials).

First Embodiment

A method for fabricating a mass flow sensor shown in FIG. 1 will be explained in this embodiment. In the mass flow sensor shown in FIG. 1, an exothermic body 11 made of a platinum (Pt) thin film, a resistor 12 which functions as a temperature sensing resistor, and their electrodes 10 and 15 are provided on a 4 mm×4 mm polycrystal diamond thin film 13 of 15 micron thick.

Figure 1A:
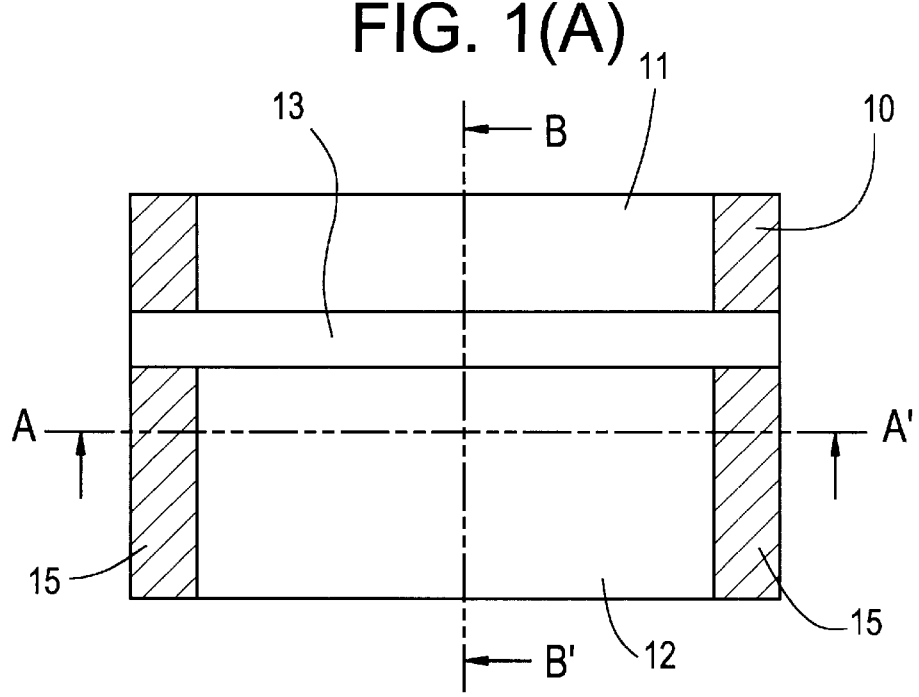
FIGS. 1(A) to 1(C) are schematic cross sections of a flow rate detector according to the invention.
Figure 1B:
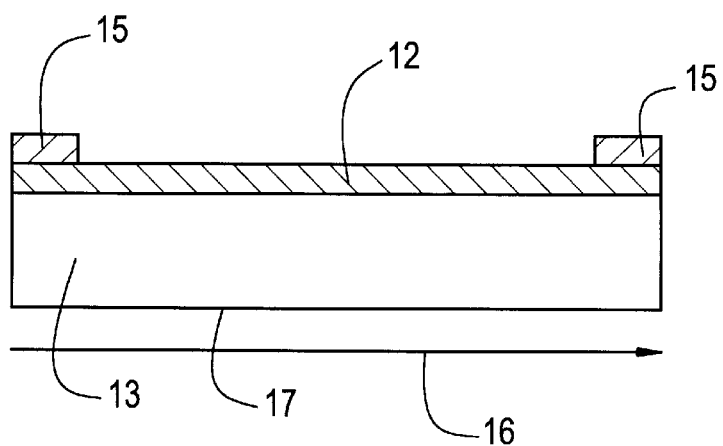
Figure 1C:
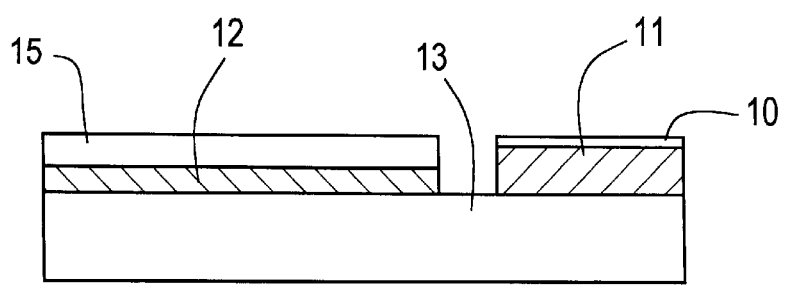

In FIG. 1, FIG. 1B is a section view taken along A–A' in FIG. 1A and FIG. 1C is a section view taken along B–B' in FIG. 1A.

In the sectional view of FIG. 1B, it can be seen that the electric device comprises a diamond film (substrate 13) and a resistor 12 provided on one surface of substrate 13. An opposite surface 17 of substrate 13 is in contact with fluid flow 16.

A process for fabricating the mass flow sensor shown in FIG. 1 will now be explained. At first, a silicon substrate with a diameter of 4 inches is prepared. Then a scratch processing is carried out on the surface of the silicon substrate by diamond powder. A diamond thin film is then synthesized in vapor phase to 15 micron thick on the scratched surface of the silicon substrate by means of a magnetic field microwave CVD method. The magnetic field microwave CVD method allows to form a high density plasma using a strong magnetic field and 2.45 GHz microwave and to synthesize the diamond thin film in vapor phase.

The followings are the film forming conditions;

Substrate temperature: 800° C.

Reaction pressure: 0.25 Torr

Power of microwave: 4 KW

Reaction gas: $CH_3OH:H_2=1:4$

Film forming time: 30 hours

Thickness of film: 15 micron

The silicon substrate was then placed at a position of 875 gauss of field strength. The diamond thin film obtained in the above film forming conditions was a polycrystal diamond thin film in which the crystal grew in the vertical direction from the substrate.

The film forming method is not confined only to the aforementioned method and other vapor phase synthesizing methods may be used. Moreover, it is possible to dope impurities into the diamond thin film to control the thermal characteristics and electrical characteristics. The crystal structure is not also confined only to polycrystal and monocrystal diamond thin film may be used.

The diamond thin film formed on the silicon substrate may be obtained as a simplex diamond thin film by separating from the silicon substrate. This process may be readily carried out by peeling off mechanically or by dissolving the silicon substrate by hydrofluoric acid.

The diamond thin film thus obtained is cut into 4 mm square. Then a platinum thin film is formed on the diamond thin film into a thickness of 800 to 1000 angstroms by sputtering. The sputtering is carried out by using a platinum target and accelerating air which is a sputtering gas to about 1 KeV. A sheet resistance of the platinum thin film thus formed on the diamond thin film is about 100 ohm per sheet.

Then the exothermic body 11 and temperature sensing resistor 12 are formed on the diamond thin film 13 as shown in FIG. 1 by patterning. In concrete, the exothermic body 11 and temperature sensing resistor 12 are created discriminatively by adjusting their areas so that a resistance of the exothermic body 11 becomes about 100 ohm and that of the temperature sensing resistor 12 becomes about 1 K ohm. Or, this discrimination can be made by changing the film thickness of the exothermic body 11 and temperature sensing resistor 12 as shown in FIG. 1C. Then the electrodes 10 and 15 are formed to complete the mass flow sensor shown in FIG. 1.

The above fabrication process can be the basic process even for cases when the number of the temperature sensing resistors and that of the exothermic bodies are changed and when their arrangement is changed.

A thermistor parameter of the temperature sensing resistor 12 made of the platinum thin film shown in FIG. 1 was about 200 ppm. This is equivalent to a resistance change of 0.02% for changes of temperature of one degree. Because a temperature sensing resistor using platinum having a thermistor parameter of 100 to 3000 ppm can be generally obtained, a more sensitivity temperature sensing resistor may be obtained if the fabrication condition is optimized further.

In the structure shown in FIG. 1, the thermal capacity of the temperature sensing resistor 12 made of the platinum thin film is one several hundredth of that of the diamond thin film 13. Therefore, it is almost negligible comparing to the thermal capacity of the diamond thin film 13 and the temperature sensing resistor 12 can sense the changes of temperature of the diamond thin film 13 very quickly. When the thermal capacity of the temperature sensing resistor is not negligible as compare to that of the diamond thin film, the changes of temperature of the diamond thin film cannot be accurately sensed because it is influenced by changes of temperature of the temperature sensor itself. In concrete, the thermal capacity of the diamond thin film has to be more than 100 times of that of the temperature sensing resistor.

The mass flow sensor shown in FIG. 1 may be used for 1) a detection of fluid, 2) a measurement of a flow velocity of fluid, 3) a discrimination of a type of fluid, 4) a measurement of concentration of a content in fluid (measurement of humidity for example), and 5) a measurement of mixed ratio of a fluid composed of a plurality of fluids.

The uses in the items 3) to 5) above utilize that a quantity of heat taken away from the diamond thin film differs depending on thermal conductivity of a fluid and the sensor is operable even if a flow velocity of the fluid is zero.

Second Embodiment

The present embodiment relates to a mass flow sensor that actually meets the standard which is required for a measurement of flow rate of LPG gas (by the new measurement law). First, referring to FIG. 3, the characteristics required for the measurement of flow rate of LPG gas will be explained. In the figure, the vertical axis indicates a tolerance, i.e. a deviation from a criterion value or a measurement error. The horizontal axis indicates a flow rate in terms of a standard value. According to the new measurement law, the measurement error is required to be suppressed within the range shown by the hatched portion in FIG. 3.

The followings are the conditions required for the measurement of flow rate of LPG gas.

(1) Qmax is 2500 (liter/hr) or about 42 slm(liter/min.).

(2) A tolerance necessary is in a range of 120 (liter/hr) to 2500 (liter/hr) and is required to be suppressed within the range shown by the hatched portion above. That is, the flow rate range of 2 slm to 42 slm has to be measured within the tolerance above.

(3) A sensitivity is required to be able to detect 3 (liter/hr) or 50 sccm (0.05 slm).

(4) A use temperature range is −10 to 60° C.

Considering the above conditions, it is required to be able to measure within a tolerance of ±3% in the range of 2 slm to 50 slm and to have a sensitivity that permits to sense a flow rate of 50 sccm or to be able to sense changes of flow rate of 50 sccm.

The present embodiment is an example by which the mass flow sensor that meets the above required values was fabricated and a measurement of flow rate was actually carried out. In the present embodiment, the mass flow sensor basically having the structure shown in FIG. 1 was used in actual use conditions to measure its characteristics. In the measurement, a system shown in FIG. 4 was used. By the way, because the present embodiment is intended to measure a flow rate, the device shown in FIG. 1 shall be referred to as the mass flow sensor.

Figure 4:
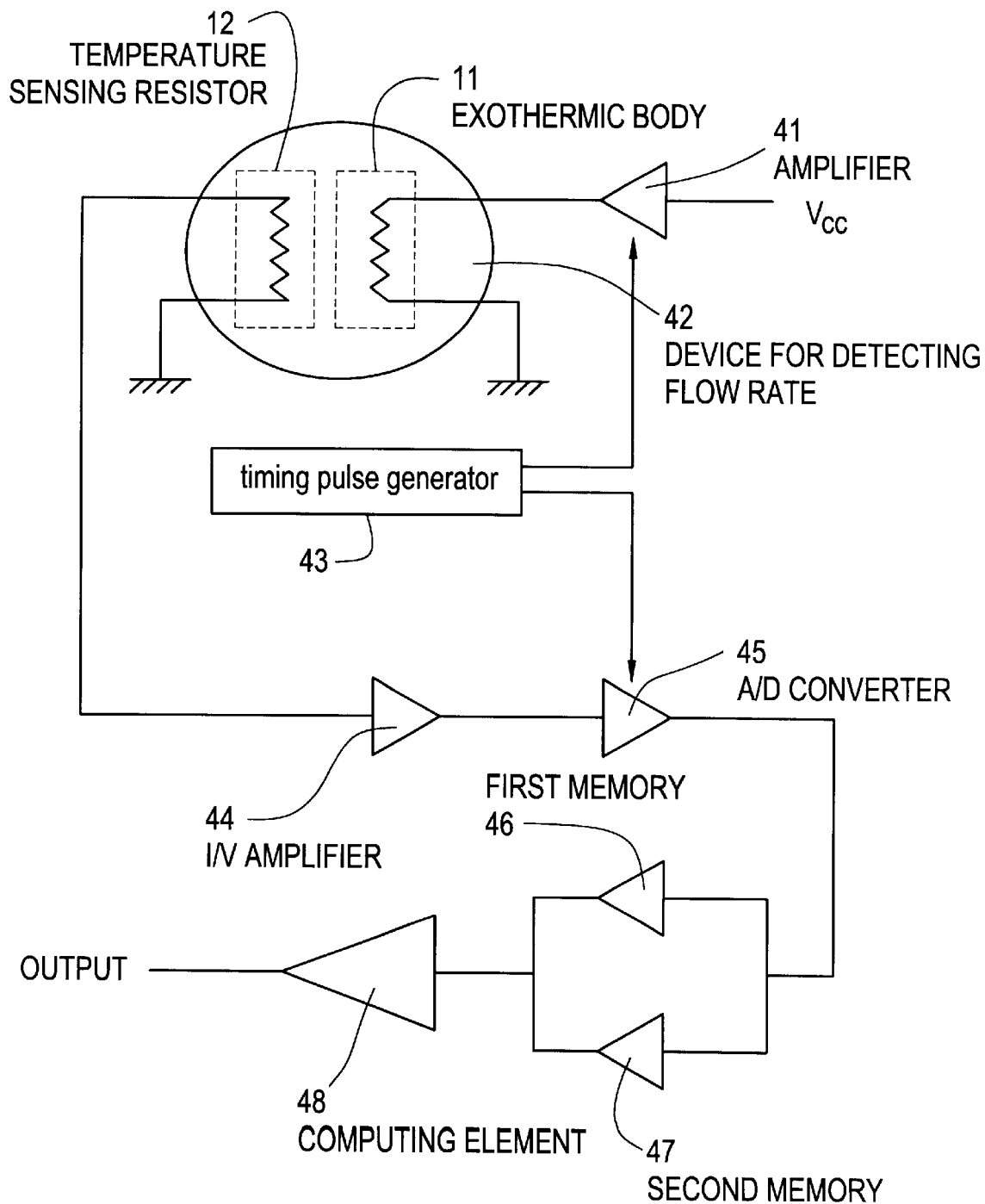
FIG. 4 is a block diagram of a flow rate detector according to the invention.

The measuring system shown in FIG. 4 will be explained at first. Basically the mass flow sensor itself has the same structure with that shown in FIG. 1. Although a structure for processing outputs from one temperature sensing resistor 12 is shown in FIG. 4, a flow rate was measured using a bridge circuit as shown in FIG. 5C in the present embodiment in order to reduce a dispersion of measured values and to eliminate an influence of temperature of the fluid.

Figure 5A:
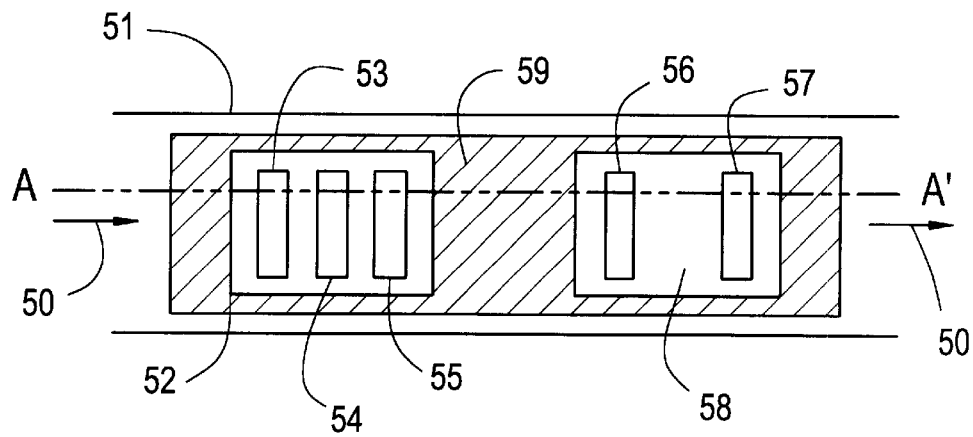
FIGS. 5(A) to 5(C) are views showing the structure of the flow rate detector shown in FIG. 4.
Figure 5B:
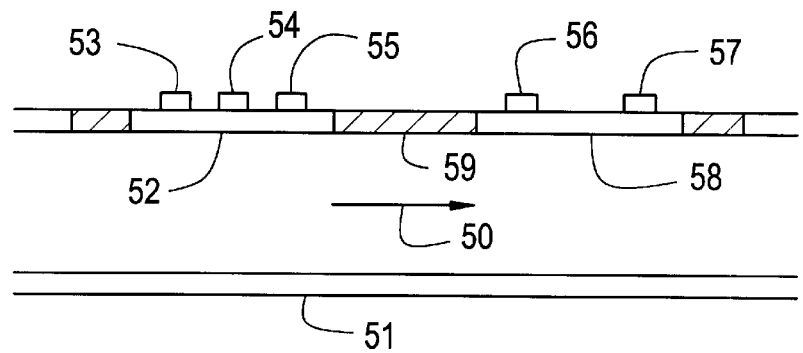
Figure 5C:
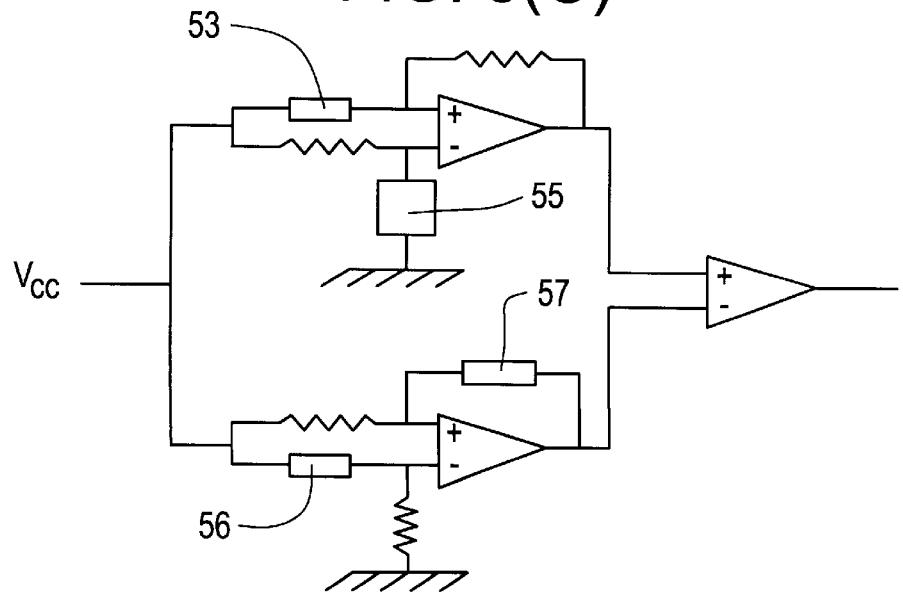

FIGS. 5A and 5B show an arrangement actually used in the measurement. FIG. 5B is a section view taken along A–A' in FIG. 5A. In FIGS. 5A and 5B, a fluid of nitrogen gas 50 flowing in a chloroethylene pipe 51 of 10 mm in diameter is measured by two mass flow sensors formed on diamond thin films 52 and 58. The mass flow sensors formed on the diamond thin films 52 and 58 have basically the same structure with that shown in FIG. 1 and their fabrication method also follows the fabrication process described, in the first embodiment. The thickness of the diamond thin films is also the same and their size is 10 mm×4 mm, respectively.

In concrete, the mass flow sensor on the left side of the figure formed on the diamond thin film 52 comprises two platinum temperature sensing resistors 12 provided in a manner sandwiching the exothermic body 11 made of platinum thin film in the structure shown in FIG. 1. This mass flow sensor has a structure in which a pair of temperature sensing resistors 53 and 55 and an exothermic body 54 formed between them are formed on one surface of the diamond thin film 52.

The mass flow sensor on the right side of the figure has a structure in which the exothermic body is missed out of the structure of the aforementioned mass flow sensor on the left side. That is, only a pair of temperature sensing resistors 56 and 57 are formed on one surface of the diamond thin film 58.

Those two mass flow sensors are built into a teflon substrate 59 which has a quality to insulate heat from/to diamond in order to insulate the diamond thin films thermally from the environment. The teflon substrate 59 is built into the chloroethylene pipe 51 of 10 mm in diameter. Nitrogen gas is flown through the pipe 51 as the fluid 50. The other surface sides of the diamond thin films 52 and 58 on which no temperature sensing resistor or exothermic body are provided are structured so as to contact with the fluid 50. Resin is filled in the gaps between the pipe 51 and the substrate 59 so that the fluid will not leak out of the pipe 51.

When the structure shown in FIGS. 5A and 5B is adopted, the one surface on which the temperature sensing resistor, exothermic body and wirings are provided is not exposed to the fluid. That is, when a corrosive fluid is used, an exchange of heat is carried out only through the surface of the diamond thin films 52 and 58 which are hardly corroded, so that the electrical characteristics of the temperature sensing resistor and exothermic body are hardly changed.

A material having a large thermal resistance should be used as much as possible for the substrate 59 for holding the diamond thin films 52 and 58 to isolate (insulate) the diamond thin films thermally from the environment. It is because a quantity of heat escaping from the diamond thin films to others than the fluid should be minimized.

Outputs from the temperature-sensing resistors indicated by reference numerals 53, 55, 56 and 57 in FIGS. 5A and 5B are connected to each part of a differential amplifying circuit shown in FIG. 5C. Then their outputs are input to an A/D converter 45 shown in FIG. 4.

To simplify the discussion, an explanation will be made based on the structure shown in FIG. 4 hereinafter. That is, the explanation will be made using the structure in which an output from one temperature sensing resistor 12 is processed, instead of the outputs from the differential circuit shown in FIG. 5. As described above, the structure shown in FIG. 5 was adopted to eliminate the influence of temperature of fluid and to enhance the measuring accuracy. However, because the flow rate measuring method using heat pulse described below can cancel out the influence of temperature of fluid, the measurement of flow rate can be carried out basically using the structure shown in FIG. 4.

In FIG. 4, the temperature sensing resistor 12 and the exothermic body 11 correspond to each of the parts of the mass flow sensor provided on the surface of the diamond thin film 13 in FIG. 1. A bias voltage Vcc is applied to the exothermic body 11 through an amplifier 41. A bias voltage is applied also to the temperature sensing resistor 12 and its output is taken out as voltage through an I/V amplifier 44. This output is converted to digital signals in an A/D converter 45 and is operated in a first memory 46, second memory 47 and computing element 48 in accordance to a predetermined computing method described below.

The amplifier 41 and A/D converter 45 are controlled by a timing pulse generator 43. The timing pulse generator 43 and amplifier 41 compose means for supplying heat intermittently to the exothermic body 11. That is, the exothermic body 11 is heated pulsewise by the timing pulse generator 43 and amplifier 41.

The temperature sensing resistor 12 is means for measuring changes of temperature of the diamond thin film and has a function to measure the temperature of the diamond thin film heated by the exothermic body 11. The changes of temperature of the diamond thin film are output as changes of resistance value of the temperature sensing resistor 12 and are output as changes of voltage from the I/V amplifier 44. The outputs from the I/V amplifier 44 which correspond to the changes of temperature of the diamond thin film are processed by the A/D converter 45. They are then processed digitally in the memory 46 and 47 and the computing element 48 to be output as signals that correspond to the flow rate and flow velocity.

The output from the computing element 48 is processed in accordance to an operation method which will be explained referring to FIG. 6 later and its value is proportional to the quantity of heat taken away from the diamond thin film by the fluid. In turn, the quantity of heat taken away from the diamond thin film is proportional to the flow rate and flow velocity, so that the flow rate and flow velocity can be found from the output from the computing element 48.

Now the flow rate measuring method will be explained. In the present embodiment, the exothermic body 11 is driven by pulse of less than one second to detect changes of temperature of the diamond thin film 13 which is heated up instantaneously at that time and is cooled down immediately thereafter by the temperature sensing resistor 12.

Figure 6A:
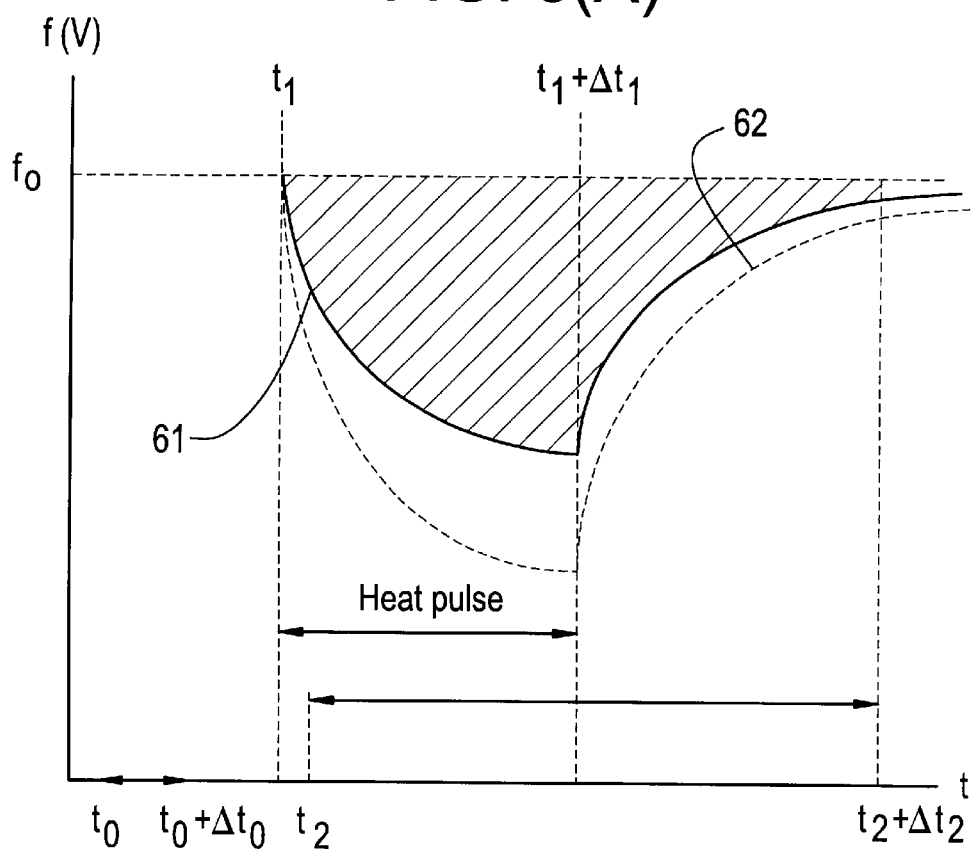
FIGS. 6(A) and 6(B) are graphs illustrating the principle of measurement of flow rates.

The principle of the measurement will be explained. In FIG. 6A, a vertical axis f(V) is a function whose parameter is a flow velocity V and a horizontal axis t indicates a time. The vertical axis f(V) corresponds to the output from the temperature sensing resistor 12 composed of the platinum thin film. In FIG. 6A, the state is shown that the value of f(V) decreases when the temperature of the diamond thin film 13 rises and that the value of f(V) increases when the temperature of the diamond thin film 13 drops.

Figure 6B:
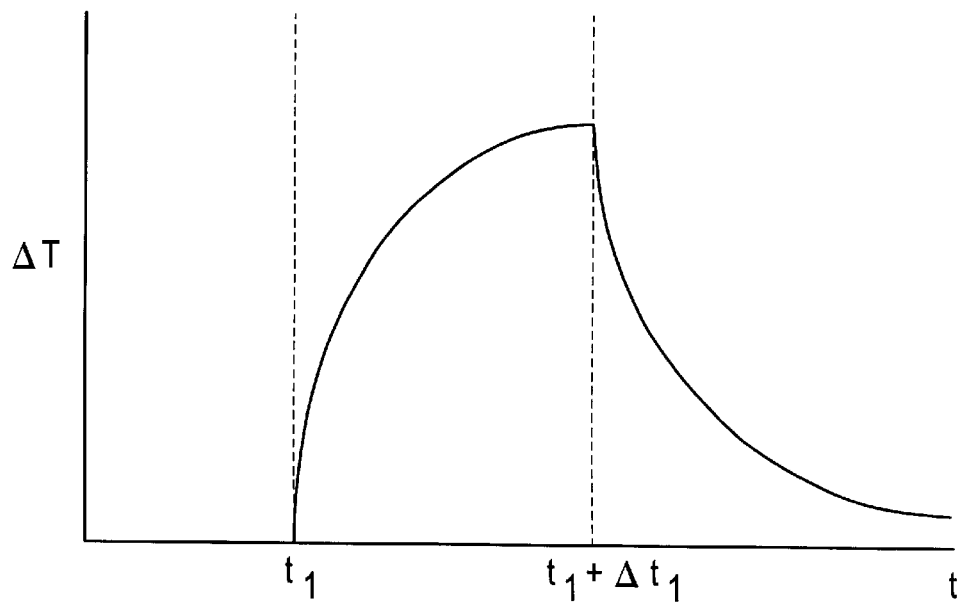

FIG. 6B is a chart in which the temperature change $\Delta T$ of the diamond thin film is shown in the same time scale corresponding to FIG. 6A. In FIG. 6B, the state is shown that the diamond thin film is heated up by the heat pulse shown in FIG. 6A and that it is cooled down after $t_1+\Delta t_1$, i.e. after finishing the heat pulse.

By the way, because a time is necessary for the output f(V) to become a value that corresponds to the velocity V, it may be considered as f(V, t).

Although f(V) should to depend only on the flow velocity V originally, the temperature of the diamond thin film does not depend only on the flow velocity V in reality because some quantity of heat flow out from the substrate for holding the diamond thin film and the wiring of the temperature sensing resistor and exothermic body (gold wires of 20 micron in diameter).

Accordingly, the temperature of the diamond thin film gradually changes even if the flow rate does not change, though it is a very little. The slight changes of temperature of the diamond thin film show up as a fluctuation of the outputs from the temperature sensing resistor (the temperature sensing resistor 12 in FIG. 1) for sensing the temperature of the diamond thin film, i.e. as the DC drift. However, this DC drift is practically negligible in a very short period of time of less than 1 second.

Then the present embodiment is characterized in that a method for canceling out the aforementioned DC drift component by heating instantaneously by heat pulse (having rectangular pulse waveform) of about 0.2 seconds is used.

In FIG. 6A, $\Delta t_1$ is the time of the heat pulse. The waveform of the heat pulse is not confined only to rectangular and may be anyone so long as it can supply a certain quantity of heat within the time of $\Delta t_1$.

The temperature change $\Delta T$ of the diamond thin film caused by the heating is represented as shown in FIG. 6B. The output f(V) from the temperature sensing resistor 12 changes as shown by a curve 61. That is, when the heating is started at $t_1$, the temperature of the diamond thin film 13 rises and the value of f(V) decreases as heat is supplied from the exothermic body 11. Then after heating for $\Delta t_1$, the diamond thin film 13 is cooled down by the fluid 16 and its temperature drops. At this time, the value of the output f(V) from the temperature sensing resistor 12 increases again and approaches to the original value. By the way, it is assumed here that the flow rate will not change.

However, the output f(V) contains the DC drift component also in this case, so that the value gradually changes when f(V) is measured for a number of times. This problem cannot be solved even if a heat pulse of very short time is applied. Then in the present embodiment, a measuring method in which the DC drift component of f(V) is canceled out is obtained by the following method.

(First Step)

First, assume f(V) to be f(V, t) and find a value of f(V, t) within a time from $t_0$ to $t_0+\Delta t_0$ by executing a calculation of Equation 5 below. The temperature of the diamond thin film just before the heating is defined as a standard from this calculation. That is, a base line in the measurement of flow rate is defined.

$$\int_{t_0}^{t_0+\Delta t_0} f(V,t) dt \tag{5}$$

The fluctuation component in f(V, t) may be canceled out and a highly reliable measuring standard may be defined by integrating f(V, t) during the time interval of the certain time $\Delta t_0$ in the above computation. For example, when a value of f(V, t) in one point within t+$\Delta$t is set as a standard, a tolerance of the flow rate obtained will degrade by several % as compare to the case when the computation shown by Equation 5 above is used.

(Second Step)

Integrate the values of f(V, t) that correspond to the heat pulse applied during $t_1$ to $t_1+\Delta t_1$. That is, execute a calculation of Equation 6 below.

$$\int_{t_2}^{t_2+\Delta t_2} f(V,t) dt \tag{6}$$

In the calculation of Equation 6, $t_1$ is assumed to be smaller than $t_2$. It is because a shock noise appears in f(V, t) at the instant of heating, i.e. at $t_1$.

(Third Step)

After adjusting the time widths, subtract the integrated value obtained from Equation 5 by the integrated value obtained from Equation 6. There are several methods for matching the time width as follows. For simplification of the explanation, the computation result of Equation 5 shall be denoted as $S_0$ and that of Equation 6 as $S_2$.

First method: Compute $S_0-S_2$ assuming that $\Delta t_0 = \Delta t_2$. It is also possible to calculate $S_2-S_0$ of course. In this case, an area of the hatched portion formed by the curve 61 shown in FIG. 6A is found.

Second method: Execute a computation expressed by $(S_0/\Delta t_0)-(S_2/\Delta t_2)$ or $(S_2/t_2)-(S_0/\Delta t_0)$.

Third method: Execute a computation expressed by $(\Delta t_2/\Delta t_0)S_0-S_2$ or $S_2-(\Delta t_2/\Delta t_0) S_0$.

Fourth method: Execute a computation expressed by $S_1-(\Delta t_1/\Delta t_2)S_2$ or $(\Delta t_1/\Delta t_2)S_2-S_1$.

The DC drift component in $f(V, t_0)$ and that in $f(V, t_2)$ are canceled out in the results of the computations shown by the four equations above, so that a DC drift component appearing in the computation results is only what is generated during $t_0$ to $t_2$. In an actual operation, the value of $\Delta t_1$ can be about or less than 0.2 seconds, so that a value of $t_2-t_0$ can be also about the same or less. That is, only the DC drift during about or less than 0.2 seconds is questioned.

For example, when the computation is carried out by the first method, the computation result obtained corresponds to the area of the hatched portion in FIG. 5, though this area changes depending on a flow rate. That is, if the flow rate changes, the area S also changes accordingly. It is because how the diamond thin film is heated up and how it is cooled down are different depending on the flow rate. Accordingly, the flow rate can be found out by studying the relationship of the area with flow rate beforehand and by comparing this information with a computation result obtained in an actual measurement of the flow rate.

Actually measured data will now be shown. The data was obtained under the following conditions. That is, the parameters shown in FIG. 6 were set as:

$\Delta t_0$=0.1 second
$\Delta t_1$=0.18 seconds
$\Delta t_2$=0.36 seconds

Further the difference of the integrated values of Equations 5 and 6 was computed by adjusting the time widths of $\Delta t_0$ and $\Delta t_2$ by multiplying the integrated value calculated from Equation 5 by 3.6 times. This computation was executed following the third method above.

The measurement of the flow rate was carried out in a rate of once in 8 seconds. That is, the flow rate was sampled once per 8 seconds.

Figure 7A:
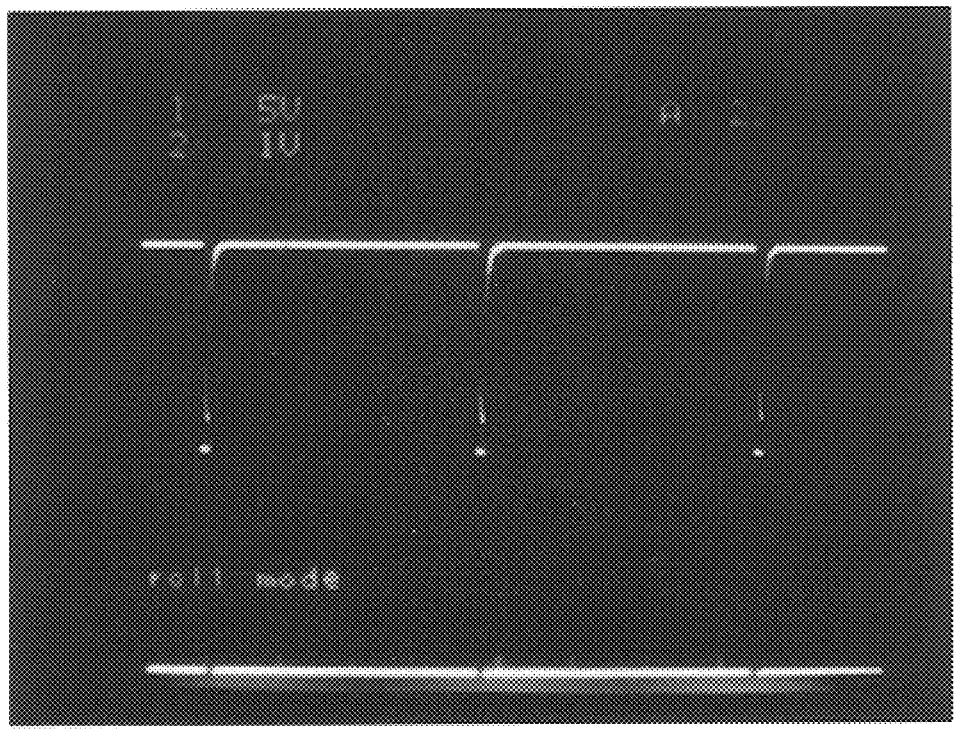
FIGS. 7(A) and 7(B) show waveforms on an oscilloscope.
Figure 7B:
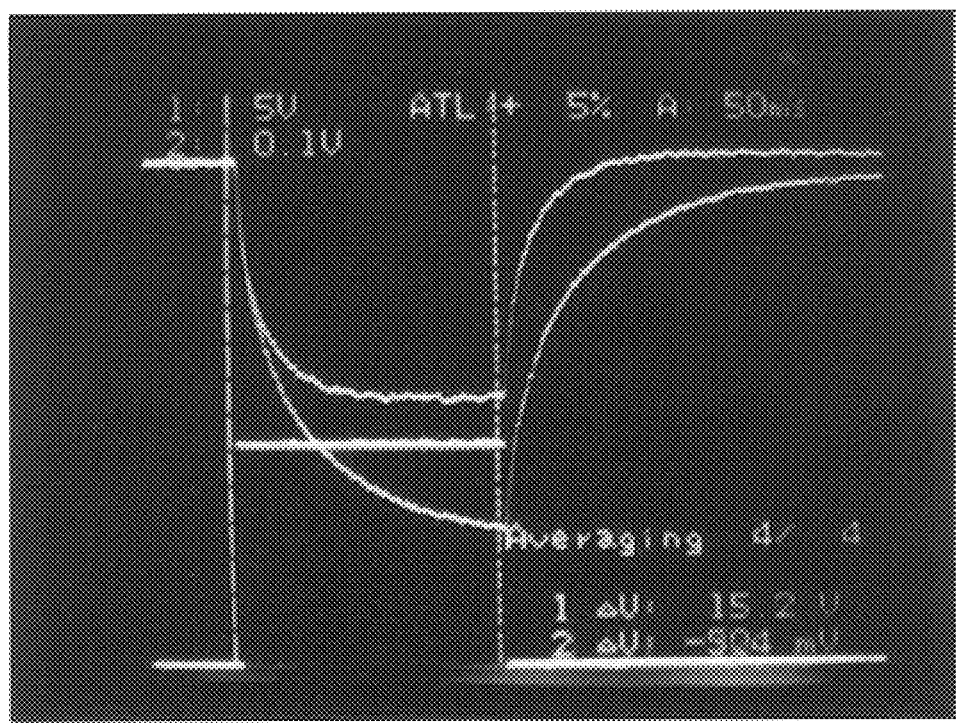

FIG. 7A shows a picture of a waveform of the output f(V, t) from a computing element 48 displayed on a oscilloscope when heat is generated from the exothermic body for 0.18 seconds once in every 8 seconds. FIG. 7B is a picture of the display in FIG. 7A enlarged further. In FIG. 7B, outputs which correspond to two different flow rates are shown. The lower waveform shows the case when the flow rate is reduced as compare to that of the upper waveform. In this case, because a quantity of heat taken away by the fluid is reduced, the diamond thin film is heated up to higher temperature by the heating of $\Delta t_1$. Accordingly, the value of the output f(V, t) fluctuates largely as shown by the lower waveform in FIG. 7B.

It is confirmed from the waveforms of the oscilloscope shown in FIG. 7 that the measurements of the flow rate is carried out in accordance to the operation principle shown in FIG. 6.

Figure 8:
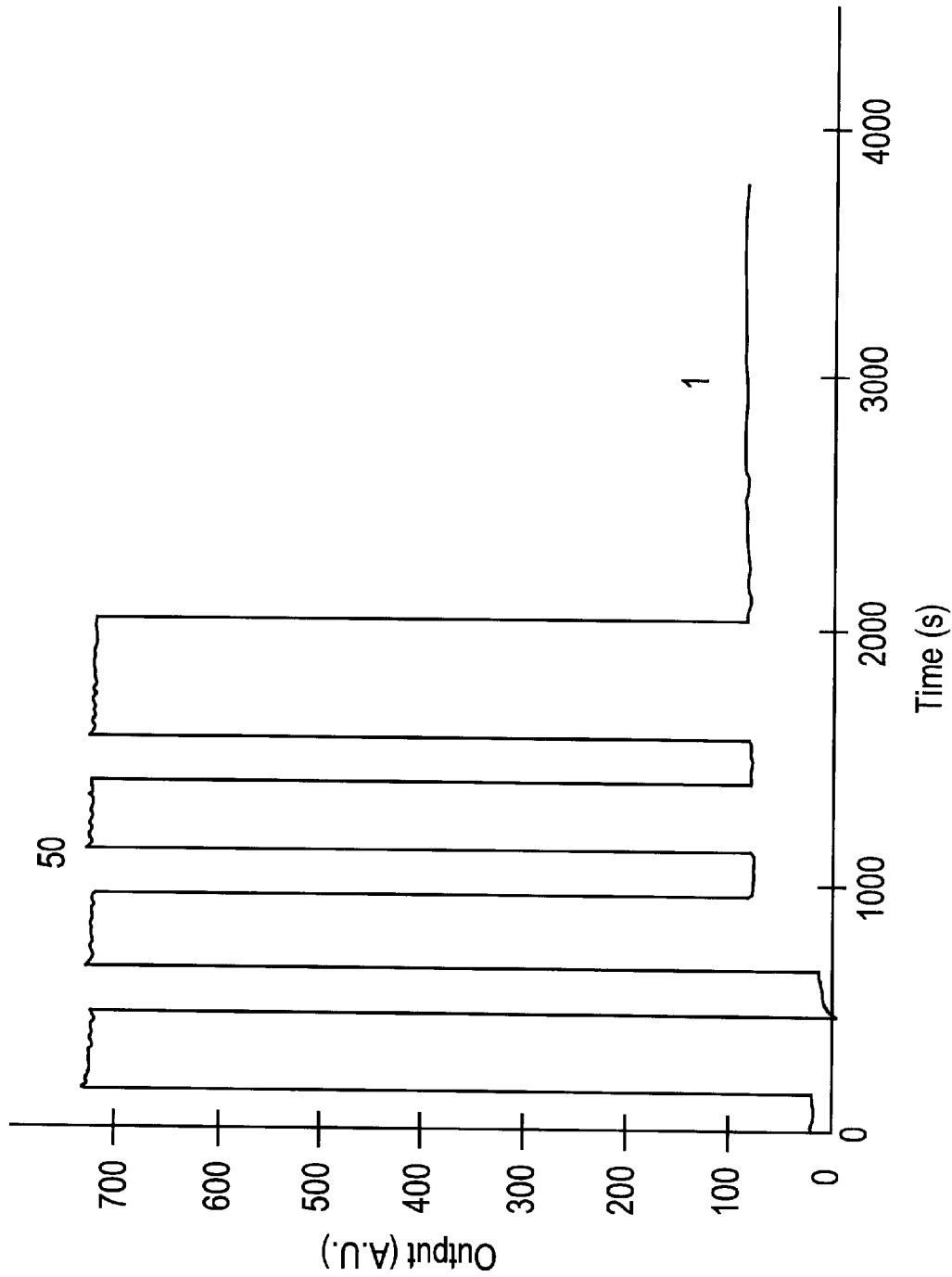
FIG. 8 is a graph illustrating the accuracy of measurement of flow rates.

FIG. 8 shows changes of the outputs (from the computing element 48 in FIG. 4) when the flow rate is changed alternately to 50 slm (liter/minute) and 1 slm.

It can be seen from FIG. 8 that constant outputs are obtained corresponding to predetermined flow rates. That is, it is understood that no drift components appear or, almost all of them are eliminated in the outputs when the measuring method shown concerning to FIG. 6 is adopted.

Figure 9:
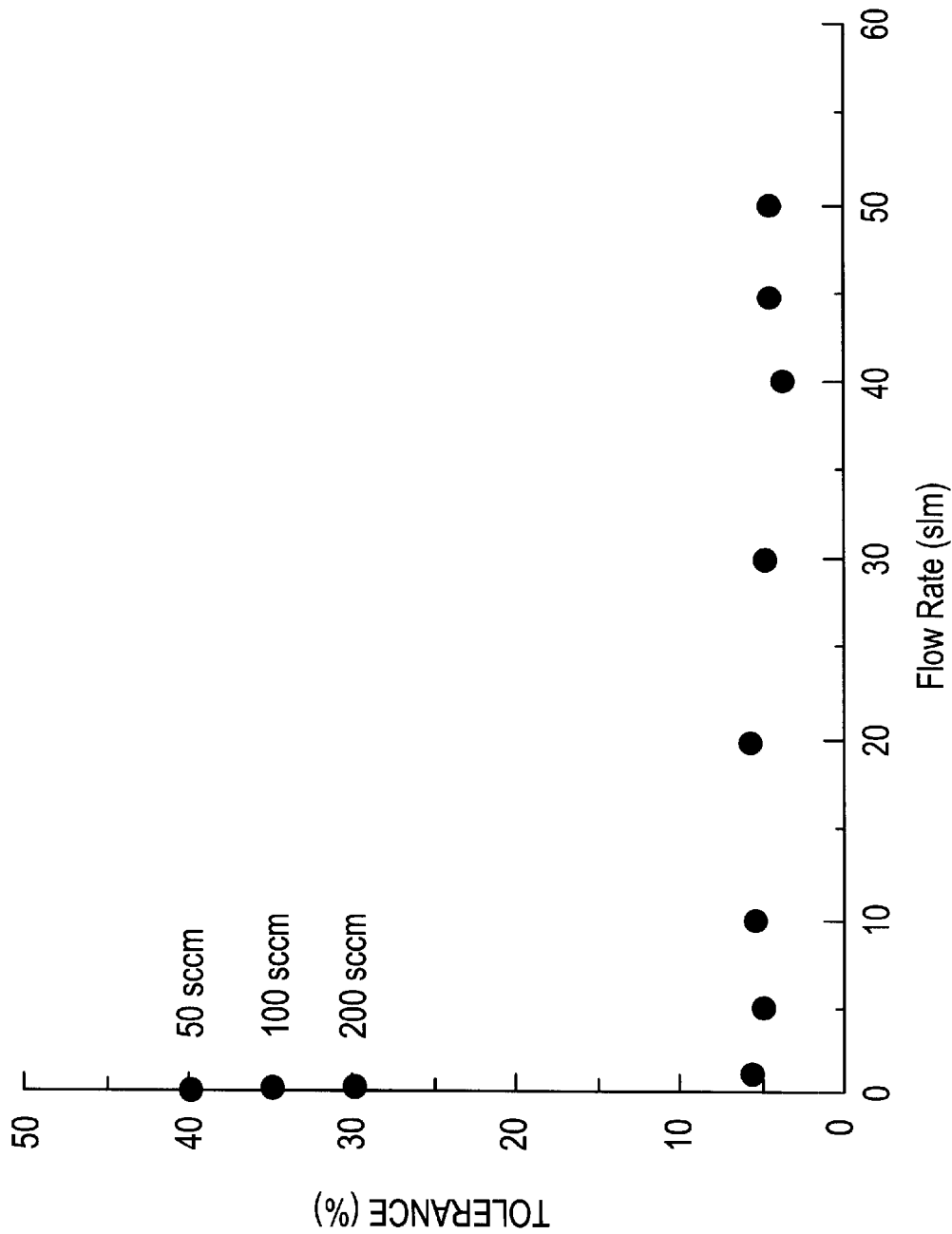
FIG. 9 is a graph illustrating the accuracy of measurement of flow rates.

FIG. 9 shows a long term stability of flow rate measured values in a range of flow rates of 50 sccm to 50 slm (50000 sccm). In concrete, it shows a relationship between a tolerance and gas flow rate (liter/minute). A tolerance is a parameter for indicating a reliability of an output, a dispersion of measurements and a fluctuation width.

The data shown in FIG. 9 includes also a fluctuation of outputs when the flow rate is largely changed such as from 50 slm to 5 slm and from 1 slm to 100 sccm. When the flow rate is largely changed, such a fluctuation of outputs in a very short time as shock noise appears in the output from the thermistor. This fluctuation of outputs is a factor that increases the tolerance shown in FIG. 8. Accordingly, the tolerance can be reduced further when the flow rate changes step by step and when such fluctuation of outputs in a very short time as the shock noise above can be eliminated.

In the data shown in FIG. 9, the tolerance is less than about 6% (±3%) between 2 slm and 50 slm. This value is considered to fully satisfy the condition shown in FIG. 3, considering a fluctuation of flow rate of experimental nitrogen gas. It can be seen also that 50 sccm (0.05 slm) which is required to be as the minimum sensitivity can be also sensed even though there is an amplitude of 40% in its output.

As seen from FIG. 9, when the flow rate decreases, the fluctuation of the output increases. When the flow rate is 200 sccm, the tolerance is about 30% and when it is 100 sccm, about 40%. It is considered to happen because when the flow rate is small, an influence of movement of heat not related to the flow rate (e.g. a quantity of heat that moves through the wiring and teflon substrate) becomes greater than a movement of heat that corresponds to the flow rate. Moreover, it is also considered to happen because an influence of noise in the whole measurement system shows up as the output from the temperature sensing resistor becomes small.

Figure 10:
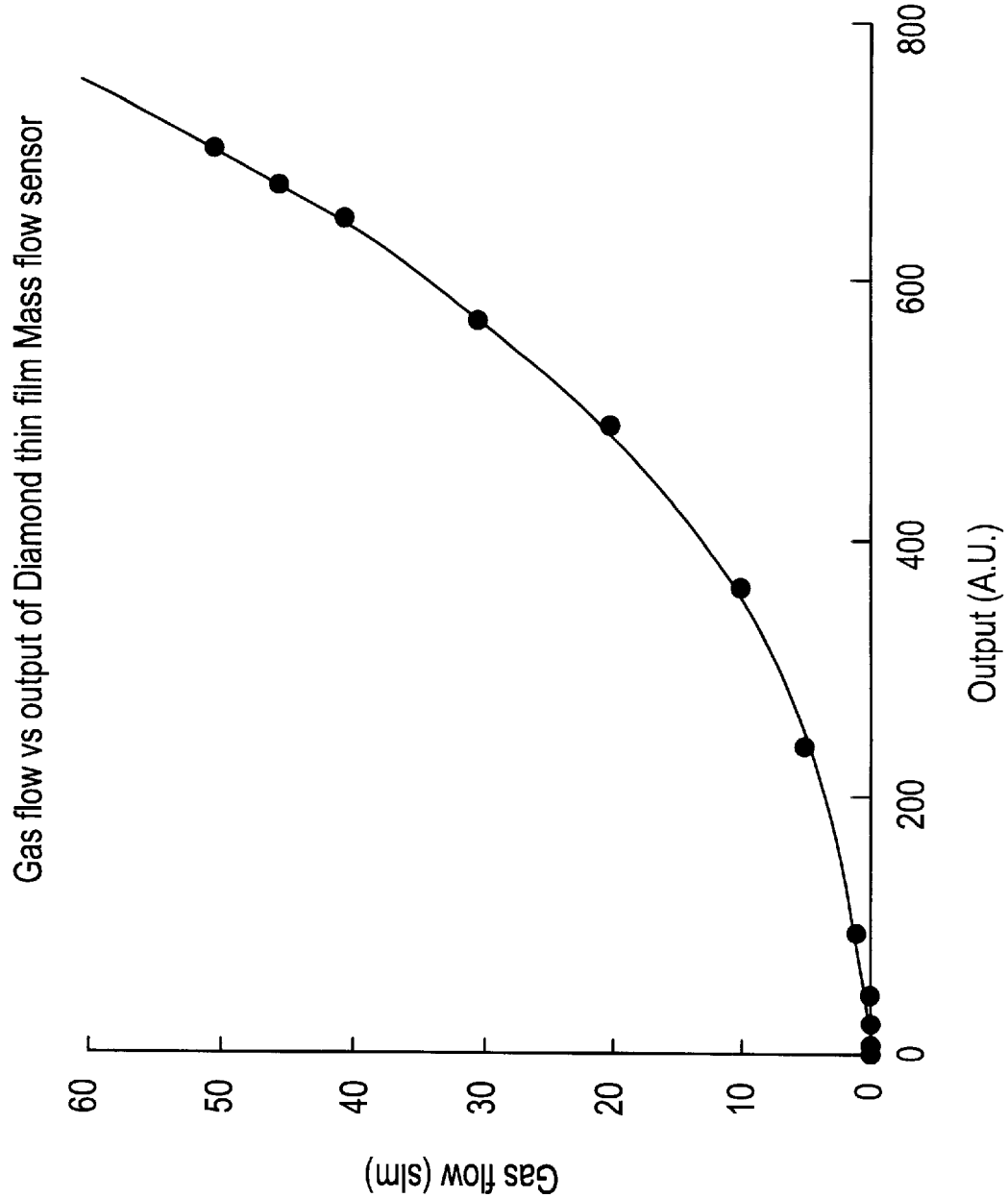
FIG. 10 is a graph showing the relation between flow rate and the output from a flowmeter.

FIG. 10 shows a relationship between the output of the system (relative value) and the gas flow rate (slm). As seen from FIG. 10, a dynamic range of more than 2 digits can be obtained. Further, as described before, it is apparent that a flow rate of 50 sccm as the minimum flow rate can be detected and from that, flow rates can be measured across more than 3 digits.

While the actually measured data above is an example when the measurement was carried out in every 8 seconds by setting $\Delta t_1$=0.18 seconds, the value of 8 seconds was determined by utilizing the following. According to an experiment, it was found that one cycle of measuring steps such as shown in FIG. 6 takes about a little less than 2 seconds when $\Delta t_1$ is set at 0.18 seconds. Therefore, when the measuring interval was shorter than 2 seconds, the previous measuring step would influence the next measuring step, disallowing to remove the DC drift component effectively. Accordingly, the measuring interval is taken to be more than 2 seconds, i.e. 8 seconds here, taking a sufficient time.

According to the number of experiments carried out by varying the time $\Delta t_1$, a ratio of a time interval T of one step cycle and the heating time $\Delta t_1$ has to be $T/\Delta t_1 \geq 10$. This is a requisite condition for not influencing the next step cycle. From this condition, in the case of the present embodiment, the step cycle time has to be at least 1.8 seconds or more. However, sticking to such condition is not necessary if a large flow is measured in a small range, because the diamond thin film is cooled down quickly by the large flow.

Although it is practically sufficient to measure once in 8 seconds in the case of measurement of flow rate of LPG gas, the measuring interval may have to be shortened. As means for such a case, it is effective to shorten the time $\Delta t_1$ to shorten one measuring cycle.

One measuring cycle is determined by the time from when the diamond thin film is heated up by heat pulse of $\Delta t_1$ until when it is cooled down to return to the original state.

The lower limit of $\Delta t_1$ is determined by a response speed of the mass flow sensor. When the structure as shown in FIG. 1 adopted, its response time is estimated to be about several milliseconds according a calculation, but a practically useful response time is obtained in up to about 50 milliseconds according to an experiment. Accordingly, $\Delta t_1$ can be up to 0.05 seconds. In this case, from the condition of $T/\Delta t_1 \geq 10$, the time T of one step cycle can be reduced to about 0.5 seconds. That is, a flow rate can be measured once in every 0.5 seconds.

This minimum response time is considered to be limited by a quantity of heat escaping from the substrate and wiring. Accordingly, the quantity of heat escaping from the wiring and substrate has to be reduced in order to achieve a shorter response time. In concrete, such countermeasures as shown below should be taken;

(1) thermally float (isolate) the diamond thin film,
(2) use a material having a small thermal conductivity for the lead,
(3) make the lead thin and increase its thermal resistance, and
(4) coil the lead to increase its thermal resistance.

Such arrangements as above are made to reduce the quantity of heat escaping from the diamond thin film to other materials than the fluid and to detect the quantity of heat taken by the fluid of small flow rate.

A quantity of heat supplied from the exothermic body in delta $t_1$ depends on a type of fluid (the quantity of heat taken away differs depending on a type of fluid) and flow rate and the adequate quantity of heat can be determined by selecting a voltage applied to the exothermic body (the exothermic body 11 in FIG. 1) and a heat generating time.

It is preferable that the sensitivity of the temperature sensing resistor (the temperature sensing resistor 12 in FIG. 1) is as high as possible. That is, it is preferable to structure so as a large resistive change to be brought about for changes of temperature. In the present embodiment, although the platinum thin film is used for the temperature sensing resistor, a higher sensitivity can be obtained by doping B by an ion implantation method to structure a p-type diamond semiconductor layer.

On the other hand, it is not useful to prolong the time $\Delta t_1$, because the prolonging $\Delta t_1$ means prolonging one measuring cycle as much and drift components are likely to come up in the output. Accordingly, it is desirable to set the time $\Delta t_1$ at less than one second or preferably at less than 0.2 seconds as in the present embodiment. Moreover, it is practical to set the lower limit of $\Delta t_1$ at more than 0.05 seconds as described before.

As described above, although the present embodiment has been explained using the example of the mass flow sensor shown in FIG. 1, the flow rate measuring method explained in the present embodiment is extremely effective even if the thickness of the diamond thin film is changed, its size is changed, its fabrication method is changed, the exothermic body 11 and thermistor layer 12 are constructed by other materials, and the arrangements and the number of the exothermic body 11 and thermistor layer 12 are changed in the structure shown in FIG. 1.

It is possible to use the diamond thin film even if its thickness is thinned down to about 5 micron. In contrast, if it is desirable to strengthen the diamond thin film, it is possible to use one having more than 15 micron of thickness. Since a diamond thin film has a particularly high thermal conductivity, there will be no problem even if thick one is used.

The operation method (flow rate measuring method) explained in the present embodiment is also very effective in measuring a flow rate in a situation where an environmental temperature changes because it can cancel out an influence of the temperature of the environment. In this case, however, the change of the temperature of the environment must be fully slow as compare to $\Delta t_1$, because a fluctuation of output within $\Delta t_1$ cannot be canceled out.

It is necessary to set a level of zero flow rate beforehand in actually using the operation method shown in the present embodiment. It is because heat is taken away from the diamond thin film by the fluid even if the flow rate is zero and its output will not be zero. The level of zero flow rate may be adjusted as follows.

First, assume that the mass flow sensor is disposed in a pipe. Then assume that valves are provided at two locations in the pipe in a manner sandwiching the mass flow sensor. A fluid is flown at first from one side of the pipe to the other. The valve disposed at the upper stream is closed at first and then the valve disposed at the down stream is closed. This is done to make a pressure of the fluid which contacts with the mass flow sensor constant in the operation for adjusting the level.

Then the result of the predetermined computation described before at that time is memorized as an output when the flow rate is zero. The measurement of flow rate thereafter is carried out based on the output when the flow rate is zero thus set.

A higher measuring accuracy may be obtained if the level adjustment is carried out every time when the mass flow sensor is used, because it will be less influenced by impurities within the fluid. It is also useful in actual uses to carry out sometimes this zero flow rate level adjustment.

In the flow rate measuring method described in the present embodiment, such parameters as $\Delta t_0$ and $\Delta t_1$ may be set variably, not fixing to a certain value. For example, a plurality of combinations of parameters may be set and a measurement can be carried out by selecting one combination depending on a measuring environment, measuring time and a type of measured fluid.

Third Embodiment

The present embodiment relates to an application example using the flow rate measuring method described in the second embodiment. In the example shown in FIGS. 5a, 5b, and 5c, the flow rate of the fluid 50 passing though the pipe 51 is measured at one place. In this case however, frequent changes of the flow rate cannot be detected if the measurement is carried out once in every 8 seconds as described in the second embodiment. It is conceivable to shorten the heating time $\Delta t_1$ as described before to solve this problem.

Further, as another method, it is conceivable to prepare a plurality of mass flow sensors to shift measuring timings. For example, assume that in the structure shown in FIG. 5, eight mass flow sensors (comprising the diamond thin films 52 and 58 built into the teflon substrate 59) are provided along the flow direction of the fluid and that the flow rate is measured in the cycle of eight seconds as described in the second embodiment. In this case, the flow rate can be measured in every one second by shifting the operation of each mass flow sensor by one second. The changes of the flow rate can be measured in an accuracy of one second by adopting such arrangement. As a matter of course, the measuring accuracy can be enhanced further by increasing the number of the mass flow sensors.

Fourth Embodiment

The present embodiment is a further modification of the third embodiment. The third embodiment has been characterized in that the apparent measuring interval is shortened by using the plurality of mass flow sensors. Contrary to that, the present embodiment relates to a measuring method for enhancing the measuring accuracy without shortening the measuring intervals. For example, although the flow rate is measured once in every one second in the arrangement described in the third embodiment, one mass flow sensor actually operates once in every eight seconds. Then, the measuring accuracy can be increased by operating eight mass flow sensors in the same time and by averaging outputs from each of the mass flow sensors in every eight seconds.

Further, an accurate average flow rate may be calculated by operating each sensor in every one second and calculating an average value of the outputs in every eight seconds.

The measured error (tolerance) as described in connection with FIG. 9 may be further reduced by adopting the arrangement described above. Although the example in which eight mass flow sensors are used has been explained here, the measuring accuracy can be enhanced by increasing the number of mass flow sensors further. The measuring interval may be also set at a necessary time interval according to a working mode.

Fifth Embodiment

The present embodiment is a modification of the flow rate measuring method described in the second embodiment. Assume that the mass flow sensor shown in FIG. 1 is used in the explanation of the present embodiment below. The measuring method shown in the second embodiment utilizes that how the diamond thin film is heated up and how it is cooled down differ depending on the flow rate of fluid. However, as described above, because the quantity of heat taken away from the diamond thin film differs depending on the flow rate, how the diamond thin film is heated up or how it is cooled down should be naturally different when it is heated up in the same manner if the flow rate differs.

That is, it is possible to implement the flow rate measurement such as shown in the second embodiment even from only one of either how the diamond thin film is heated up or how it is cooled down in principle.

Then the present embodiment may be summarized in that two kinds of methods as follows are adopted:

(1) a method for measuring how the diamond thin film is heated up is adopted by setting $t_2+\Delta t_2 < t_1+\Delta t_1$ in the measuring method as described in connection with FIG. 6. That is, a transient response characteristics of the diamond thin film when it is heated up is evaluated: and (2) a method for measuring how the diamond thin film is cooled down is adopted by setting $t_1+\Delta t_1 < t_2$ in the measuring method as described in connection with FIG. 6. That is, a transient response characteristics of the diamond thin film when it is cooled down after finishing the heating is evaluated.

Although it is possible to set as $t_2+\Delta t_2 \leq t_1+\Delta t_1$ or $t_1+\Delta t_1 \leq t_2$ in the operation method above, it is not preferable because shock noise comes up in the output in a boundary value. The measuring method in the operation method above is basically the same with that shown in the second embodiment and only the difference is that the relationship of each parameter is stipulated by the methods (1) or (2) above.

In the measuring method shown in the methods (1) and (2), a value of $(t_2+\Delta t_2)/2-(t_0+\Delta t_0)/2$ in the method (1) is smaller than that in (2), so that the influence of DC drift may be eliminated that much.

Sixth Embodiment

The present embodiment presupposes that the method (2) in the fifth embodiment described above is adopted. In the mass flow sensor shown in FIG. 1, the temperature sensing resistor portion and the exothermic body for supplying heat are basically separately arranged. In the structure in FIG. 1 however, both the temperature sensing resistor 12 and the exothermic body 11 are made of platinum and only their difference is their resistances. It is the same even when another material other than platinum is used. For example, when the temperature sensing resistor (diamond thermistor) and the exothermic body layer are formed separately by p-type diamond semiconductor layer doped by B, they are discriminated by controlling their resistance by etching.

Then the present embodiment is characterized in that the temperature sensing resistor and the exothermic body are combined by controlling the voltage for generating heat. For example, although the resistance of the temperature sensing resistor has been set at 1 Kohm and that of the exothermic body at about 100 ohm in the first embodiment, a more than three times of voltage as compare to that applied to the exothermic body should be applied to the temperature sensing resistor in order to generate the same quantity of heat with that generated by the exothermic body in this case.

When this arrangement is adopted, the flow rate cannot be measured during the heating, of course. However, as shown by the method (2) in the aforementioned fifth embodiment, the method in which the heating is carried out before $t_1+\Delta t_1$ and the measurement of flow rate is carried out after $t_1+\Delta t_1$, i.e. in the state when the diamond thin film is being cooled down, may be used. The computations shown by Equations 1 through 3 have to be carried out as described in the fourth embodiment in this case also, though the condition of $t_2>t_1+\Delta t_1$ should have been met.

The significant point of the present embodiment is that the mass flow sensor can be structured just by forming a layer which is used both as the exothermic body and as a layer having a thermistor function on the diamond thin film.

Seventh Embodiment

The present embodiment relates to an arrangement in which a temperature sensing resistor is provided on the surface of the diamond thin film and the temperature sensing resistor is used also as an exothermic body. The measuring method shown in FIG. 6 is based on that thermal response characteristics of the diamond thin film which corresponds to the heat pulse from the exothermic body are detected as electrical signals by the temperature sensing resistor adhered on the diamond thin film.

The structure shown in FIG. 1 is the most basic one as a mass flow sensor for implementing the measuring method shown in FIG. 6. In the structure shown in FIG. 1, the temperature sensing resistor 12 and the exothermic body 11 are made of the same material (e.g. platinum) and are different only in their resistances. The resistance values are differentiated to obtain a necessary amount of heat generation generated by the exothermic body 11 and a ratio of a resistance variation of the temperature sensing resistor 12 to a temperature variation thereof.

However, the exothermic body 11 functions as a temperature sensing resistor and the resistance of the exothermic body also changes by heat of itself. Then the way how it changes reflects the thermal response characteristics of the diamond thin film. Accordingly, the flow rate of the fluid flowing in contact with the diamond thin film can be calculated by measuring changes of electrical current flowing in the exothermic body corresponding to heat pulses.

That is, the way how the current flowing in the exothermic body in the time $\Delta t_1$ in FIG. 5 changes is different depending on the flow rate, so that the changes of outputs that correspond to the flow rates as indicated by the curve 61 in FIG. 6 may be obtained, where the current value is set as f(V).

Changes of the current flowing in the exothermic body within only $\Delta t_1$ must be measured and its variation be detected in order to eliminate the DC drift component. That is, it is important to evaluate only the variation of the current (f(V)t) flowing in the exothermic body corresponding to heat pulse.

The measuring method of the present embodiment is basically the same with that explained in the second embodiment. What is different is that the changes of the current flowing in the exothermic body is measured. The concrete measuring method will now be explained. The steps below are based on the method shown in FIG. 6. Further in this case, the output f(V) from the thermistor in FIG. 5 corresponds to what the current flowing in the exothermic body is I/V converted into.

At first, a bias voltage is applied to the exothermic body and a computation represented by Equation 5 below is executed.

$$\int_{t_0}^{t_0+\Delta t_0} f(V,t)dt \tag{5}$$

Next, heat pulses are generated by flowing pulse current to the exothermic body. The changes of current at this time is processed by a computation represented by Equation 6 below.

$$\int_{t_2}^{t_2+\Delta t_2} f(V,t)dt \tag{6}$$

Only changes of temperature of the diamond thin film that correspond to the heat pulses are evaluated by computing a difference of the computation result of Equation 5 and that of Equation 6 while adjusting their time width. How this computation is done is the same with that shown in the second embodiment.

A simple structure in which only the exothermic body is provided may be realized by adopting the arrangement of the present embodiment.

Eighth Embodiment

The present embodiment relates to a method for holding the mass flow sensor. When the flow rate measuring method shown in the second embodiment is adopted, its measuring error becomes significant if the flow rate becomes less than 1 slm. It may be because a quantity of heat taken away from the diamond thin film by the small flow rate cannot be accurately evaluated.

It is because a transient response characteristics of the diamond thin film to heating corresponding to the flow rate cannot be accurately evaluated when a quantity of heat escaping to others than the fluid becomes significant as compare to the quantity of heat taken by the fluid.

For example, the transient response characteristics of the diamond thin film to the heating as shown by the changes of f(V) in FIG. 6 contains what corresponds to the quantity of heat escaping to others than the fluid. The more the component that corresponds to the quantity of heat escaping to others than the fluid, the less the reliability of the measured value becomes that much.

It is conceivable to take the following countermeasures to solve the aforementioned problem:

(1) minimize the quantity of heat escaping to others than the fluid, and (2) enhance the sensitivity of the thermistor to detect the changes of small transient response characteristics by a large output. The present embodiment adopts the method (1) to enhance the flow rate measuring accuracy. The present embodiment is related especially to an arrangement for minimizing a quantity of heat escaping to the substrate for holding the diamond thin film.

The quantity of heat escaping from the diamond thin film to others than the fluid includes mainly that escaping to air from the surface of the temperature sensing resistor and exothermic body, that escaping from the wiring contacting the temperature sensing resistor and exothermic body and that escaping from the contact section between the diamond thin film and the substrate for holding the diamond thin film.

Figure 11:
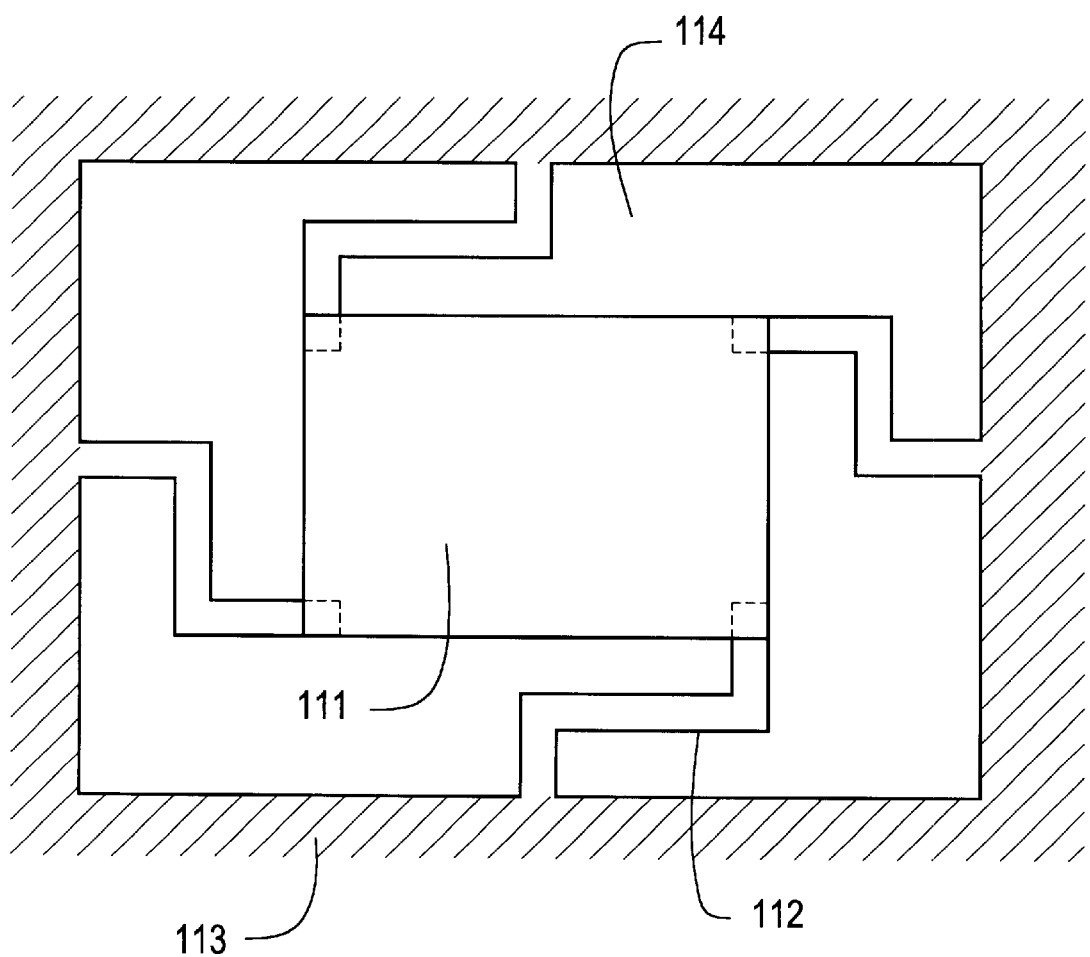
FIG. 11 is a diagram showing the structure of a flow rate detector according to the invention.

Then the present embodiment adopts a structure shown in FIG. 11 to minimize the quantity of heat escaping from the diamond thin film to the substrate for holding the diamond thin film, to enhance the sensitivity to a small flow rate and to enhance the measuring accuracy. In FIG. 11, the temperature sensing resistor (not shown) and exothermic body (not shown) are provided on a diamond thin film 111. Although the arrangement of the temperature sensing resistor and exothermic body is not limited to a special arrangement, the temperature sensing resistor must be thermally coupled only with the diamond thin film 111.

The diamond thin film 111 is held by a silica glass substrate 113 made of a silica glass material worked into such a shape as shown by holding parts 112. The temperature sensing resistor and exothermic body are provided on the front side of the surface of the drawing and the wires are provided along the holding parts 112.

It is important to contact the holding parts 112 with the corners of the rectangular diamond thin film 111. Those corner sections are sections where heat moves taking the longest distance when it moves. Accordingly, their thermal resistance can be maximized when the heat moves from the diamond thin film 111 to the substrate 113. Thereby, the quantity of heat flowing out to the substrate 113 from the diamond thin film 111 may be suppressed to the minimum. The reason why the holding part 112 has a shape of hook is because a thermal resistance to the heat flowing out to the substrate 113 through this section is increased to suppress the quantity of heat escaping to the substrate as much as possible. If the size of the diamond thin film is for example in the order of mm, the width of the holding part 112 can be about 100 micron or less.

The substrate 113 and holding parts 112 are made of silica glass because a thermal conductivity of silica glass is 1.38

$Wm^{-1}K^{-1}$ which is less than 1/1000 of the diamond thin film. It is also possible to use silicon for its material instead of silica glass and the portions which contact with the diamond thin film 111 can be oxidized or nitrided.

When such structure as shown above is adopted, the quantity of heat flowing out of the diamond thin film 111 reaches to the substrate 113 through the holding parts 112. However, because it receives a very high thermal resistance at this time, the quantity of heat flowing out may be suppressed. Thereby, the measuring accuracy for a small flow rate may be enhanced.

Because the both surfaces of the diamond thin film 111 contact with the fluid, there is a problem that the temperature sensing resistor and exothermic body are exposed to the fluid. However, there is also a merit that no large mechanical strength is required for holding the diamond thin film because the diamond thin film will not receive a high pressure only from one surface when a large flow rate is measured.

Figure 12A:
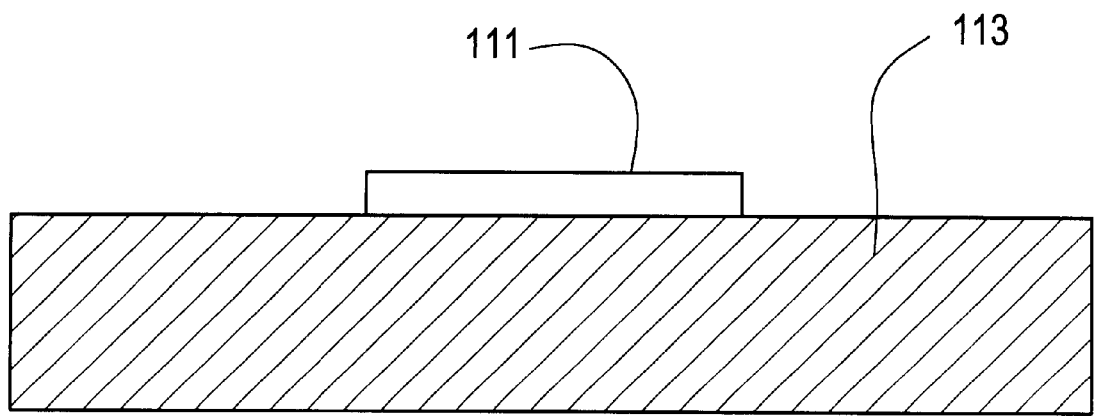
FIGS. 12(A) and 12(B) are cross sections of the flow rate detector shown in FIG. 11, illustrating successive steps to fabricate the detector.

A method for fabricating the structure shown in FIG. 11 will now be explained. FIG. 12 is a drawing for explaining a process for fabricating the mass flow sensor shown in FIG. 11. At first, as shown in FIG. 12, the diamond thin film 111 is selectively formed on the silica glass substrate 113 by such known methods as plasma CVD, magnetic field microwave plasma CVD and combustion. At, this time, if a silicon substrate is used for the substrate 113, it is desirable to form a silicon oxide film or silicon nitride film on the surface thereof to thermally insulate from the diamond thin film 111.

Figure 12B:
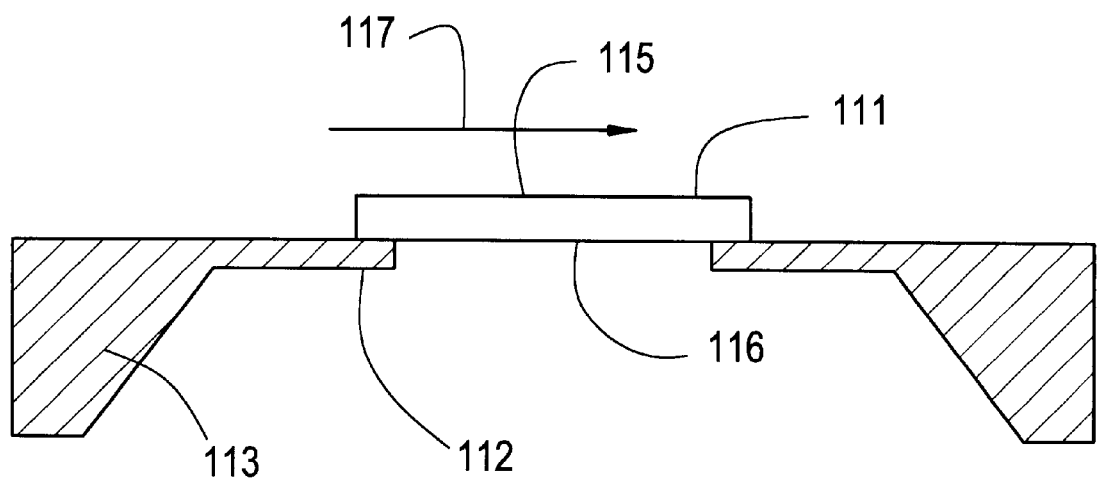

Then etching is carried out selectively from the back side by a known processing technology to expose the back side 116 of the diamond thin film as shown in FIG. 12B. Further, the hook-like holding parts 112) shown in FIG. 11 are formed. Then the temperature sensing resistor and exothermic body are formed on the back side 116 of the diamond thin film 111. For the temperature sensing resistor, there are such methods as to form a platinum thin film on the surface of the diamond thin film 111 by sputtering or evaporation to use it as a temperature sensing resistor or to form a p-type diamond thin film layer by ion-implanting B (boron) on the surface of the diamond thin film 111 to use it as a thermistor. It is simpler to form the exothermic body in the same time with the formation of the temperature sensing resistor as described before. Of course, the exothermic body may be formed by another material different from that of the temperature sensing resistor. Then lead wires are formed along the hook-like holding parts 112 shown in FIG. 11.

A protection film for protecting the temperature sensing resistor, exothermic body or wires is formed as necessary. For the protection film, a silicon oxide film, silicon nitride film, silicon carbide film, carbon film, DLC film, organic resin film may be used. The protection film protects the layer having the thermistor function, exothermic body and wires from being corroded by the fluid. However, the protection film has to be made of a material having a small thermal conductivity or its thermal capacity has to be reduced.

Thus the mass flow sensor in which the surface 115 of the diamond thin film 111 contacts with the fluid 117 is completed.

Ninth Embodiment

The present embodiment is an example in which the temperature sensing resistor 12 and the exothermic body 11 are structured by a diamond thermistor of p-type semiconductor into which B (boron) is implanted.

A method for fabricating it will be described. At first, as shown in the first embodiment, a polycrystal diamond thin film 15 micron thick is formed by the magnetic field microwave CVD method. Then the diamond thin film is cut into 4 mm square and placed into an ion implanting apparatus to implant B ion.

The ion implanting apparatus uses $B_2H_6$ as an original gas and accelerates B ion to about 100 KeV to implant it to the surface of the diamond thin film. A dose amount of B ion should be about $10^{16}$ to $10^{17}$ cm$^{-2}$. The diamond thin film needs to be heated up to about 100 to 500° C. when ion is implanted. After the ion-implantation, annealing is implemented by heating by a infrared light lamp. This annealing may be done by heating or by exposure of laser light.

It has been confirmed that by SIMS that in the diamond thin film into which B ion was implanted, B exists in the region less than 1 micron or especially within about 0.1 micron from the surface. That is, the p-type semiconductor layer formed by B ion implantation has a thickness of about 0.1 micron. The p-type diamond semiconductor layer has $10^{-4}$ to $10^{-5}$ ohm cm of resistance at the outermost surface.

Then the p-type semiconductor layer is patterned to form the region of the exothermic body 11 and the temperature sensing resistor 12 portion (hereinafter referred to as the thermistor layer, because it is a p-type diamond thermistor here). At this time, the exothermic body 11 is made so that its resistance becomes 100 ohm and the thermistor layer 12 becomes about 1 Kohm. The resistance values can be controlled as such by slightly etching the surface of the thermistor layer 12 and removing the low resistance layer of the outermost surface as shown in FIG. 1C. Then the mass flow sensor is completed by forming electrodes 10 and 15.

The mass flow sensor in which the exothermic body 11 and the thermistor layer made of the p-type diamond semiconductor layer are formed on the surface of the diamond thin film 13 can be obtained by the process as described above. A value of thermistor parameter of the thermistor layer 12 made of the p-type semiconductor layer formed by the process above was 1330 ppm, which means that the mass flow sensor has more than six times of sensitivity than the case when the platinum is used in the first embodiment.

As explained in the seventh embodiment, it is useful to enhance the sensitivity of the thermistor to enhance a measuring accuracy for small flow rate. Accordingly, it is very useful to use the thermistor using the p-type diamond semiconductor layer of the present embodiment to the second embodiment or other embodiments.

Further, when the exothermic body made of the p-type diamond semiconductor layer is formed on the surface of the diamond thin film, there is a merit that the diamond thin film will not move wavily due to a difference of coefficients of thermal expansion of the exothermic body when heated by the exothermic body. It is useful to structure the exothermic body by the p-type diamond semiconductor especially when heat pulse is adopted, because it is not preferable for the diamond thin film to receive unnecessary stress every time when it is heated.

Tenth Embodiment

The present embodiment is an example of a practical mass flow sensor in which four temperature sensing resistors are disposed on the surface of the diamond thin film. This sensor functions as a vector flow meter which allows to obtain information on the flow direction and flow rate of a fluid in the same time.

Figure 13:
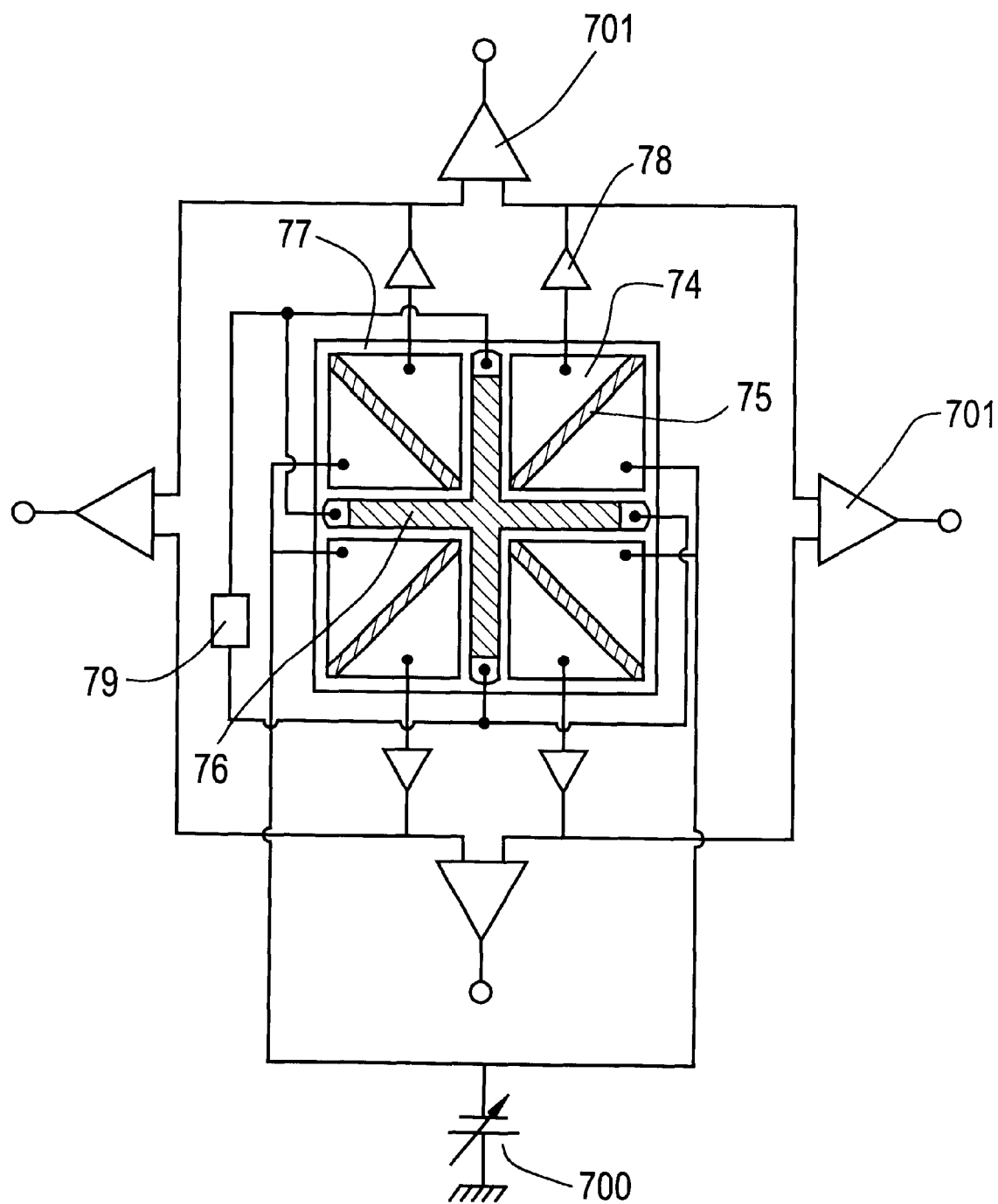
FIG. 13 is a circuit diagram of a flow rate detector according to the invention.

FIG. 13 shows an outline of the sensor. The size of the whole mass flow sensor shown in FIG. 13 is 4 mm square, wherein four sensor sections comprising a temperature sensing resistor 75 are provided. In the figure, a diamond thin film 77 of about 15 micron thick is the substrate of the mass flow sensor. The temperature sensing resistor 75 is made of a platinum thin film. A pair of metallic electrodes 74 for detecting current flowing in the temperature sensing resistor 75 are disposed so as to sandwich the temperature sensing resistor 75 by the bases of isosceles triangles thereof. An exothermic body 76 is made of a platinum thin film formed in the same time with the temperature sensing resistor 75. Those are formed adhering to one surface of the diamond thin film 77. The four temperature sensing resistors 75 and the exothermic body 76 are thermally coupled only through the intermediary of the diamond thin film 77. Those four temperature sensing resistors 75 output a temperature of the diamond thin film heated up by the exothermic body 76 as a change of own resistance value.

Figure 3:
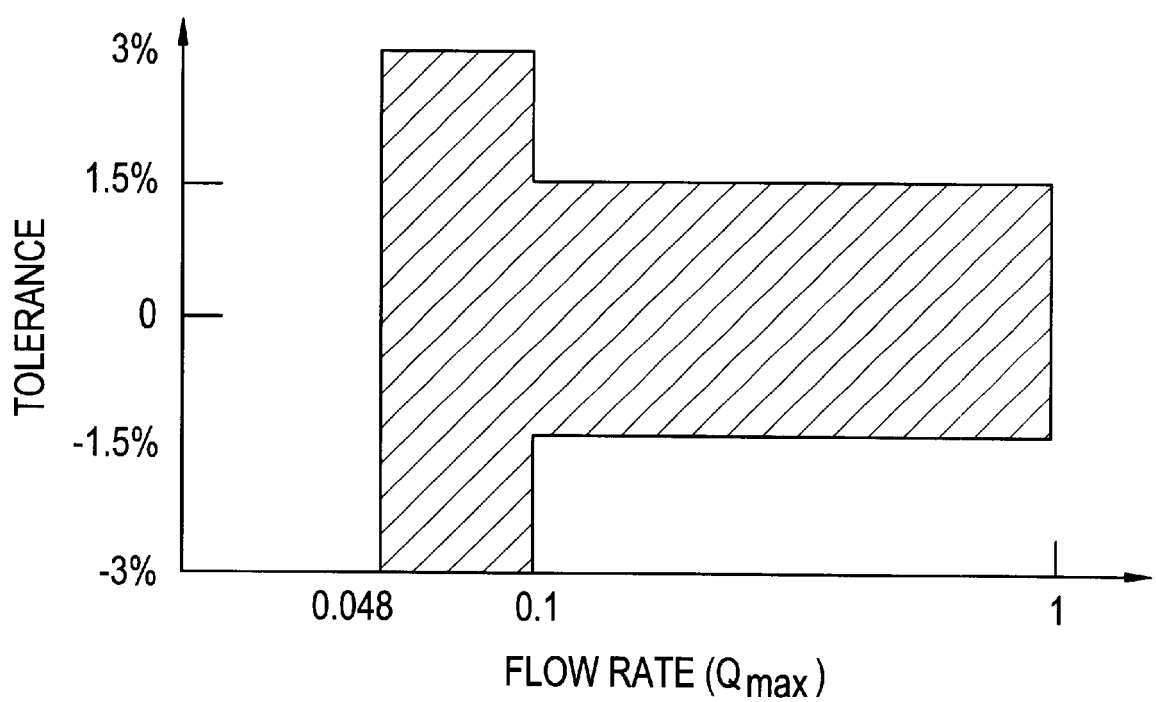
FIG. 3 is a graph illustrating measuring accuracy required for measurement of flow rates.

A processing section 78 for processing signals has such signal processing function as shown in FIG. 3. A differential amplifier 701 for amplifying a difference of signals input detects a difference of outputs from each of the temperature sensing resistors. A power source 79 flows a current for heating the exothermic body 76 and a bias power source 700 flows a current to the temperature sensing resistors 75 through the electrodes 74.

In FIG. 13, the section of the exothermic body 76 has a value of 10 to 100 ohm per sheet as a sheet resistance. That is, the exothermic body 76 generates Joule heat when a current flows therethrough. The method and conditions for fabricating it are basically the same with that described in the first embodiment.

When actually using it, as described in the second embodiment, the exothermic body 76 is heated pulsewise, changes of outputs of the four temperature sensing resistors 75 which correspond to the heat pulse are processed by the signal processing section 78 in accordance to a predetermined computation and its output is processed by the differential amplifier 701. Instead of the heat pulse, an alternate drive heating may be employed. The fluid is flown through the surface of the diamond thin film 77 on the back side (back side of the drawing) of the mass flow sensor.

The diamond thin film 77 is heated up by the exothermic body 76 within the time of $\Delta t_1$ as in FIG. 6 in which the operating principle is described. The response characteristics of the diamond thin film 77 that correspond to the heating is measured as changes of temperature thereof by the temperature sensing resistors 75 at four places. Then the output from each temperature sensing resistor is processed by the method described in the second embodiment, respectively.

Here, consider a case when the fluid is flowing from the right side to the left side on the drawing about the mass flow sensor shown in FIG. 13. In this case, more heat is taken away by the fluid from the right side than the left side of the diamond thin film. Accordingly, the outputs that correspond to the heat pulse within $\Delta t_1$ shown in FIG. 6 differ among those from the two temperature sensing resistors on the right side and from the two temperature sensing resistors on the left side. This difference of the outputs is output as signals by the differential amplifiers 701 disposed at upper and lower portions of the mass flow sensor in FIG. 13. This output indicates a difference of quantities of heat taken away by the fluid on the right side and left side portions of the diamond thin film and reflects the flow rate of the fluid. That is, the flow rate can be found from this output. As described above, the flow rate component of the fluid flowing in the horizontal direction on the drawing can be found from the outputs of the differential amplifiers 701 disposed in the vertical direction in FIG. 13. Further, a sense of the flow rate component in the horizontal direction can be found by checking a sign of the outputs from the upper and lower differential amplifiers 701.

In the same manner, a flow rate component and flow direction of a fluid flowing in the vertical direction on the drawing can be found from outputs of the differential amplifiers disposed on the right and left of the drawing.

Thus each flow rate component of the fluid flowing in parallel with the diamond thin film 77 can be obtained as vector and thereby the flow rate and flow direction of the fluid can be detected in the same time.

As described above, the flow rate and flow direction of the fluid can be detected in the same time by forming a plurality of temperature sensing resistors on the diamond thin film and by sensing response characteristics of the diamond thin film to heat pulse at a plurality of regions.

Further, because the fluid flows on the surface of the diamond thin film 77, not on the surface on which the temperature sensing resistors 75, metal electrodes 74, metal wires (not shown) are provided (i.e. the surface of the front side of the drawing) in the sensor shown in FIG. 13, the diamond thin film which is the most stable material functions as a protection layer and the sensor may be used even when a flow rate of corrosive gas is detected without worrying about corrosion of the thermistor layer, metal electrodes and metal wires.

Further, when the mass flow sensor having such structure as shown in FIG. 12 is fabricated, the sensor may be readily fabricated and in the same time, its sensitivity may be improved by arranging so that the coarse surface of the diamond thin film (final crystal growth surface) contacts with a fluid and by forming the temperature sensing resistors, electrodes and exothermic body section on the smooth surface (initial crystal growth surface).

The diamond thin film formed on a silicon substrate by a vapor phase method has a smooth surface (initial crystal growth surface) at the interface with the silicon substrate and a coarse surface (final crystal growth surface) on the exposed surface on the opposite side of the former. Taking an advantage of this fact, the surface area of the heat exchange section may be increased and an effectiveness of heat exchange with the fluid can be enhanced by forming the temperature sensing resistors, electrodes and exothermic body on the smooth surface of the diamond thin film peeled off from the silicon substrate and by arranging so that the coarse surface on the back contacts with the fluid.

The present embodiment is an example of a practical mass flow sensor, and the arrangement and the number of the temperature sensing resistors which are the sensor parts and the arrangement and shape of the electrodes and those of the exothermic body may be appropriately selected adapting to an actual measuring environment and measuring conditions.

The temperature sensing resistors 12 and exothermic body 11 may be made of a p-type diamond semiconductor instead of the platinum.

It is also possible to adopt an arrangement in which the exothermic body 76 is heated just by DC bias, temperature of each part of the diamond thin film that corresponds to the heating is measured by each temperature sensing resistor and a thermal gradient created in the diamond thin film is calculated from a difference of outputs of each of temperature sensing resistors. In this case, the difference of the outputs from each of the temperature sensing resistors is output from each differential amplifier 701 and the thermal gradient created in the diamond thin film 77 may be calculated from this output. A shape of the thermal gradient depends on the flow rate and flow direction of the fluid, so that the flow rate and flow direction of the fluid can be found in the same time from the thermal gradient.

Eleventh Embodiment

The present embodiment relates to an arrangement in which a gas is used as the fluid in the arrangement shown in the second embodiment to measure a moisture content within the gas. As described before, the response characteristics of diamond thin film to heating change depending on the quantity of heat taken away from the diamond thin film by the fluid. Accordingly, if a moisture content of the fluid (gas in this case) differs, a quantity of heat taken away from the diamond thin film by the fluid differs even if the flow rate is the same.

For example, in the arrangement shown in FIG. 4, the output from the computing element 48 is proportional to the quantity of heat taken away from the diamond thin film to the fluid, so that a difference of moisture in the fluid also naturally comes up in the output from the computing element 48.

Accordingly, the moisture content in the fluid can be found by studying and memorizing a relationship between the output computed and the moisture content beforehand and by comparing this memorized information and outputs in the actual measurement. An actual operating method is basically the same with that described in the second embodiment. In the measurement, the flow of the fluid must be made constant (including zero flow rate), because the quantity of heat taken away from the diamond thin film differs depending also on the flow rate. The present embodiment may be utilized in measuring moisture in air.

The mass flow sensor can also discriminate a difference of fluids by the same principle with the present embodiment. In this case, it can function as a gas sensor if a relationship between types of fluids and outputs computed in certain flow rates (including zero flow rate) has been studied beforehand.

Twelfth Embodiment

Figure 14A:
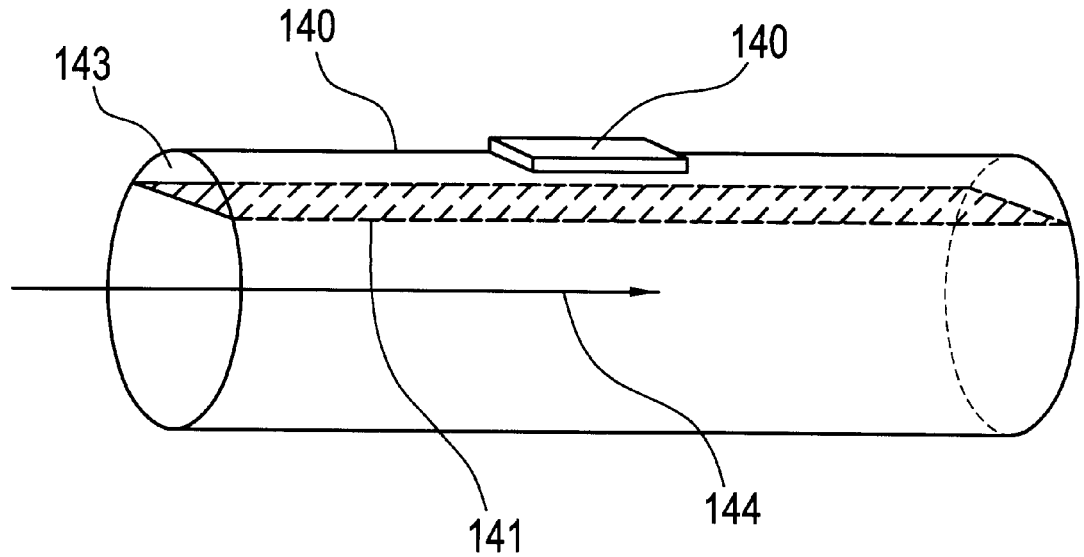
FIGS. 14(A) and 14(B) are perspective views of flow rate detectors according to the invention.

FIG. 14 shows an arrangement of the present embodiment in outline. In the figure, a cross section of a pipe 140 (made of plastic) in which a mass flow sensor 142 is provided is shown. The present embodiment is characterized in that the inside of the pipe 140 through which a fluid flows is divided by a partition 141 to divide the flow of the fluid into two as shown in FIG. 14A.

According to an experiment carried out by the inventors, a phenomenon that a measuring error increases in a certain measuring range was observed. In concrete, a phenomenon was observed that when a pipe of 1 cm in diameter was used, the measuring accuracy decreased by about 1 to 3% in a range of 10 to 25 slm. This aggravation of measuring accuracy can be seen in FIG. 9. That is, in FIG. 9, it can be seen that the tolerance in the flow rate of 10 to 30 slm is higher by 1 to 3% than that in less than 10 slm or more than 40 slm.

The inventors looked into the phenomenon and obtained the following findings. When Reynolds number is in between about 2000 and 4000, an intermediate state of laminar flow and turbulent flow appears and the flow becomes very unstable. It is because though the flow remains to be a laminar flow when Reynolds number is less than 2000, an unstable state in which turbulent flows are created locally is brought about when Reynolds number is in between 2000 and 4000. When Reynolds number is more than 4000, the whole flow is turned into a homogeneous turbulent state, so that a stable state is brought about as a whole and it will less disturb the flow rate measuring accuracy.

According to an estimation, the range in which Reynolds number becomes 2000 to 4000 in the above experimental condition is 14 to 28 slm. This almost agrees with the result of the experiment above.

From above, it is concluded that the flow rate measuring error will increase within a range in which a condition for Reynolds number to become 2000 to 4000 is realized.

Further, according to the aforementioned findings, it is concluded that the flow rate measuring accuracy may be improved if an arrangement is made so that Reynolds number will not become 2000 to 4000 in the flow rate measuring range.

Reynolds number $R_e$ is represented by $R_e = dV/v$. Where, d is an inner diameter of the circular pipe, V is flow velocity (m/s), and V is kinetic viscosity in the unit of $(m^2/s)$. V differs depending on types of fluid and temperature and pressure of the fluid. However, it may be considered normally as a constant because in air of 1 atm, it is $1.36 \times 10^{-5}$ $(m^2/s)$ in 4.4° C., $1.57 \times 10^{-5}$ $(m^2/s)$ in 26.7° C. and $1.76 \times 10^{-5}$ $(m^2/s)$ in 49° C.

When a flow rate is considered to be constant, a flow velocity V is inversely proportional to a square of the inner diameter of the pipe, so that Reynolds number is inversely proportional to the inner diameter of the pipe in this case. Accordingly, under the condition that a flow rate is constant, it is possible to reduce Reynolds number if the inner diameter of the pipe is increased and to increase Reynolds number if the inner diameter of the pipe is reduced. By the way, the flow rate is assumed to be defined by (flow velocity×sectional area of fluid).

At first, the method of increasing the inner diameter of the pipe will be considered. When the inner diameter of the pipe is increased, a flow rate measuring sensitivity drops because the flow velocity is reduced.

A measuring accuracy is an indicator for indicating that measured values can be obtained stably and the higher the S/N ratio of the whole device, the better the values obtained is. Therefore, even if Reynolds number is merely reduced to less than 2000, the measuring accuracy drops in the consequence, if the measuring sensitivity drops because S/N of the whole device is aggravated. That is, a dispersion of measured values becomes significant.

By the way, it is estimated that the inner diameter of the pipe has to be increased to more than 3.6 cm in order to reduce Reynolds number to less than 2000 when the maximum flow rate is set at 50 slm.

On the other hand, it is useful to reduce the diameter of the pipe because a flow velocity can be increased and a sensitivity can be enhanced. However, there is a problem that how much can the device be miniaturized. For example, when the minimum flow rate to be measured is 1 slm (liter/minute), the inner diameter of the pipe should be reduced to less than 40 micron in order to increase Reynolds number to more than 4000 and, it is not practical.

The same effect with the case when the pipe is thinned can be obtained not by thinning the pipe itself, but by filling or by disposing a choke and orifice within the pipe so that it becomes equivalent to a certain inner diameter. However, such arrangement for increasing the flow velocity is not preferable because it may become a factor of causing unnecessary pressure and turbulent flows when a flow rate is large.

In the estimation above, $R_e=1000\,V/(15\,\pi dv)$ was used. In the expression, $R_e$ is Reynolds number, V is a flow rate (slm), $\pi$ is a ratio of the circumference of a circle to its diameter, d is a diameter of the circular pipe (cm) and v is a kinematic viscosity of air in 20° C. (0.1486).

In the estimation above, a flow rate measuring range of 2 slm to 50 slm was assumed and air was used for the fluid (substituted by nitrogen gas here). When another flow rate measuring range and another fluid are used, the inner diameter of the pipe is determined so that Reynolds number is reduced to less than 2000 or is increased to more than 4000 following to the estimation expression above.

Now a flow rate detecting system which meets the following conditions when a flow rate measuring range is 1 slm to 50 slm will be explained. Air is used as the fluid (substituted by nitrogen gas):

the inner diameter of the pipe (made of plastics) is 1 cm, and

Reynolds number is reduced to less than 2000 or is increased to more than 4000 in the range of 1 slm to 50 slm.

As seen from the expression for representing Reynolds number $R_e$ ($R_e=dV/$), it is possible to control only Reynolds number if the inner diameter d of the pipe is changed without changing the flow velocity V. Then, in order to embody it, the arrangement as shown in FIG. 14A is adopted.

The arrangement shown in FIG. 14A is a method in which the apparent diameter of the pipe is changed without changing the flow velocity of the fluid. In the arrangement shown in FIG. 14A, the partition 141 made of a plastic material is disposed at a section of the pipe 140 of 1 cm in diameter and the fluid 144 flowing through the pipe is divided into two streams at that section. It is arranged so that only one of the streams contacts with the mass flow sensor 142.

The partition 141 reduces the sectional area of the fluid on the side in contact with the mass flow sensor 142 to about 1/20 of the inner area of the pipe 140. Accordingly, if the sectional area were transformed into a circular pipe, its inner diameter would be less than ¼ of the pipe 140. If the partition 141 is thin, its resistance is negligible. Accordingly, Reynolds number of the fluid on the side in contact with the mass flow sensor 142 is reduced to less than ¼ by adopting the arrangement as shown in FIG. 14A.

As described above, according to the estimation, Reynolds number becomes 2000 to 4000 in the pipe of 1 cm in inner diameter when the range is 14 slm to 28 slm. Therefore, according to this estimation, Reynolds number becomes more than 2000 when the range is more than 56 slm (more than 14×4 slm) when the arrangement shown in FIG. 14A is adopted.

Figure 15:
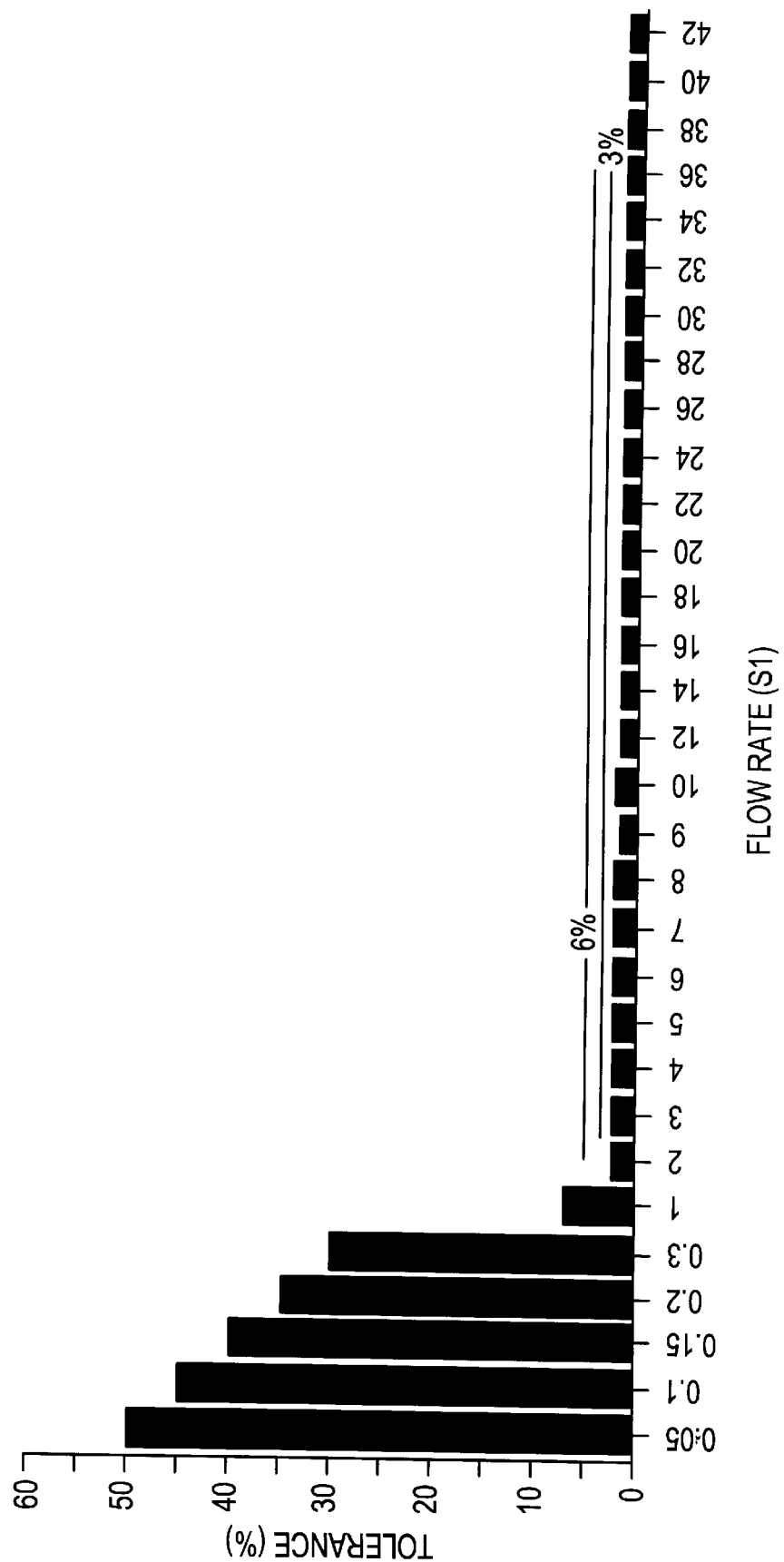
FIG. 15 is a graph showing the relation between flow rate and tolerance.

FIG. 15 shows a result of measurement of flow rate of nitrogen gas carried out using the arrangement shown in FIG. 14a. As shown in FIG. 15, a stable flow rate could be measured with a tolerance (measuring accuracy) of less than 3% (less than ±1.5%) in a range of 2 slm to 50 slm. This measuring accuracy is higher than that shown in FIG. 9 and is a value that demonstrates that the mass flow sensor can be very practically used.

Figure 16:
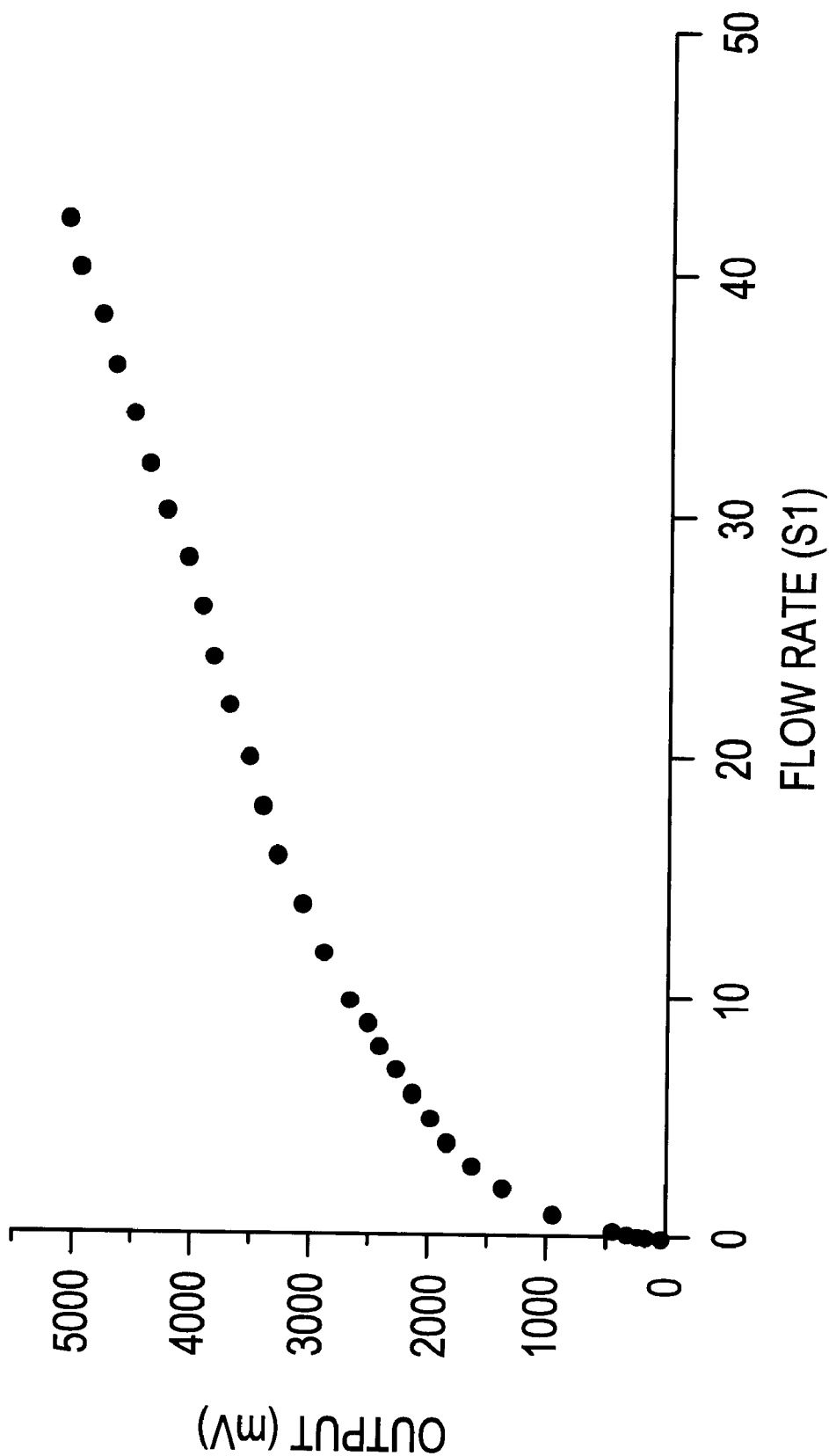
FIG. 16 is a graph showing the relation between flow rate and the output from a flowmeter.

FIG. 16 shows a relationship between values of flow rate and computed outputs. Although only measurement results of up to 40 slm are shown in FIG. 16, it has been confirmed that a flow rate can be measured up to more than 100 slm.

The causes why such high measuring accuracy as shown in FIG. 15 could be obtained may be considered as follows:

(1) The measuring accuracy could be prevented from dropping due to turbulent flows because the measurement was carried out in a laminar flow state in which Reynolds number was less than 2000, (2) Because the measurement was carried out in the laminar flow state in which Reynolds number was less than 2000, no unnecessary vibration caused by turbulent flows was propagated to the diamond thin film and temperature sensing resistors and a noise level caused by mechanical vibration was reduced, and (3) An introducing method of the fluid and other arrangements were designed so that no turbulent flow would be generated. For example, an arrangement was made so that the inner diameter of the passage would not change extremely at the end portion of the pipe.

On the other hand, it was confirmed that the sensitivity or measuring accuracy for small flow rate of less than 1 slm dropped by adopting the arrangement shown in FIG. 14A. It may be because the quantity of heat taken away by the fluid is reduced because the fluid is divided by the partition 143 and the flow rate that contacts with the mass flow sensor is reduced to less than 1/20.

Figure 14B:
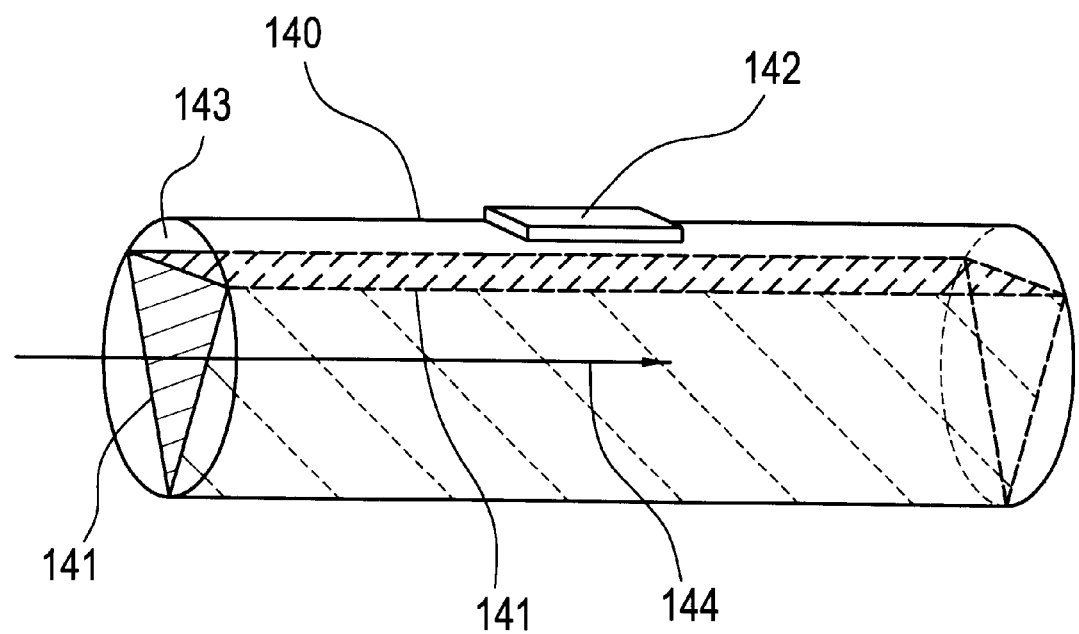

Although the fluid has been divided into two in the arrangement shown in FIG. 14A, how the fluid is parted is determined by a relationship of necessary flow rate range and Reynolds number. For example, the fluid may be divided in a manner as shown in FIG. 14B. As seen in FIG. 14B, the partition is formed into a triangular shape to allow to enhance the strength thereof.

However, no matter what kinds of structure is adopted, it is not preferable to obstruct a flow of the fluid. The partition is also desirable to be one having a small thermal conductivity. It is because when the mass flow sensor 142 and the partition 141 are positioned close to each other, the quantity of heat taken away from the mass flow sensor 142 to the fluid escapes to the partition 141 and due to its influence, the sensitivity substantially drops.

As described above, Reynolds number may be changed in a certain flow rate by parting the inside of the pipe along the flow direction of the fluid. Then Reynolds number may be reduced to less than 2000 in a necessary flow rate range and the flow rate measuring accuracy be enhanced.

Although the circular pipe has been presupposed in the explanation above, the shape of the pipe is not confined only to circular shape, and may be a polygonal shape. In this case, Reynolds number is calculated by converting the polygonal shape into a sectional area of a circular pipe.

Thirteenth Embodiment

The present embodiment relates to an arrangement for reducing the inner diameter of the pipe substantially. As described before, when air is used as the fluid, Reynolds number may be increased to more than 4000 in the flow rate range of 1 slm to 50 slm by reducing the diameter of the pipe in the order of micron.

However, it is not easy to fabricate the diamond thin film in the order of micron and to form the thermistor and exothermic body on the surface thereof. Furthermore, because a thermal capacity of the device itself is reduced extremely, a quantity of heat taken away by others than the fluid becomes significant and thereby the sensitivity and measuring accuracy drop.

Then in the present embodiment, a choke is provided in the middle of the pipe to increase the flow velocity at such portion to change Reynolds number. In the arrangement shown in FIG. 17, a choke portion 172 is provided in a part of a rectangular pipe and a mass flow sensor 171 is disposed thereon.

The fluid is choked at a taper portion 173 and flows through the choke portion 172 where the sectional area is small. At this time, Reynolds number ($R_e=dV/v$) is changed. As described before, when the flow rate is assumed to be constant and the sectional area is converted into a circular shape, Reynolds number increases in inversely proportional to d. Accordingly, Reynolds number for a certain flow rate may be increased at the section of the choke portion 172.

Figure 17:
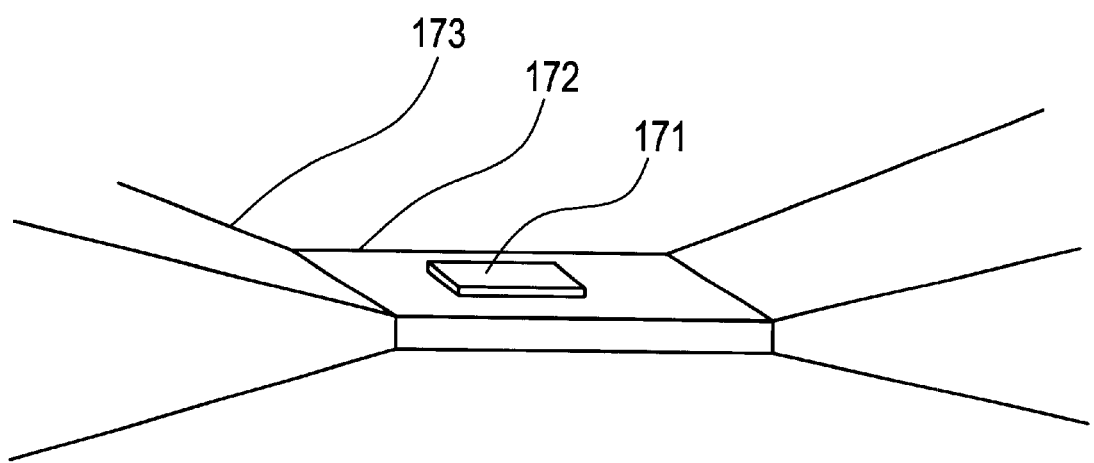
FIG. 17 is a perspective view of a flow rate detector according to the invention.

For example, a system which allows to measure flow rates without being influenced by a turbulence of flow within the range of 2000 to 4000 of Reynolds number may be arranged by determining the sectional area of the choke portion so that Reynolds number is increased to more than 4000 in a certain flow rate range. In the case when the arrangement as shown in FIG. 17 is adopted, a necessary size of the sensor 171 may be assured by forming the choke portion 172 into rectangular shape.

However, if the fluid is choked at the choke portion 172 too much, a resistance is build up and a flow of the fluid is disturbed when a large amount of fluid flows through. Also a debris and deposit plug the passage, dropping the reliability.

Fourteenth Embodiment

The present embodiment relates to an arrangement in which a piece of material is provided in contact with the fluid to realize a stable fluid state, to eliminate an abrupt turbulence of flow and local turbulence of flow and to improve the flow rate measuring accuracy without changing Reynolds number.

As described before, the flow rate measuring accuracy is lowered when abrupt or local turbulent flow is generated. It is necessary to create a laminar flow state or complete turbulent flow state in order to prevent this phenomenon from occurring. The 11th and 12th embodiments are what prevent this problem from occurring by controlling Reynolds number in a specific flow rate. Contrary to that, an arrangement for stabilizing a flow of fluid without changing Reynolds number under the condition that the flow rate is constant is adopted in the present embodiment. In concrete, the present embodiment is characterized in that an irregularity is created on the inner wall of the pipe or that a piece of thin material is provided.

Figure 18A:
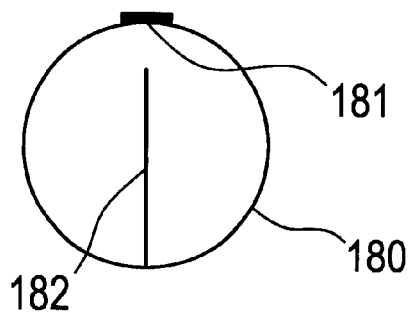
FIGS. 18(A) to 18(C) are plan views of flow rate detectors according to the invention.
Figure 18B:
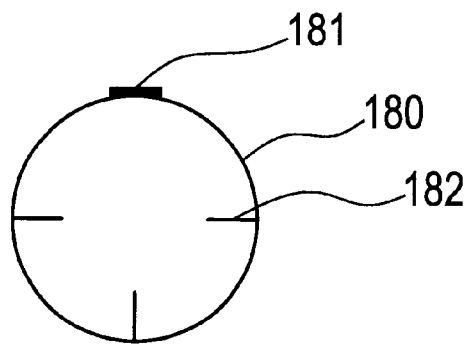
Figure 18C:
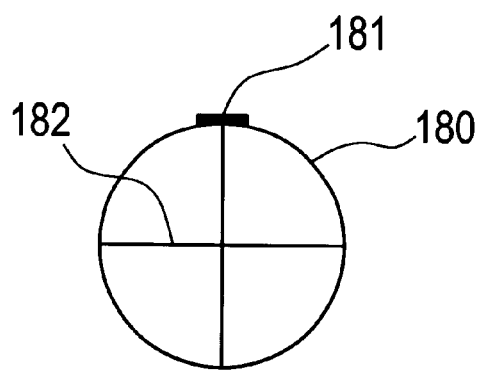

FIGS. 18A through 18C show the arrangement of the present embodiment. In the figures, a cross section of a pipe 180 on which a mass flow sensor 181 is provided is shown. In the figures, a piece (pieces) of material 182 is made of plastic or resin material. This piece has to be thin so that it will not obstruct a flow of fluid. Its thermal conductivity also has to be low.

In the arrangements shown in FIGS. 18A through 18C, the inside of the pipe 180 is not divided. Accordingly, the sectional area of the pipe does not change and Reynolds number $R=dV/v$ also does not change.

Although an arrangement in which the inside of the pipe is divided into quarters is shown in FIG. 18C, the pieces 182 are provided at a different place from the mass flow sensor 181 and Reynolds number at the portion where the mass flow sensor is provided will not change. For example, supposing that the fluid flows through from the front side of the drawing to the back side thereof, the pieces 182 are provided on the front side of the drawing and the mass flow sensor 181 is provided on the back side thereof.

The pipe is constructed as shown in FIG. 18C to rectify the flow of the fluid by the pieces of a cross to prevent local turbulent flows from occurring. Although the cross construction is shown in FIG. 18C, another construction such as honeycomb construction may be adopted.

Further, in the construction shown in FIGS. 18A and 18B, the position where the piece 182 is provided and that where the mass flow sensor 181 is provided are not necessarily confined there. However, the piece 182 must be provided on the upstream side before the mass flow sensor 181. Moreover, the effect of the piece 182 cannot be obtained if it is separated from the mass flow sensor 181 too far.

The adoption of the construction as shown in FIG. 18 allows abrupt or local turbulent flows to be suppressed from occurring and to enhance the flow rate measuring accuracy.

It is also useful to create an irregularity on the inner wall of the pipe to obtain the same effect with that shown in FIG. 18. It is also effective to use the arrangement of the present embodiment together with the method for controlling Reynolds number as shown in the 11th and 12th embodiments.

Fifteenth Embodiment

The present embodiment relates to a method for disposing the mass flow sensor in a passage, e.g. a pipe, of a fluid. When a pipe is used as the passage of the fluid, an arrangement in which the mass flow sensor is embedded in a part of the pipe as shown in FIGS. 5A and 5B is given at first.

Figure 20A:
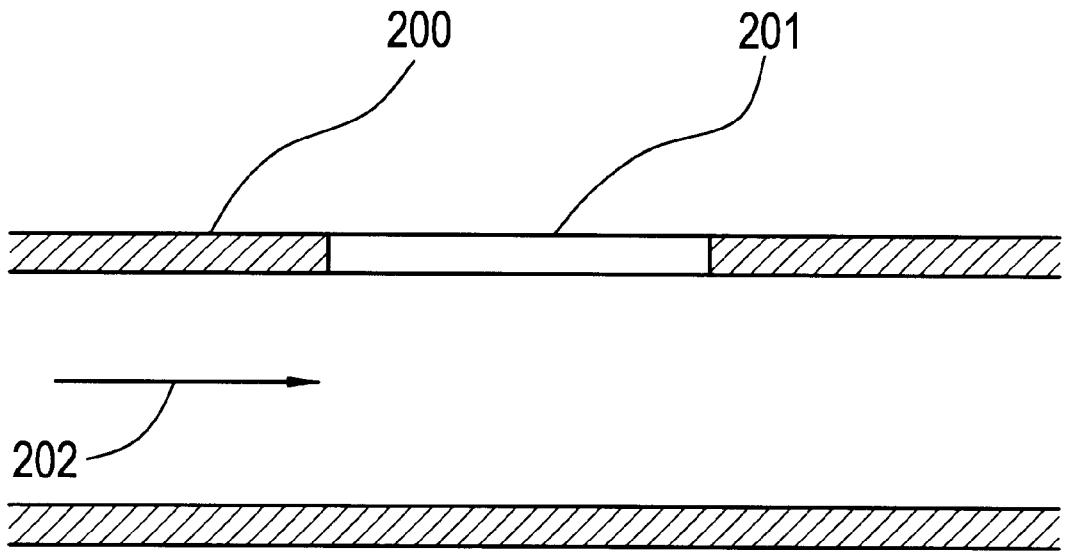
FIGS. 20(A) and 20(B) are cross sections of flow rate detectors according to the invention.

FIG. 20A shows such an arrangement in a simplified form. In FIG. 20A, a mass flow sensor 201 is built in a substrate of teflon or the like which has a high heat insulating quality similarly to what shown in FIGS. 1 and 5. The mass flow sensor composes a part of the inner wall of a pipe 200 and has a merit that it will not obstruct the flow of a fluid 202. This is important for not causing unnecessary turbulent flows in the fluid.

On the other hand, there is a problem that the whole surface of the diamond thin film cannot be utilized effectively because heat is taken away by the fluid 202 precedently from the surface of the diamond thin film on one end which contacts with the fluid at first.

Figure 20B:
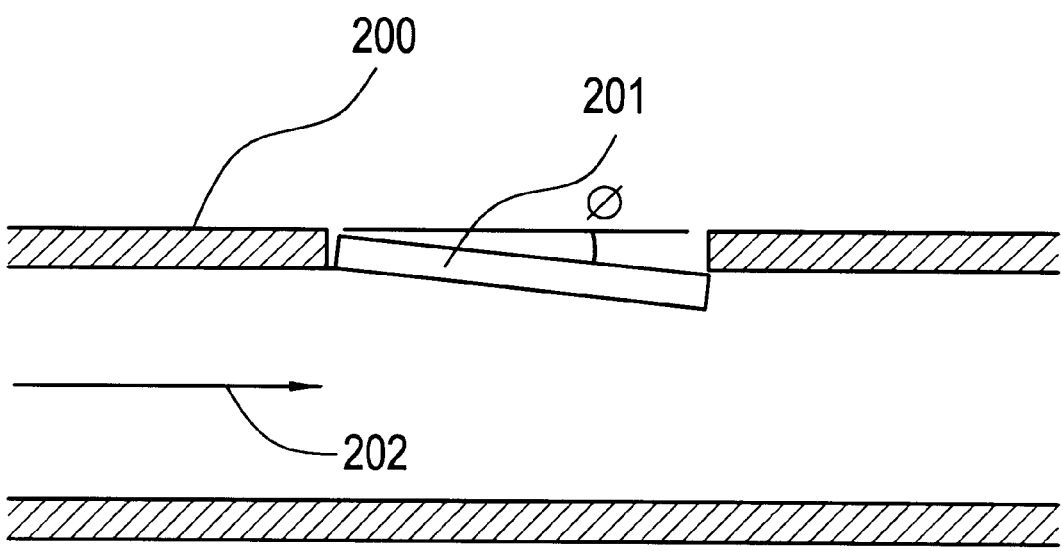

Then it is conceivable to place the mass flow sensor or only the diamond thin film at an angle of φ to the fluid to effectively expose the whole surface of the diamond thin film to the fluid 202 as shown in FIG. 20(B). By adopting such an arrangement, more fluid 202 contacts with the whole surface of the diamond thin film, so that it is expected that the effectiveness of thermal exchange is improved and the sensitivity for small flow rate is enhanced.

In an actual measurement, it was confirmed that the sensitivity had improved to a flow rate of less than 1 slm. On the other hand, however, it was confirmed that sensitivity dropped more or less for a large flow rate.

As described above, although it is possible to enhance the measuring sensitivity by adopting the construction of FIG. 20B, the construction of FIG. 20A is considered to be more practical considering the structural stability, reliability and the problem of causing turbulent flows unless an improvement of the sensitivity is especially required.

Sixteenth Embodiment

The present embodiment relates to an arrangement in which a thermal coupling of a temperature sensing resistor and exothermic body formed on a diamond thin film is densified. FIG. 19 shows the arrangement of the present embodiment. In FIG. 19, the reference numeral 191 denotes a diamond thin film, 192 a temperature sensing resistor and 193 an exothermic body. The composition of the temperature sensing resistor and exothermic body is not confined, and one which uses metal or semiconductor may be utilized.

The adoption of the arrangement of the present embodiment allows the temperature sensing resistor 192 and exothermic body 193 to be thermally densely coupled through the intermediary of the diamond thin film 191 and a quantity of heat taken away from the diamond thin film by the fluid to be measured in a high sensitivity. The present embodiment shows a construction of a device portion and may be utilized for the mass flow sensor in the other embodiments as a matter of course.

Seventeenth Embodiment

The present embodiment is an example in which the whole diamond thin film is made of a semiconductor having on e conductive type. When the diamond thin film is constructed as such, the diamond thin film itself functions as a thermistor or a temperature sensing resistor. The operating method of the present embodiment is the same with that described in the second embodiment. If DC drift is eliminated or is negligible, it may be used as a sensor for detecting a quantity of heat taken away from the diamond thin film to the fluid.

Figure 21:
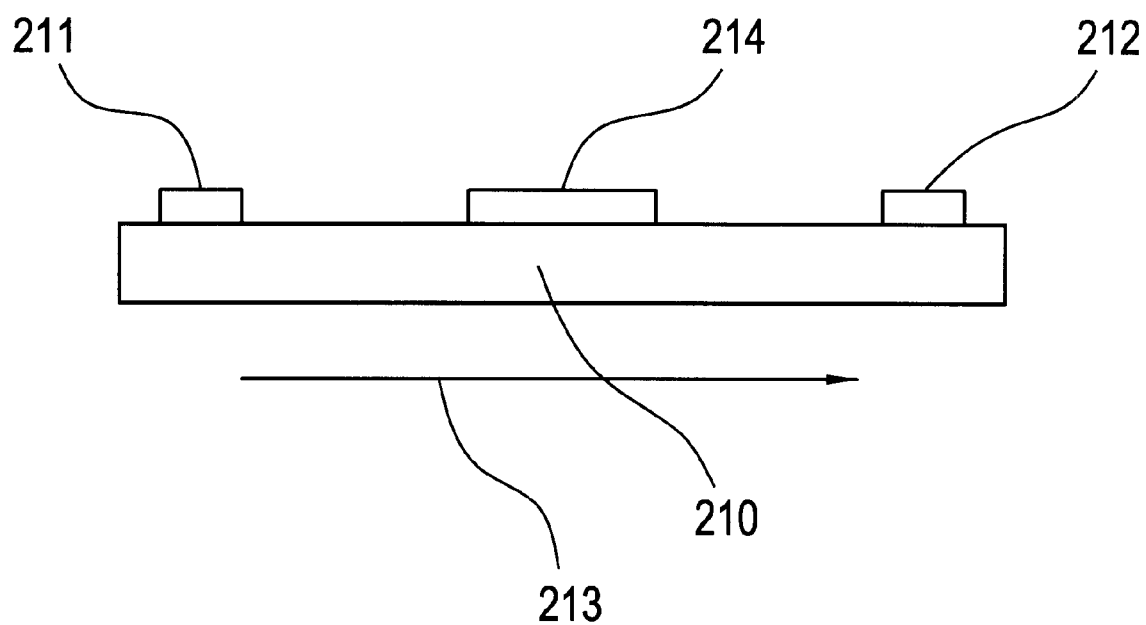
FIG. 21 is a side elevation of a flow rate detector according to the invention.

FIG. 21 shows the present embodiment in outline. In FIG. 21, the reference numeral 210 denotes a p-type diamond thin film which is one conductive type diamond thin film and 211 and 212 denote electrodes. The diamond thin film 210 can function as a thermistor by the potential or by flowing a current between those electrodes. An exothermic body 214 is made of platinum. It is preferable for a fluid 213 to flow through a surface on the opposite side from a surface on which the electrodes 211 and 212 and the exothermic body 214 are provided to prevent them from being corroded by the fluid.

It is preferable to hold the diamond thin film in a state isolated from the surroundings as much as possible to minimize a quantity of heat escaping to others than the fluid. In concrete, it is important to embed it in a thermally insulating substrate as shown in FIG. 5 or to hold by a support having a high thermal resistance as shown in FIG. 11.

The followings are conditions for fabricating the p-type diamond thin film 210. Here, an example for forming the p-type diamond thin film by a microwave plasma CVD method is shown.

Original material: methanol+$B_2O_3$ (or $H_3BO_3$)
  Mixed ratio is set so that B becomes 1000 ppm to C.
Power of microwave: 600 W
Substrate: monocrystal silicon (100 facets)
Film forming pressure: 70 Torr
Film forming speed: 0.5 micron/h After forming the film, a heat annealing or annealing by lamp heating is carried out in hydrogen atmosphere to activate it. Under the film forming conditions described above, $B_2H_6$ may be used as an original gas of B. By the way, it is needless to say that the p-type diamond thin film may be formed by other film forming methods.

Further, a resistor formed near the surface of the diamond thin film may be used instead of the exothermic body 214. For example, an exothermic resistor may be formed by implanting ion to the surface of the p-type diamond thin film to turn into amorphous. For the ion implanted, oxygen, carbon, nitrogen or silicon may be used.

Moreover, it is also possible to cause the p-type diamond semiconductor layer 210 itself to function as an exothermic body to let it generate heat by itself without providing the exothermic body 214.

Eighteenth Embodiment

In the present example, the surface of a diamond film having a thickness of 10 $\mu$m is doped with boron to form a p-type semiconductor layer. This layer is operated as a thermistor.

First, an intrinsic or substantially intrinsic, thin diamond film is formed on a silicon substrate by low-pressure CVD. This diamond film is grown without intentionally containing nitrogen, boron, or other impurity. The specific resistance is $10^{10}$ to $10^{15}$ $\Omega$·cm.

In carrying out the CVD, whistler-mode CVD utilizing a magnetic field is used. The film is grown under the conditions: the substrate temperature is 800° C.; the pressure inside the reaction chamber is 0.25 torr; and the power of the input microwaves is 4 kW. The silicon substrate is placed at a location where the strength of the magnetic field is 875 Gauss. A CVD process is performed to grow the thin diamond film on the silicon substrate. In order to obtain a raw material gas, 1 part of methyl gas $CH_3OH$ and 4 parts of hydrogen gas $H_2$ are mixed. The film is grown for 24 hours. A diamond film having a thickness of about 10 $\mu$m is formed on the silicon substrate.

The thin diamond film grown on the silicon substrate can be separated by peeling the film off the substrate. At this time, a thin diamond film alone can be easily obtained by a mechanical peeling method, a method of dissolving the substrate with hydrofluoric acid or the like, or other method.

This thin diamond film is cut into the size of 5 mm×5 mm and placed into an ion implanter. This implanter uses $B_2H_4$ as a raw material gas and accelerates boron ions to about 100 keV to irradiate the surface of the diamond film with these ions. The dosage is $10^{16}$ to $10^{17}$ atoms/cm$^3$. At this time, it is necessary that the target substrate be heated at 100–500° C.

In this thin diamond film doped with boron ions in this way, boron ions collide at depths within 1 $\mu$m from the surface in response to the accelerating energy less than 150 keV, thus forming a p-type semiconductor layer. The accelerated boron ions are concentrated around the surface of the diamond film. Therefore, the shallowest surface layer has a low resistivity portion of 1 to 10 $\Omega$·cm. In the present example, this p-type semiconductor layer is used as a thermistor layer and so the resistivity of the shallowest surface layer is adjusted. For this purpose, the shallowest surface layer is removed to a depth of 50 to 100 Å by an etch back process. The specific resistance of the surface is adjusted to $10^6$ to $10^7$ $\Omega$·cm. By this step, a thermistor parameter of 1400 can be derived. This thermistor parameter is the energy required to activate boron ions in diamond and expressed in the Kelvin scale.

In this way, a thermistor layer formed by a p-type semiconductor layer can be formed on the surface of the thin diamond film integrally with this diamond film.

In the etch back process described above, the heating element for maintaining the thermistor layer heated can be formed simultaneously, by using the shallowest surface layer doped with boron ions. In this case, in the etch back process for adjusting the surface resistance of the diamond film doped with boron ions, a portion which should become a heating element can be masked, and the masked portion is used as a heating element of a low resistivity. That is, the portion left without adjusting the resistivity is used as a resistor that generates heat.

Referring again to FIGS. 1, (A)–(C), a portion 12 is formed as a thermistor layer which is formed as a p-type semiconductor layer in an etch back process. In this process, the masked portion can be formed as a heating element 11.

In this way, the p-type semiconductor layer having a thickness of about 0.1 μm is formed over the whole surface of the diamond film 10μ thick. Thus, a flow detector is completed.

Figure 22:
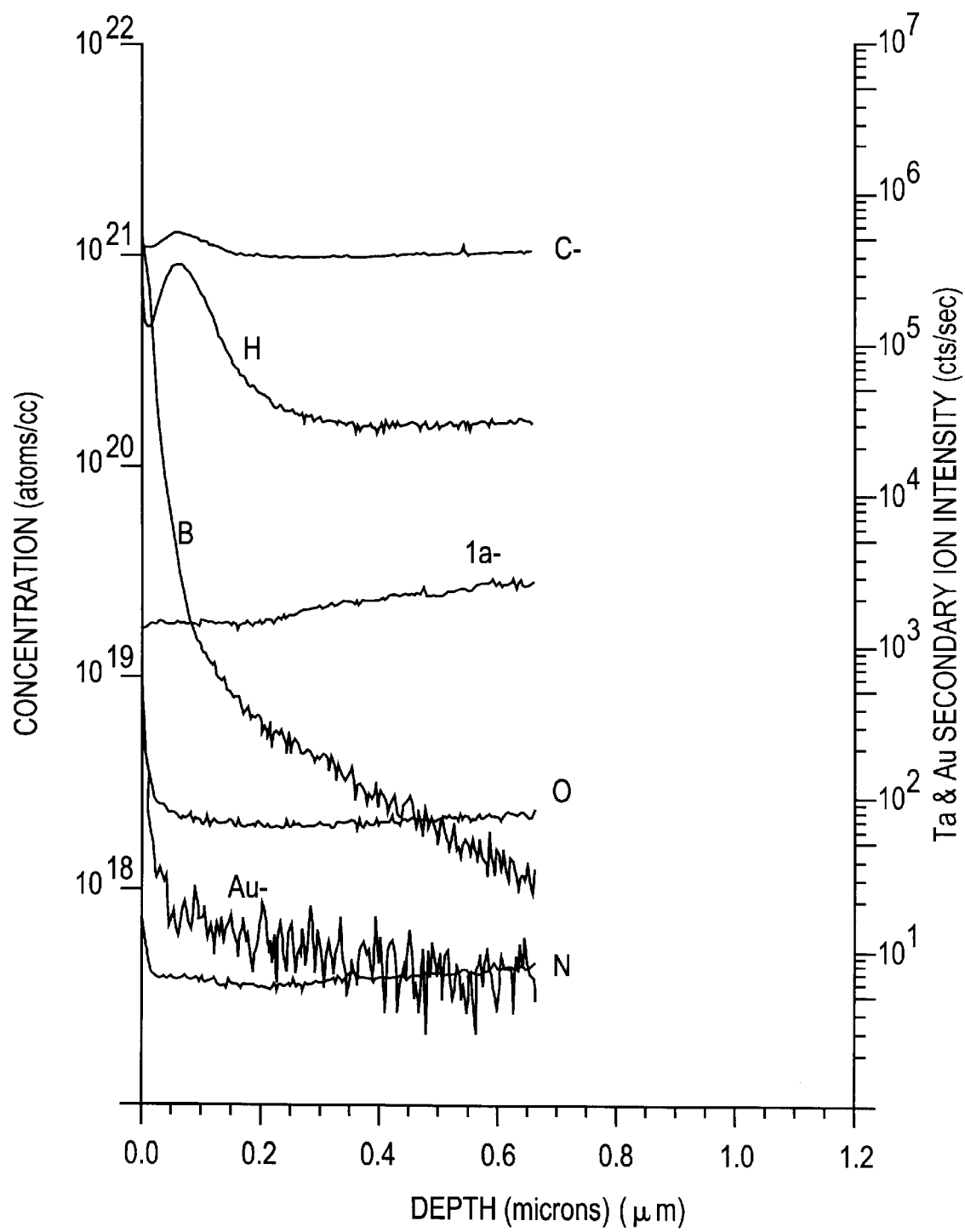
FIG. 22 is a graph showing the impurity concentration distribution, taken in the direction of the thickness, of a thin diamond film which is first implanted with boron ions and then etched away 500 Å from its surface.

FIG. 22 is a graph showing the distributions of impurities in the above-described thin diamond film doped with boron ions and etched to a depth of 500 Å. The distributions were measured by SIMS. In this graph, the distributions of Ta and Au are plotted on the right scale. Traces of Ta and Au remaining in the reaction chamber were observed. It is to be noted that boron ions implanted are mainly distributed in a region within about 0.1 μm from the surface. This means that the thermistor layer formed by a p-type semiconductor layer has a thickness of about 0.1 μm. A pair of metal electrodes is formed to obtain the output from the thermistor.

Although boron ions are implanted into the thin diamond film, the electrical characteristics are not stable because the doped layer is not activated. Therefore, the layer is thermally annealed by heating with a lamp or the like to activate boron ions. As a result, the layer close to the surface of the diamond layer becomes a p-type semiconductor layer having a uniform thickness of 0.1 μm. The specific resistance is $10^{-4}$ to $10^{-5}$ Ω·cm. The thermistor parameter is 1000 to 4000. Various annealing methods such as laser irradiation, irradiation of light, and irradiation of microwaves, can be used as well as heating.

Figure 23:
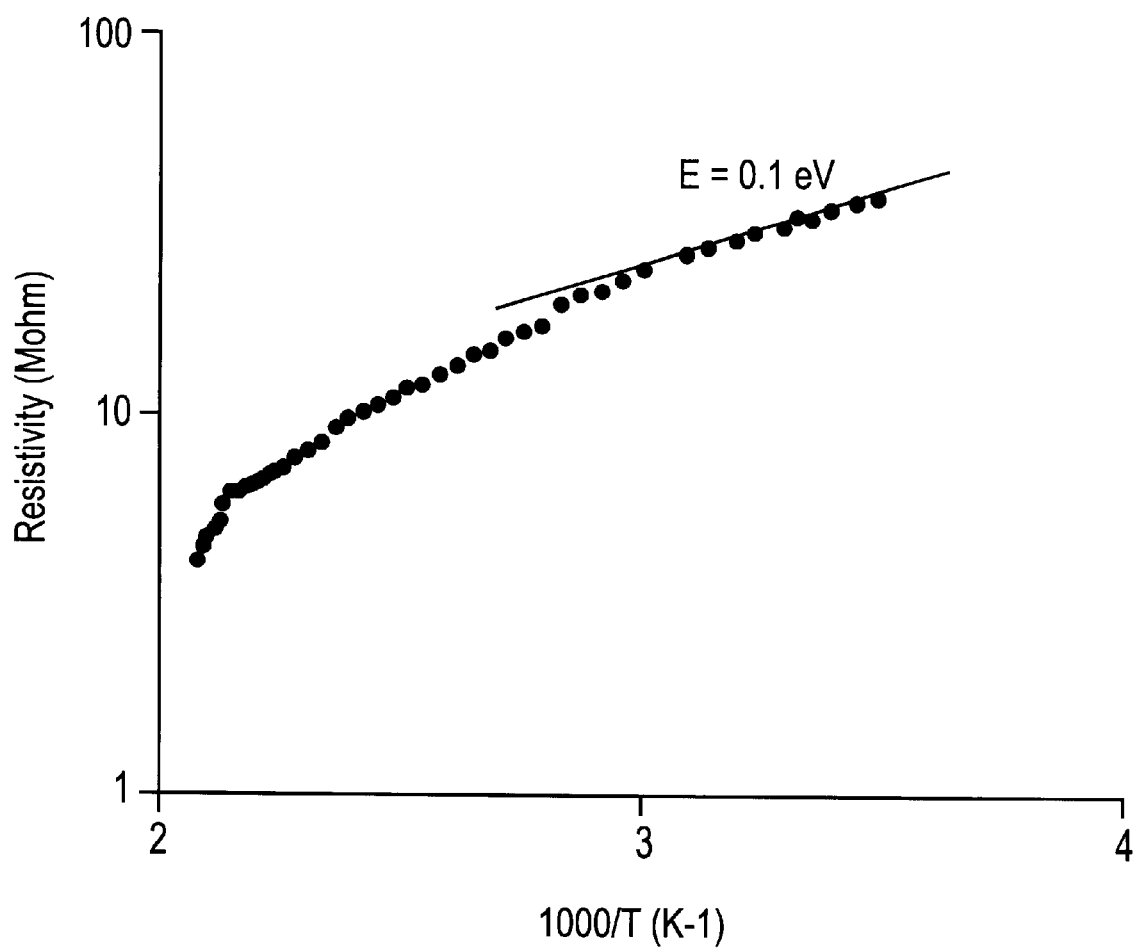
FIG. 23 is a graph showing the dependence of the resistivity of the diamond film illustrated in FIG. 22 on temperature.

The activation energy of the p-type diamond layer fabricated in this way was measured. The results are shown in FIG. 23. The activation energy of the p-type diamond layer around room temperature is calculated at 0.1 eV from FIG. 23. The thermistor parameter is calculated at 1330.

Figure 24:
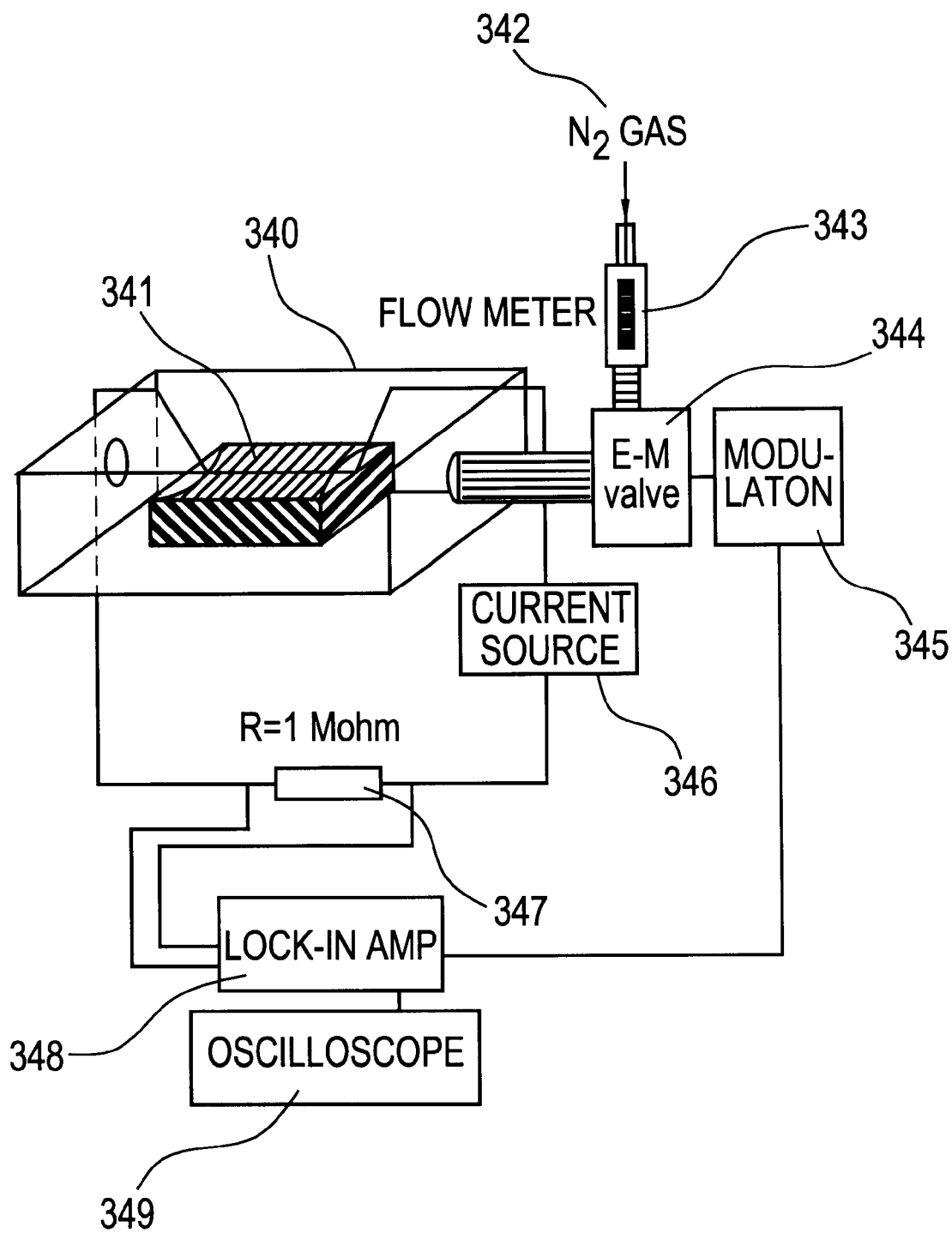
FIG. 24 is a block diagram of an instrument used in Example 18.

A thin diamond film having the above-described p-type semiconductor layer is operated in a flowmeter system shown in FIG. 24. Nitrogen gas $N_2$ 342 is introduced into a solenoid valve 344 via a flowmeter 343 and forced into a box 340 where the present example of flow rate detector 341 is installed. A gas release port is formed in the box in the direction of the flow of the gas so that gas may not linger inside the box. The nitrogen gas to be measured flows while in contact with the p-type semiconductor layer acting as a thermistor which is formed on the surface of the flow rate detector 341. As described above, the flow rate detector 341 comprises the thin diamond film having a thickness of 10 μm, the p-type semiconductor layer having a thickness of 0.1 μm formed on the surface of the diamond film, and the pair of electrodes formed on the p-type semiconductor layer.

During the measurement, the p-type semiconductor layer acting as a thermistor is not intentionally heated. The solenoid valve 344 is driven by a 2-Hz signal obtained via a modulator 345 from an oscillator included in a lock-in amplifier 348. In this way, the flow of the nitrogen gas is modulated with AC waves. The resulting flow rate variations are detected by the flow rate detector 341. To detect the flow rate variations, an electrical current is supplied from a power supply 346 to the p-type semiconductor layer on the surface of the thin diamond film of the flow rate detector 341. This electrical current is detected as a voltage with a resistor 347 of 1 MΩ. The detected voltage is registered by the lock-in amplifier 348 or by an oscilloscope 349. In this way, variations in the flow rate are measured as variations in the output current from the thermistor. At the same time, the flow rate of the nitrogen gas is precisely measured with the calibrated flowmeter 343. The relation between the output voltage from the thermistor formed by the p-type semiconductor layer and the flow rate can be derived from the experimental instrument constructed as described above.

Figure 25:
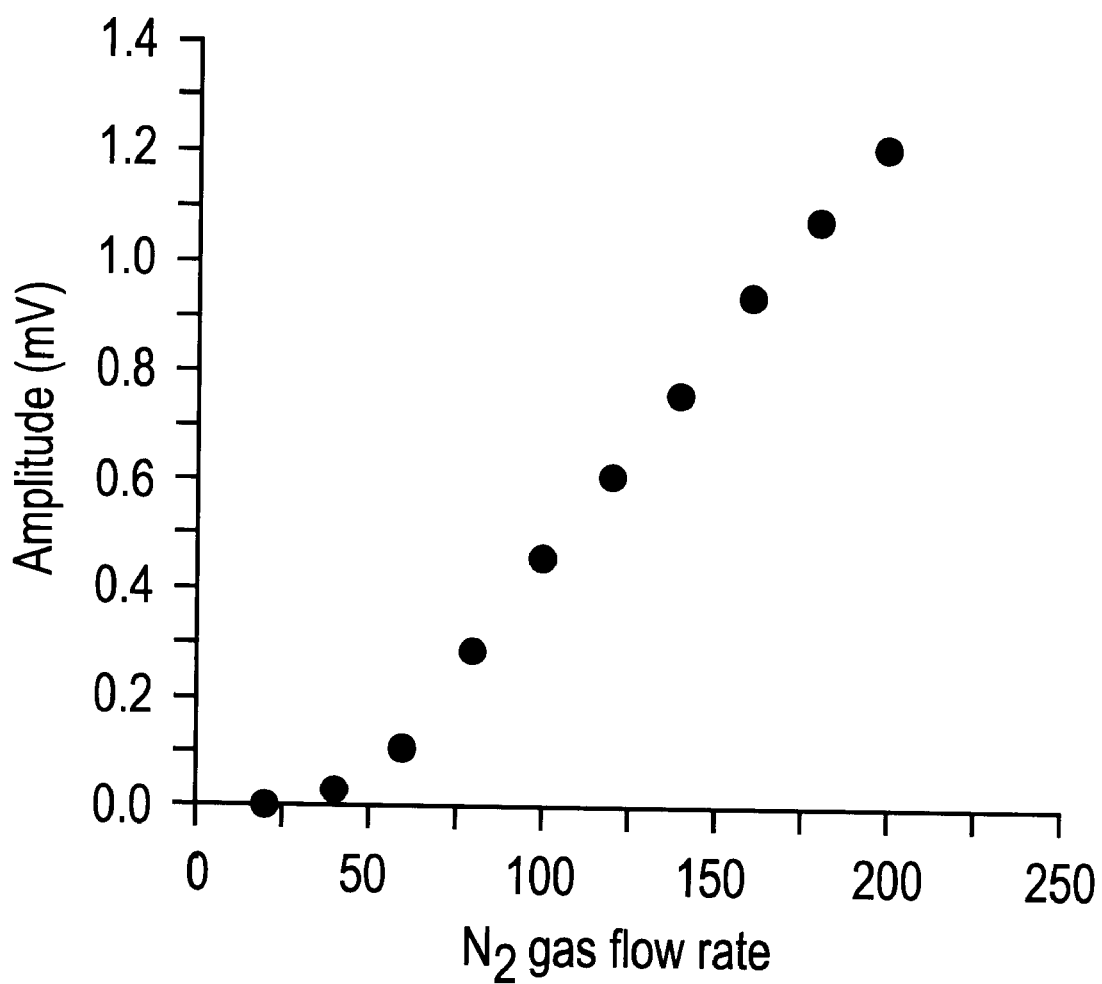
FIG. 25 is a graph showing the relation between the amplitude of the output from a flow rate detector according to Example 18 and the flow rate of nitrogen gas.

FIG. 25 shows one example of relation between the nitrogen gas flow rate and the output voltage obtained from the system shown in FIG. 24. It can be seen from FIG. 25 that the output increases linearly with increasing the nitrogen gas. In this case, the flow rate detector 341 is not intentionally heated. It is considered that the detector 341 is maintained at the same temperature as the nitrogen gas. Therefore, we can understand that the thermistor consisting of the p-type semiconductor layer formed on the surface of the thin diamond layer is slightly cooled by the flow of the nitrogen gas and that the output indicates that the thermistor assumes some temperature corresponding to the flow rate.

The results of the above-described experiment demonstrate that the flow detector using the diamond maintained at the same temperature as the nitrogen gas operates normally as a flow detector. Based on the data obtained from FIG. 25, the sensitivity was calculated, using the specific heat of nitrogen gas of 1.03 J/gK. The sensitivity amounts to $2\times10^{-4}$ cal. This means that a heat amount of about $2\times10^{-4}$ cal carried away from the thermistor can be detected. This value is comparable to the sensitivity of an alumel-chromel thermocouple having a thickness of 25 μm and several hundred times as high as the sensitivities of published silicon flow rate detectors.

In the prior art flow rate detector using a silicon thermistor, a high sensitivity as obtained in the present example has been impossible to achieve unless any heating is done. This effect is obtained by (1) the low heat capacitance responding quickly to outflow of heat from the thermistor according to variations in the flow rate, (2) the diamond thermistor having a high heat conductivity, (3) and the thin diamond film acting as a heat storage layer which quickly realizes a thermal equilibrium condition given by Eq. (8) in response to variations in the amount of heat carried away from the thermistor by the fluid.

Figure 26:
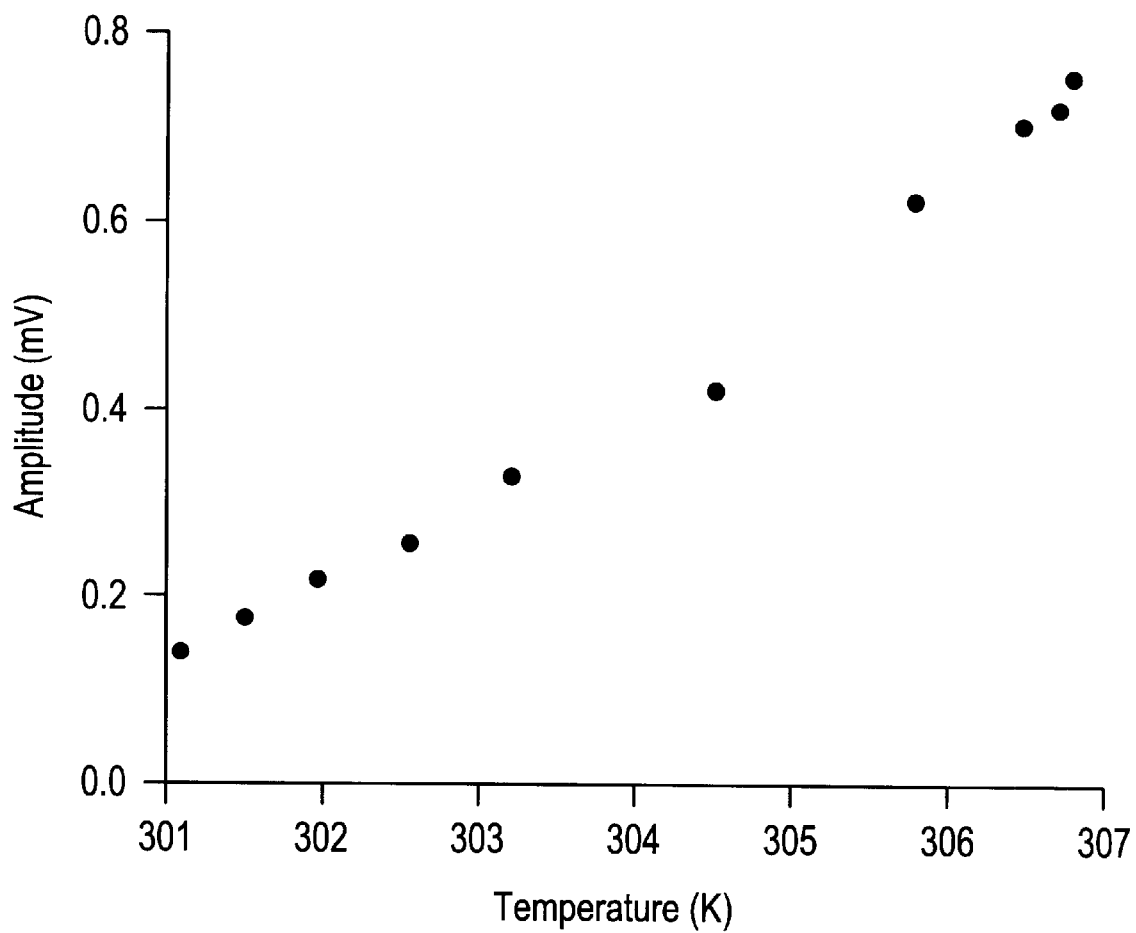
FIG. 26 is a graph showing the correlation between the amplitude of the output from a flow rate detector according to Example 18 and temperature when the detector is heated.

FIG. 26 shows the output from the thermistor of the flow rate detector 341 when the temperature of the flow rate detector is made higher than 300K of the fluid temperature by 1 to 7 K by heating. At this time, the detector 341 was heated by a heater (not shown) to heat the thermistor. The temperature of the flow rate detector 341 was measured. The flow rate was kept at 50 sccm during the measurement. As can be seen from FIG. 26, the output and the sensitivity can be increased by keeping the detector heated. In FIG. 25, where the flow rate detector was not heated, the output was less than 0.1 mV when the flow rate was 50 sccm. In FIG. 26, the output from the flow rate detector could be increased close to 0.8 mV by elevating the temperature of the flow rate detector by heating to about: 307 K which is higher than the fluid temperature of 300 K by about 7° C. That is, by setting the temperature of the flow rate detector higher than the temperature of the fluid by about 7 degrees, the sensitivity could be increased by a factor of about 8 compared with the case in which the detector was not heated.

It can also be expected that flow rates of the order of several sccm can be detected by further heating the detector by tens of degrees.

We consider that the action of the thin diamond film acting as a high-capacity heat storage layer responding thermally quickly to the thermistor makes it possible to increase the sensitivity of the flow rate detector by a factor close to 10. In particular, an appropriate amount of heat is supplied from the thin diamond film to the p-type semiconductor layer acting as a thermistor so as to satisfy the equilibrium equation of Eq. (8). Consequently, the temperature corresponds to the flow rate. Also, the thermistor is maintained at a temperature higher than the temperature of the fluid by only several degrees.

Nineteenth Embodiment

In the present example, platinum is sputtered on the surface of a thin diamond film having a thickness of 10 $\mu$m. This platinum layer is used as a thermistor layer.

First, an intrinsic or substantially intrinsic, thin diamond film is formed on a silicon substrate by low-pressure CVD. This diamond film is grown without intentionally incorporating nitrogen, boron, and other impurities thereinto. The specific resistance is $10^{10}$ to $10^{15}$ $\Omega\cdot$cm.

In carrying out the CVD process, whistler-mode CVD utilizing a magnetic field is used. The film is grown under the conditions: the substrate temperature is 800° C.; the pressure inside the reaction chamber is 0.25 torr; and the power of the input microwaves is 4 kW. The silicon substrate is placed at a location where the strength of the magnetic field is 875 Gauss. A CVD process is performed to grow the thin diamond film on the silicon substrate. In order to obtain a raw material gas, 1 part of methyl gas $CH_3OH$ and 4 parts of hydrogen gas $H_2$ are mixed. The film is grown for 24 hours. A diamond film having a thickness of about 10 $\mu$m is formed on the silicon substrate.

The thin diamond film grown on the silicon substrate can be separated by peeling the film off the substrate. At this time, a thin diamond film alone can be easily obtained by a mechanical peeling method, a method of solving the substrate with hydrofluoric acid or the like, or other method.

This thin diamond film is cut into the size of 5 mm×5 mm and placed into a sputtering apparatus. This sputtering apparatus uses no sputtering gas and sputters platinum on the surface of the thin diamond film at an applied voltage of the order of 1.2 kV. The thickness of the platinum film is 1000 Å (0.1 $\mu$m). During this sputtering, the target substrate was heated at 500° C.

In the present example, the platinum metal layer is used as a thermistor layer. Therefore, the resistance was adjusted by adjusting the thickness. More specifically, the resistance is set to 1 k$\Omega$. Of course, this value is set according to the embodiment.

In the present example, the thermistor of platinum could produce a thermistor parameter of 3000. The thermistor parameter is a parameter indicating a change in the resistance when temperature is elevated by one degree.

In this way, a thermistor layer made of platinum was formed on the surface of the thin diamond film.

To build the structure shown in FIG. 1, (A)–(C), the thermistor layer was formed and, at the same time, the heating element for maintaining the thermistor layer hot is fabricated from the platinum forming the thermistor layer. The heating element is built by varying the area of the platinum layer and setting the resistance to about 100 $\Omega$. More specifically, the thermistor layer and the heating element are formed by a patterning step. At this time, the area is so determined that the resistance of the heating element assumes a value on the order of 100 $\Omega$.

Referring again to FIGS. 1, (A)–(C), the platinum layer is patterned so that portions 12 and 11 constitute a thermistor layer and a heating element layer, respectively. The thermistor and the heating element are fabricated simultaneously by this patterning step.

In this manner, a platinum layer having a thickness of about 0.1 $\mu$m was formed on the surface of the thin diamond film having a thickness of 10 $\mu$m. As a result, a flow detector was completed.

Referring next to FIG. 24, there is shown a system comprising a flow detector using the thin diamond film having the platinum layer. Nitrogen gas $N_2$ 342 is introduced into a solenoid valve 344 via a flowmeter 343 and forced into a box 340 where the present example of flow rate detector 341 is installed. A gas release port is formed in the box in the direction of the flow of the gas so that gas may not linger inside the box. The nitrogen gas to be measured flows while in contact with the thermistor layer formed on the surface of the flow rate detector 341. As described above, the flow rate detector 341 comprises the thin diamond film having a thickness of 10 $\mu$m and the platinum layer formed on the surface of the diamond film and having a thickness of 0.1 $\mu$m.

During the measurement, the platinum layer acting as a thermistor is not intentionally heated. The solenoid valve 344 is driven by a 2-Hz signal obtained via the modulator 345 from an oscillator included in the lock-in amplifier 348. In this way, the flow of the nitrogen gas is modulated with AC waves. The resulting flow rate variations are detected by the flow rate detector 341. To detect the flow rate variations, an electrical current is supplied from a power supply 346 to the thermistor on the surface of the thin diamond film of the flow rate detector 341. This electrical current is detected as a voltage with the resistor 347 of 1 M$\Omega$. The detected voltage is registered by the lock-in amplifier 348 or by the oscilloscope 349. In this way, variations in the flow rate are measured as variations in the output current from the thermistor. At the same time, the flow rate of the nitrogen gas is precisely measured with the calibrated flowmeter 343. The relation between the output voltage from the thermistor formed by the platinum layer and the flow rate can be derived from the experimental instrument constructed as described above.

FIG. 25 shows one example of relation between the nitrogen gas flow rate and the output voltage obtained from the system shown in FIG. 24. It can be seen from FIG. 25 that the output increases linearly with increasing the nitrogen gas. In this case, the flow rate detector 341 is not intentionally heated. It is considered that the detector 341 is maintained at the same temperature as the nitrogen gas. Therefore, we can understand that the thermistor consisting of the platinum layer formed on the surface of the thin diamond layer is slightly cooled by the flow of the nitrogen gas and that the output indicates that the output represents some temperature corresponding to the flow rate. Of course, we can consider that the thin diamond film played a great role in terms of heat at this time.

The results of the experiment prove that the flow rate detector of diamond maintained at the same temperature as the nitrogen normally acts as a flow detector. Based on the data obtained from FIG. 25, the sensitivity was calculated, using the specific heat of nitrogen gas of 1.03 J/gK. The sensitivity amounts to $2\times10^{-4}$ cal. This means that a heat amount of about $2\times10^{-4}$ cal carried away from the thermistor can be detected. This value is comparable to the sensitivity of an alumel-chromel thermocouple having a thickness of 25 $\mu$m and several hundred times as high as the sensitivities of published silicon flow rate detectors.

In the prior art flow rate detector using a silicon thermistor, a high sensitivity as obtained in the present example has been impossible to achieve unless any heating is done. This effect is obtained by the action of the thermistor responding quickly to outflow of heat from the thermistor according to variations in the flow rate and by the action of the diamond film acting as a heat storage layer which quickly realizes a thermal equilibrium condition given by Eq. (8) in response to variations in the amount of heat carried away from the thermistor by the fluid.

FIG. 26 shows the output from the thermistor of the flow rate detector 341 when the temperature of the flow rate detector is made higher than 300 K of the fluid temperature by 1 to 7 K by heating. At this time, the detector 341 was heated by a heater (not shown) to heat the thermistor. The temperature of the flow rate detector 341 was measured. The flow rate was kept at 50 sccm during the measurement. As can be seen from FIG. 26, the output and the sensitivity can be increased by keeping the detector heated. In FIG. 25, where the flow rate detector was not heated, the output was about 0.1 mV when the flow rate was 50 sccm. In FIG. 26, the output from the flow rate detector could be increased close to 0.8 mV by elevating the temperature of the flow rate detector by heating to about 307 K which is higher than the fluid temperature of 300K by about 7° C. That is, by setting the temperature of the flow rate detector higher than the temperature of the fluid by about 7 degrees, the sensitivity could be increased by a factor of about 8 compared with the case in which the detector was not heated.

It can also be expected that flow rates of the order of several sccm can be detected by further heating the detector by tens of degrees.

We consider that the action of the thin diamond film acting as a high-capacity heat storage layer responding thermally quickly to the thermistor makes it possible to increase the sensitivity of the flow rate detector by a factor close to 10. In particular, an appropriate amount of heat is supplied from the thin diamond film to the platinum layer acting as a thermistor so as to satisfy the equilibrium equation of Eq. (8). Consequently, the temperature corresponds to the flow rate. Also, the thermistor is maintained at a temperature higher than the temperature of the fluid by only several degrees.

Twentieth Embodiment

When flow detectors are actually used, they are operated under various environmental conditions such as high temperatures and low temperatures. For example, where a flow detector is incorporated in an internal combustion engine and used, the detector must operate within a range from −20° C. to 100° C. or more. A measuring method which is not affected by such temperature variations is necessary.

In the present example, a heating element incorporated in a flow detector is driven with AC waves. Only output signals components varying in response to the variations in the AC waves are extracted to reduce the aforementioned problem. In a measurement according to the present example, the heating element is driven with AC waves. When a flow rate is detected, an integrator for processing the product of the output signal from the thermistor layer and a reference signal is used.

The present example uses the flow detector shown in FIG. 1, (A)–(C), and the heating element 11 is driven with AC waves to measure flow rates without being affected by variations in the temperature of the fluid. The method of fabricating the flow detector shown in FIG. 1, (A)–(C), is similar to the method of fabricating the flow detector described in the Nineteenth Embodiment except that thermistor layer 12 and heating element 11 are formed by patterning a platinum layer. As described already, the area is so determined that the resistance of the thermistor layer 12 is 1 kΩ and that the resistance of the heating element 11 assumes a value on the order of 100 Ω.

Figure 27:
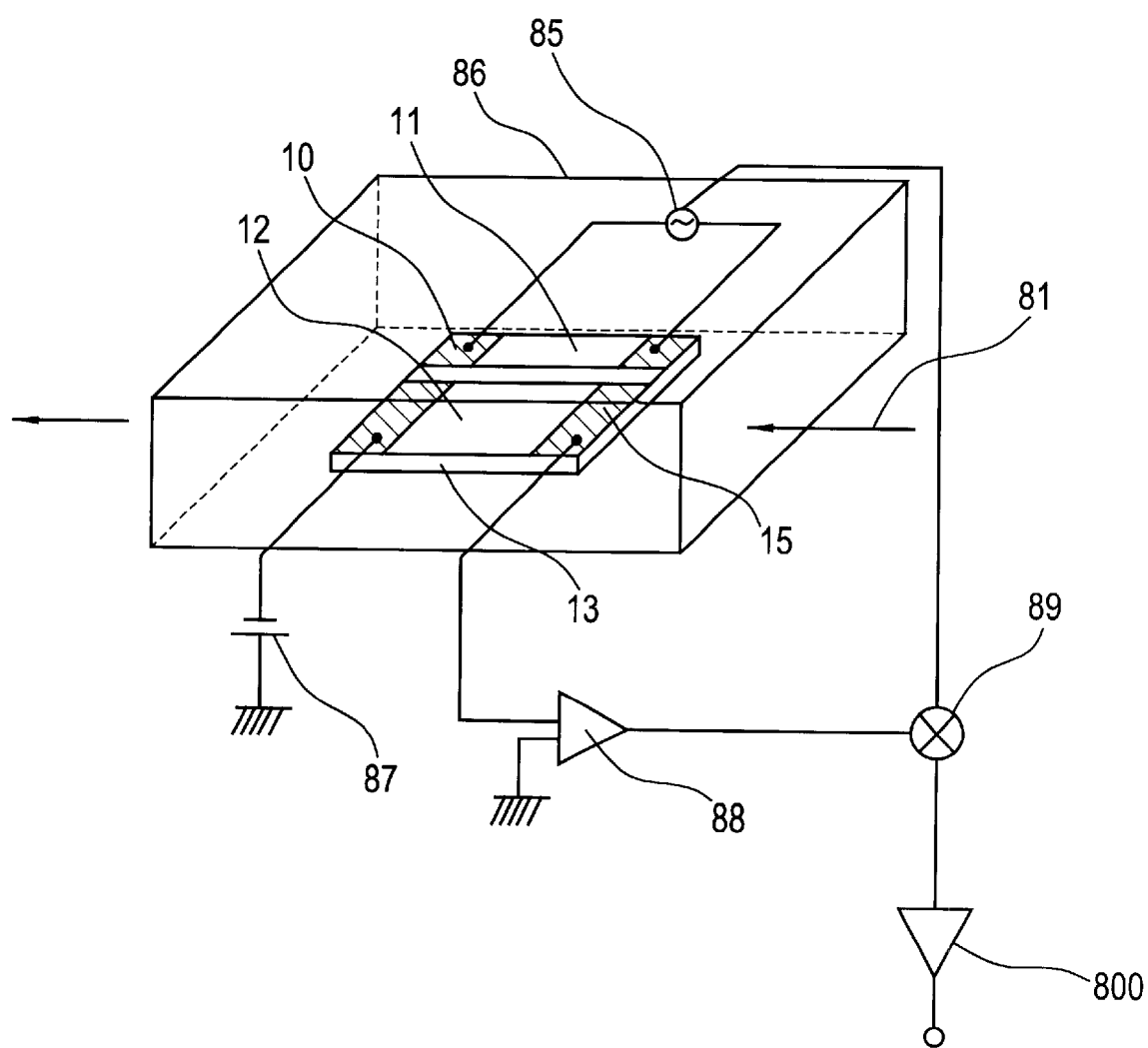
FIG. 27 is a perspective view of a flow rate detector according to Example 20.

A measuring instrument according to the present example is now described by referring to FIG. 27. Nitrogen gas 81 which is a fluid to be measured is caused to flow through a box 86 in the direction indicated by the arrow. A flow detector having a thermistor layer 12 and a heating element 11 is installed in the box 86. The thermistor layer 12 is formed by sputtering platinum on the surface of a thin diamond film 13. The flow rate of the nitrogen gas is accurately measured by a separate flow detector (not shown). The nitrogen gas is made to flow parallel to the surface of the thin diamond film 13 on the opposite side of the surface of the thermistor layer 12. The surface on which the thermistor layer 12 is formed is coated with an organic resin to prevent the fluid from directly touching the thermistor layer 12. Therefore, the thermistor layer 12 is designed to be affected by the amount of heat carried away by the nitrogen gas, or the fluid, via the diamond film 13.

An AC current is supplied to the heating element 11 from an AC power supply 85 via a pair of electrodes 10. A bias current is applied to the thermistor layer 12 from the bias power supply 87. The output signal from the thermistor layer 12 is taken across a pair of electrodes 15 and amplified by an amplifier 88. A multiplier 89 produces the product of the output signal from the amplifier 88 indicating the flow rate and a reference signal from the AC power supply 85. The output signal from the multiplier 89 is amplified by an amplification integrator 800. The output signal from the thermistor layer 12 is multiplied by the reference signal from the AC power supply 85 by means of the multiplier 89 and amplified by the integrator 800 to find the relation between the driving output waveform for driving the heating element 11 and the output from the thermistor layer 12.

Figure 28:
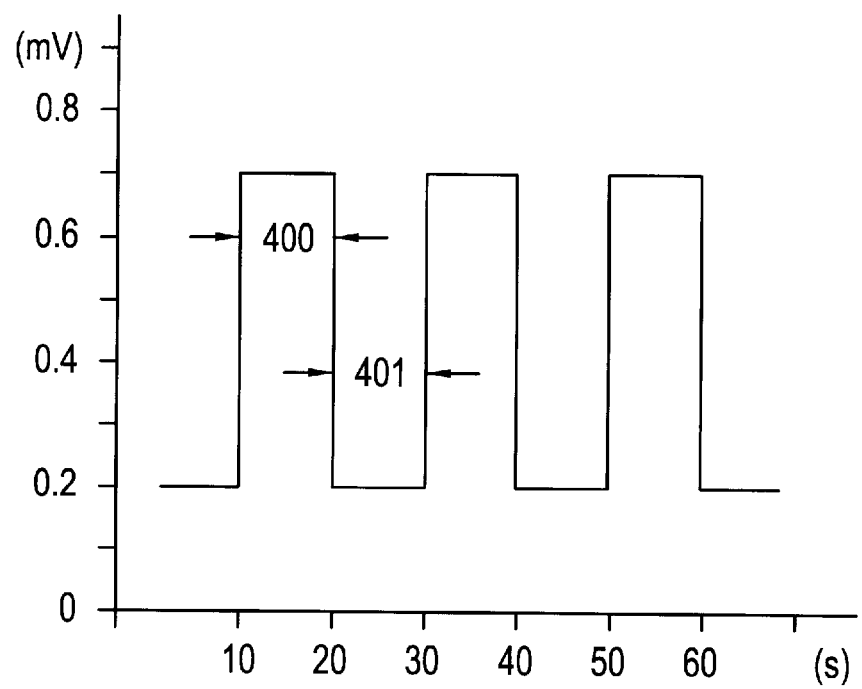
FIG. 28 is a graph showing the output waveform from the flow rate detector according to Example 20 when AC heating is being done and the flow rate is zero.
Figure 29:
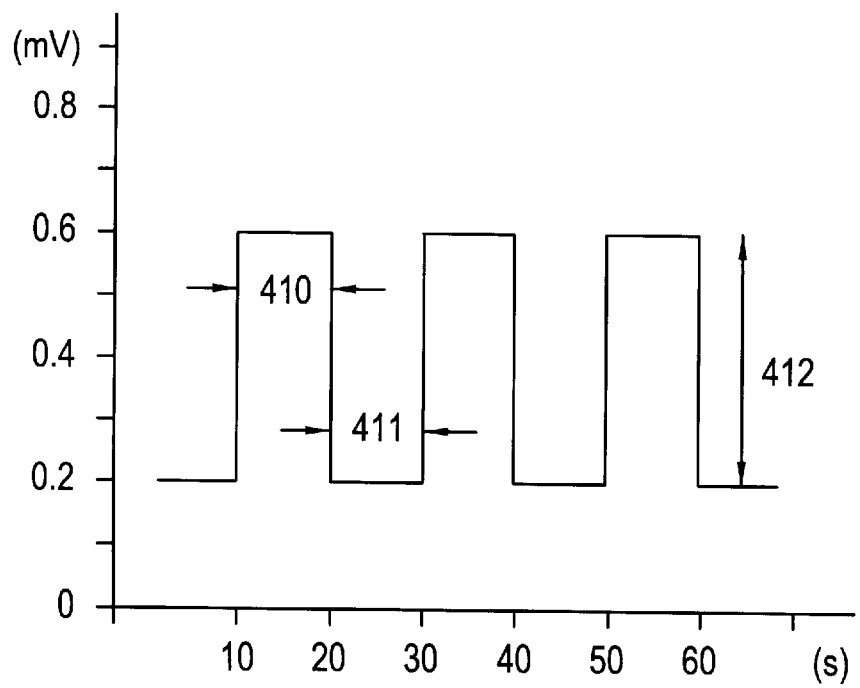
FIG. 29 is a graph similar to FIG. 28 but in which the flow rate is 1 m/sec.

A measuring method and the results of measurements are now described. The heating element 11 was driven with a rectangular wave having a width of 10 s. The output from the thermistor layer 12 was measured. The output from the thermistor layer 12 indicating temperature was plotted on the vertical axis of each of FIGS. 28 and 29. Time was plotted on the horizontal axis of each of the figures. In FIGS. 28 and 29, indicated by 400 and 410 are times for which heating is done. Indicated by 401 and 411 are times for which no heating is done but spontaneous cooling takes place. In the cases of FIGS. 28 and 29, signals are so processed that the output increases as the temperature of the thermistor layer 12 rises. Accordingly, it can be said that as the output increases, the temperature of the thermistor layer 12 rises. In the case of FIG. 28, no nitrogen gas is flown. In the case of FIG. 29, nitrogen gas is passed at a flow velocity of 1 m/s.

By comparing the case of FIG. 28 in which the flow velocity is 0 with the case of FIG. 29 in which the flow velocity is 1 m/s, we can see that the output indicating the temperature of the thermistor drops by about 0.1 mV due to flow of the nitrogen gas. That is, the temperature of the thermistor layer 12 decreases. It can be seen from FIG. 29 that if the flow rate is constant, the temperature of the thermistor layer 12 is maintained constant as given by Eq. (8). That is, a thermal equilibrium state given by Eq. (8) is maintained.

FIG. 29 shows that the thermistor layer 12 is at some temperature. This temperature is affected by the ambient temperature, e.g., the temperature of the fluid 16. Therefore, if the ambient temperature is kept constant at all times, then the flow rate can be measured precisely. However, if the ambient temperature varies during measurement of the flow rate, then it follows that the output from the thermistor layer 12 plotted on the vertical axis of the graph of FIG. 29 changes. However, in FIG. 29, if the difference 412 between the output from the thermistor layer produced during the heating period 410 and the output from the thermistor layer produced during the non-heating period 411 is taken into account, then this output difference 412 does not depend on the ambient temperature, because the output from the thermistor layer indicating the temperature contains the output indicating the ambient temperature during both periods 411 and 410. Where the difference 412 is taken, the two outputs indicating the ambient temperature cancel each other. Hence, the output indicating the ambient temperature is not contained in the difference 412.

In practice, the heating element 11 is heated with pulse waveforms or AC waves having a frequency higher than the frequency used in the cases of FIGS. 28 and 29. In this way, a waveform corresponding to FIG. 29 is obtained. If neither the flow rate nor the ambient temperature changes, then temperature of the thermistor does not change. In this case, the waveform as shown in FIG. 29 is derived.

However, if the ambient temperature does not vary but the flow rate varies, the area of the waveform gradually changes with time. Accordingly, the temperature of the thermistor is calculated by calculating the area of this waveform. Furthermore, the flow rate is computed. Additionally, the change in the area of the waveform is calculated. Thus, the change in the temperature is calculated. The change in the flow rate is calculated from this calculated temperature change.

If the ambient temperature varies, the sample principle applies because neither the areas of the waveforms shown in FIGS. 28 and 29 nor variation of these areas with respect to time depend on the ambient temperature.

As described above, even if the temperature of the environment within which a measurement is made varies, the temperature of the thermistor and its change can be precisely measured according to the amount of heat carried away from the thermistor by the fluid by doing AC heating. In consequence, the flow rate and its variation can be precisely measured.

Figure 2:
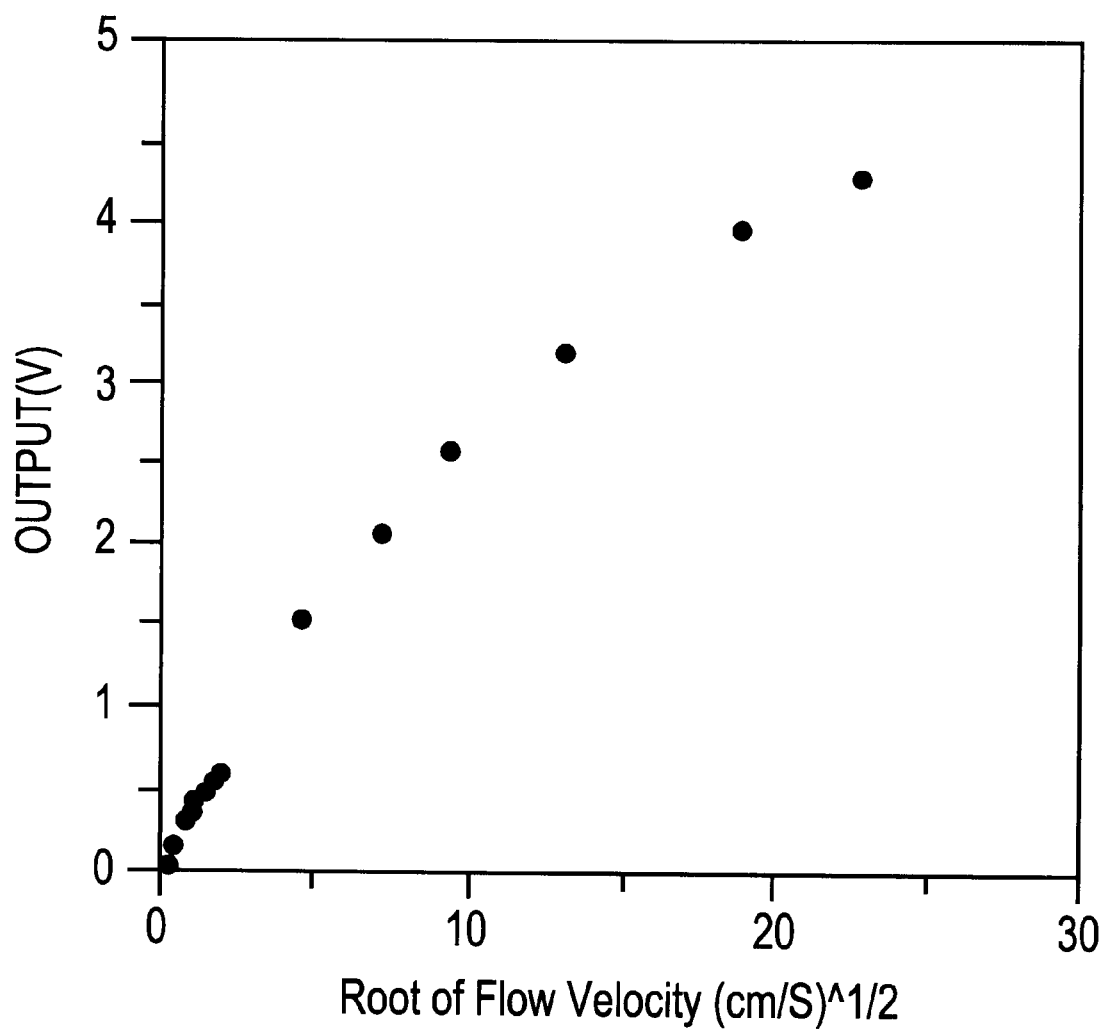
FIG. 2 is a graph showing the relation between flow rate and the output from the flow rate detector shown in FIGS. 1(A) to 1(C)

The relation between the flow velocity of the nitrogen gas measured by the above-described AC heating and the output voltage from the thermistor layer 12 is shown in FIG. 2. In FIG. 2, the vertical axis indicates the output voltage. The horizontal axis indicates the square root of the flow velocity $(cm/s)^{1/2}$. The horizontal axis is expressed in $(cm/s)^{1/2}$ to clarify the correlation between the flow velocity and the output voltage.

Since the horizontal axis of FIG. 2 is the square root of the flow velocity, the maximum measurable flow velocity of the nitrogen gas is roughly $25^2 \times S$ sccm $(cm^3/s)$, where S is the cross-sectional area of the fluid. Also, it can be seen from FIG. 2 that the minimum measurable flow velocity is less than 1×S sccm. Consequently, the obtained dynamic range has three or more orders of magnitude.

In the prior art flow detector using a silicon thermistor, AC heating does not function effectively. In particular, the prior art instrument is not equipped with any mechanism which realizes an equilibrium state quickly in response to variations in the thermistor as given by Eq. (8). Therefore, even if a fluid is passed at a constant flow rate in an attempt to obtain an output waveform as shown in FIG. 29, an equilibrium state following AC heating cannot be realized. As a result, the output from the thermistor does not reflect the flow rate. Consequently, it has not been possible to precisely detect the flow rate from the output from the thermistor.

If the thermal equilibrium is maintained at the thermistor, then an improvement in the measuring accuracy may be expected as the frequency of the AC heating is increased. However, the resistance of diamond to heat is not completely zero. In practice, however, there exists an upper limit in the driving frequency satisfying Eq. (8) at all times. Preliminary experiments and calculations show that the upper limit can be several tens of Hertz. However, the flow rate measurement which uses AC heating and is not affected by the ambient temperature is very useful since AC heating itself is very difficult to perform in the prior art flow rate detector using a silicon thermistor.

The frequency and the waveform of the AC heating can be appropriately determined according to the usage and the measuring accuracy. Instead of fabricating the heating element 11 and the thermistor layer 12 from platinum, they can be made of a p-type semiconductor consisting of diamond.

It is to be understood that the present invention is not limited to the terms of the embodiments described above. For example, in the, embodiments described thus far, the thickness of the thin diamond film and the thickness of the thermistor layer is set to a ratio of about 100:1. The ratio of their heat capacities is set to about 100:1. These ratios may be adequately set according to the physical properties of the formed diamond film. Also, the ratio of the heat capacities is not limited to 1:100. This ratio may be appropriately set according to the environment within which the flow detector is used, the measuring sensitivity, the usage, and other factors. Furthermore, when the thin diamond film is fabricated, appropriate method and conditions may be selected.

Today, only p-type diamond semiconductors can be fabricated. Also in the description made thus far, only a p-type diamond semiconductor is used. If an n-type diamond semiconductor is successfully fabricated, then the present invention can be applied simply by replacing the p-type with n-type. The prior art flow detector has had two items which conflict with each other. That is, if it is attempted to obtain a higher sensitivity, the response speed drops. If it is attempted to obtain a higher response speed, then the sensitivity decreases. In the present structure, a layer acting as a thermistor is formed on the surface of a thin diamond film acting as a heat storage layer. A thermal equilibrium state which is important for detection of a flow rate using a thermistor can be realized quickly in response to variations in the flow rate. The varying flow rate can be measured precisely with a high sensitivity, a high response speed, and a high dynamic range.

Furthermore, the flow rate can be measured without being affected by the ambient temperature by using AC heating.

In addition, the structure makes the full use of the physical properties of diamond, i.e., a high heat conductivity and a low specific heat. Hence, the structure hardly ages.

Moreover, a flow detector according to the invention has the feature of high stability in addition to the features described above. Further, a high sensitivity can be obtained merely by heating the fluid only by several degrees. Therefore, the novel flow detector can replace conventional gasoline flow rate detectors used in automobiles. Additionally, the novel flow detector is resistant to various corrosive gases. Also, the novel flow rate detector can be very advantageously used to measure flow rates of fluids, which would have heretofore very difficult to carry out because of a danger of ignition.

A fluid is made to flow while in contact with the thin diamond film. A given amount of heat is supplied to the diamond film in a quite short time. Flow rates can be measured accurately by measuring the variations in the temperature of the diamond film during the heating.

The temperature variation of the diamond film caused by this heating can be precisely measured by comparing a value obtained by integrating the temperature of the diamond film immediately prior to the heating with respect to time with a value obtained by integrating the temperature of the diamond film immediately after the heating with respect to time. Flow rates free of drift components can be measured with high reliability.

More specifically, measurements can be made within a measuring range from 2 to 50 slm (liters/min) with a tolerance of less than about 3% (±1.5%). Also, flow rates can be measured within a dynamic range having three or more orders of magnitudes.

What is claimed is:

1. An electric device for monitoring a fluid comprising:
   a diamond film having a first surface and a second surface on an opposite side of said first surface; and
   a resistor provided on said first surface of said diamond film and measuring a temperature of said diamond film;
   wherein at least said second surface is in contact with the fluid in response to a temperature change of said diamond film resulting from said heat transfer to sense a parameter of the fluid and said resistor is thermally connected with said diamond film.

2. An electric device for monitoring a fluid comprising:
   a diamond film having a first surface and a second surface on an opposite side of said first surface; and
   a resistor provided on said first surface of said diamond film,
   wherein said resistor is thermally connected only with said diamond film, and said second surface is in contact with the fluid.

3. An electric device for monitoring a fluid comprising:
   a substrate;
   a diamond film supported by said substrate, wherein said diamond film is thermally insulated from said substrate; and
   a resistor provided on said diamond film,
   wherein said diamond film has an exposed surface to the fluid to be monitored.

4. An electric device for monitoring a fluid comprising:
   a diamond film, having one and only one contact surface thereof in contact with the fluid; and
   a resistor provided on an opposite surface of said diamond film to said one surface and thermally connected only with said diamond film,
   wherein said contact surface is a terminal surface of crystal growth of said diamond film.

5. An electric device for monitoring a fluid comprising:
   fluid contact means for providing a monitoring interface with the fluid to be monitored, said fluid contact means comprising a diamond film in direct contact with the fluid;
   a heat generator provided on said diamond film; and
   a thermally sensitive resistor provided on said diamond film,
   wherein said thermally sensitive resistor is thermally connected with said heat generator only through said diamond film.

6. An electric device comprising:
   a diamond film;
   a heat generator provided on said diamond film; and
   a thermally sensitive resistor provided on said diamond film,
   wherein said heat generator generates a heat pulse, and said thermally sensitive resistor measures a temperature variation of said diamond film caused by said heat pulse.

7. An electric device provided on a path for passing a fluid therethrough comprising:
   a diamond film, one surface of said diamond film forming a part of an inner wall of said path; and
   a resistor provided on an opposite surface of said diamond film to said one surface and thermally connected only with said diamond film.

8. An electric fluid monitoring device provided on a path for passing a fluid therethrough, comprising:
   fluid contact means for providing a monitoring interface with the fluid path to be monitored, said fluid contact means comprising a diamond film having a first surface and a second surface opposite to said first surface, said second surface in contact with said fluid; and
   a resistor provided on said first surface of said diamond film and thermally connected only with said diamond film, said resistor changing resistance in response to a temperature change of said diamond film resulting from heat transfer with the fluid,
   wherein said path is divided into a plurality of paths by a separator provided therein.

9. An electric fluid monitoring device comprising:
   a fluid path;
   a fluid with a Reynolds number of at least 4000 flowing in said fluid path;
   fluid contact means on said fluid path for providing a monitoring interface with the fluid path, said fluid contact means comprising a diamond film having a first surface and a second surface opposite to said first surface, at least said second surface in contact with said fluid; and
   a resistor provided on said second surface of said diamond film; and
   a resistor provided on said first surface of said diamond film and thermally connected only with said diamond film.

10. An electric device comprising:
    a diamond film, one planar surface of said diamond film in contact with a fluid; and
    a resistor provided on an opposite surface of said diamond film to said one planar surface and thermally connected only with said diamond film,
    wherein said one planar surface is oriented in a slanting direction to a direction in which said fluid flows.

11. An electric device comprising:
    a diamond film in contact with a fluid;
    means for intermittently supplying heat to said diamond film; and
    means for measuring a temperature variation of said diamond film caused by said heat.

12. The device of claim 11 wherein flow rate or flow velocity of said fluid is obtained from said temperature variation.

13. The device of claim 11 further comprising means for obtaining output from said temperature variation in proportion to quantity of heat removed from said diamond film by said fluid.

14. An electric device comprising:

a diamond film having an exposed surface to contact a fluid to be monitored with said device;

supporting means for supporting said diamond film, said diamond film thermally insulated from said supporting means;

means for supplying a heat pulse to said diamond film;

means for measuring a temperature of said diamond film; and means for calculating output from variation of said temperature caused by said heat pulse, wherein said output is in proportion to quantity of heat removed from said diamond film by said fluid.

* * * * *